(12) United States Patent
Machida et al.

(10) Patent No.: US 10,882,155 B2
(45) Date of Patent: *Jan. 5, 2021

(54) DUST COLLECTOR FOR ELECTRIC POWER TOOL, ELECTRIC POWER TOOL, AND DUST COLLECTION SYSTEM

(71) Applicant: MAKITA CORPORATION, Anjo (JP)

(72) Inventors: Yoshitaka Machida, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,842

(22) Filed: Jun. 28, 2019

(65) Prior Publication Data
US 2019/0314943 A1    Oct. 17, 2019

Related U.S. Application Data

(63) Continuation of application No. 15/408,742, filed on Jan. 18, 2017, now Pat. No. 10,507,556.

(30) Foreign Application Priority Data

Jan. 20, 2016  (JP) .................... 2016-008529
Jan. 20, 2016  (JP) .................... 2016-008530
(Continued)

(51) Int. Cl.
*B23B 47/34*    (2006.01)
*B23B 45/00*    (2006.01)
(Continued)

(52) U.S. Cl.
CPC .......... *B23Q 11/0071* (2013.01); *B01D 45/16* (2013.01); *B01D 46/0027* (2013.01);
(Continued)

(58) Field of Classification Search
CPC ..... B23B 47/34; B23B 2270/62; B23B 45/00; B23Q 1/00; B23Q 11/00; B23Q 11/0071
(Continued)

(56) References Cited

U.S. PATENT DOCUMENTS 7,354,226 B2   4/2008  Britz
8,906,124 B2   12/2014 Yoshikane et al.
(Continued)

FOREIGN PATENT DOCUMENTS

CN   201161374 Y   12/2008
CN   101451423 A   6/2009
(Continued)

OTHER PUBLICATIONS

Aug. 27, 2019 Office Action issued in Japanese Patent Application No. 2016-008529.
Aug. 13 email, 2018 Office Action issued in U.S. Appl. No. 15/408,742.
Jan. 30, 2019 U.S. Office Action issued U.S. Appl. No. 15/408,742.
Aug. 31, 2020 Office Action issued in Chinese Patent Application No. 201710036995.0.

*Primary Examiner* — Minh Chau T Pham
(74) *Attorney, Agent, or Firm* — Oliff PLC

(57) ABSTRACT

A dust collector for an electric power tool includes a main body case, a dust box, a sliding portion, and a dust collecting route. The main body case includes an exhaust port, the main body case being configured to be installed on an electric power tool. The dust box internally includes a filter. The sliding portion is disposed on the main body case. The sliding portion has a front end on which a nozzle with a suction opening is disposed. The sliding portion is slidable in a front-rear direction. The dust collecting route is from the suction opening to the exhaust port passing through the filter. The main body case includes a guiding portion through which the sliding portion passes, and the guiding portion allows the sliding portion to project rearward when the sliding portion slides.

10 Claims, 41 Drawing Sheets

(30) Foreign Application Priority Data

Jan. 20, 2016 (JP) ................................ 2016-008531
Jan. 16, 2017 (JP) ................................ 2017-005296
Jan. 16, 2017 (JP) ................................ 2017-005297

(51) Int. Cl.
*B23Q 1/00* (2006.01)
*B23Q 11/00* (2006.01)
*B01D 45/16* (2006.01)
*B01D 46/00* (2006.01)
*B01D 46/10* (2006.01)
*B25F 5/02* (2006.01)

(52) U.S. Cl.
CPC .......... *B01D 46/10* (2013.01); *B23Q 11/0046* (2013.01); *B25F 5/02* (2013.01)

(58) Field of Classification Search
USPC ......... 55/385.1, 469, 472, 360, 428; 15/339; 408/67, 72 B, 110, 115 B, 115 R, 48; 173/90, 198; 175/209, 211
See application file for complete search history.

(56) References Cited

U.S. PATENT DOCUMENTS

| | | | |
|---|---|---|---|
| 8,967,923 | B2 | 3/2015 | Lerch et al. |
| 10,507,556 | B2 * | 12/2019 | Machida ............ B23Q 11/0071 |
| 2002/0141836 | A1 | 10/2002 | Ege et al. |
| 2005/0281627 | A1 | 12/2005 | Britz |
| 2013/0031881 | A1 * | 2/2013 | Machida ............ B23Q 11/0046 |
| | | | 55/385.1 |

FOREIGN PATENT DOCUMENTS

| | | |
|---|---|---|
| CN | 103654616 A | 3/2014 |
| JP | 2000-006054 A | 1/2000 |
| JP | 2003-231038 A | 8/2003 |
| JP | 2012-250291 A | 12/2012 |
| JP | 2013-078831 A | 5/2013 |
| WO | 2015058496 A1 | 4/2015 |

\* cited by examiner

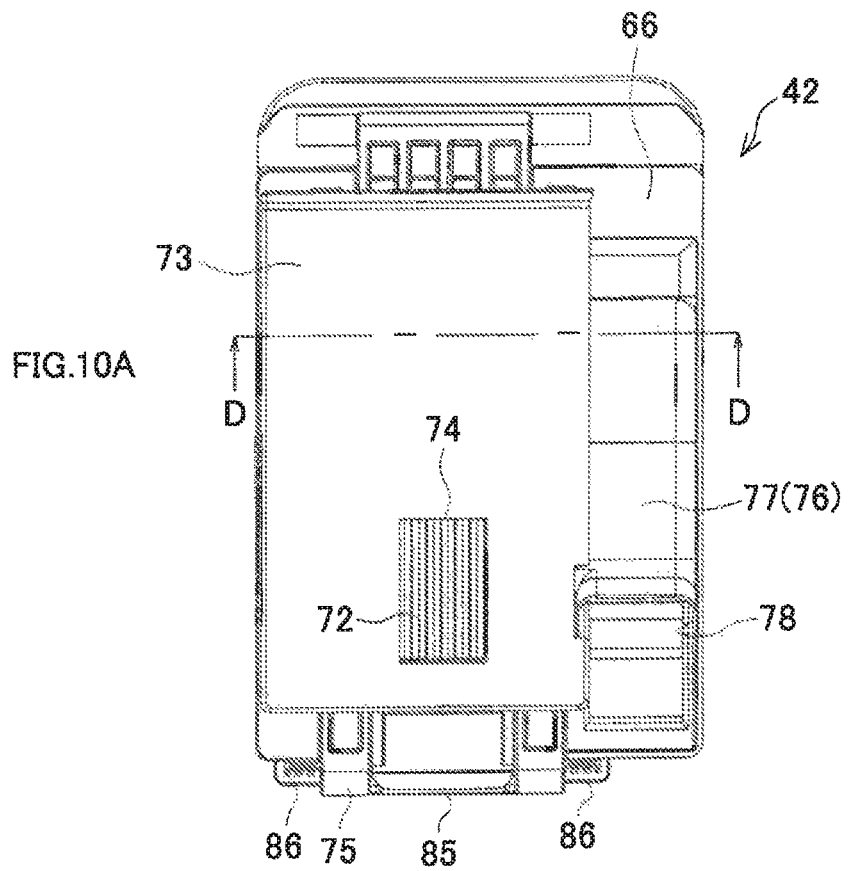
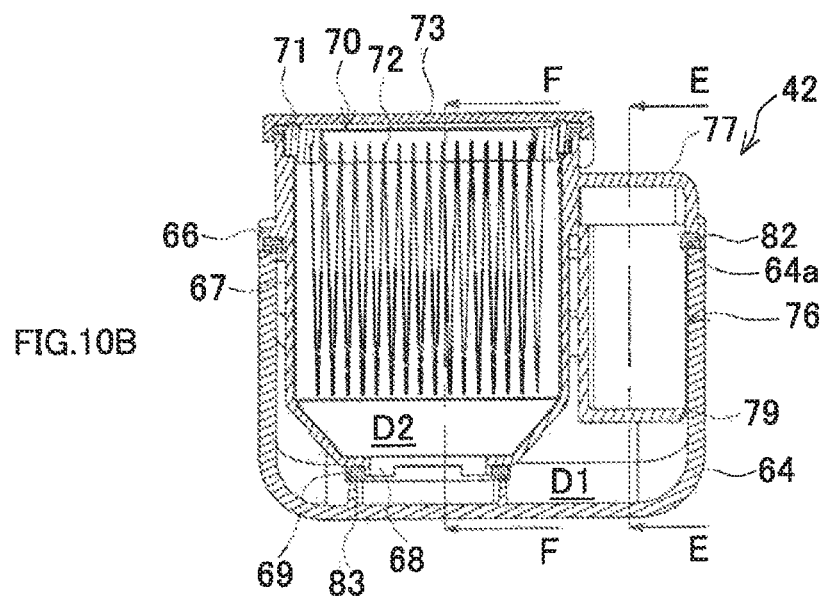

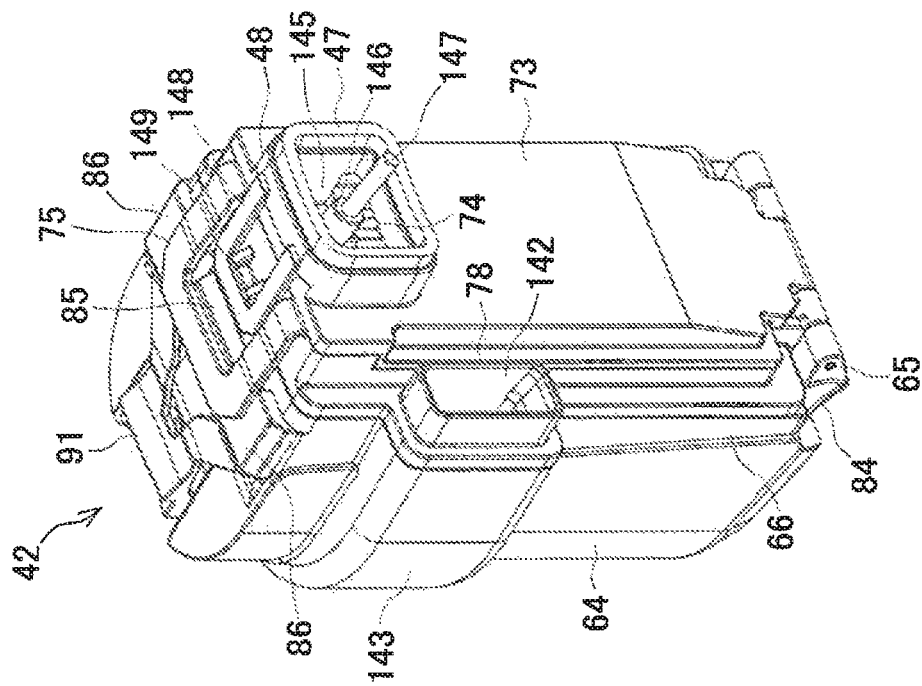

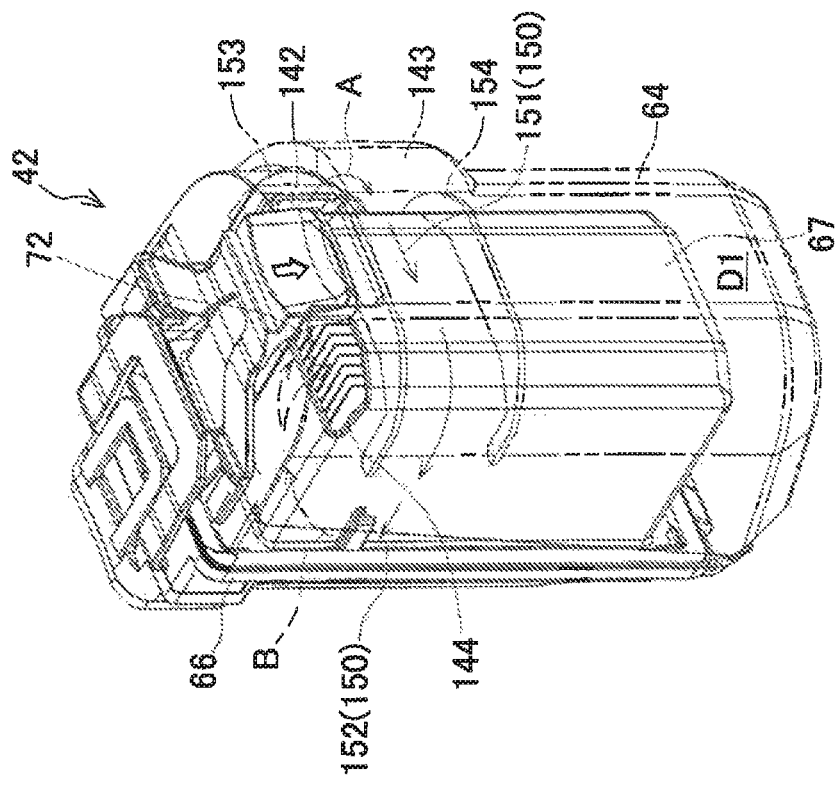
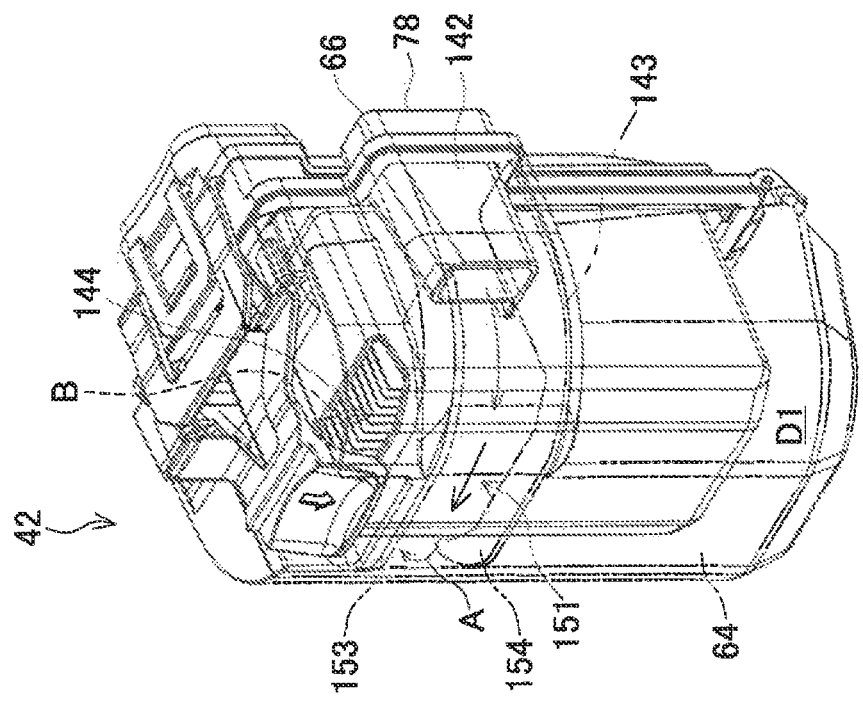

DUST COLLECTOR FOR ELECTRIC POWER TOOL, ELECTRIC POWER TOOL, AND DUST COLLECTION SYSTEM

This is a Continuation of application Ser. No. 15/408,742 filed Jan. 18, 2017, now U.S. Pat. No. 10,507,556 B2, which in turn claims the benefit of Japanese Patent Application No. 2016-008529, Japanese Patent Application No. 2016-008530 and Japanese Patent Application No. 2016-008531 filed on Jan. 20, 2016, and Japanese Patent Application No. 2017-005296 and Japanese Patent Application No. 2017-005297 filed on Jan. 16, 2017, the entireties of which are incorporated by reference.

BACKGROUND

Technical Field

The present disclosure relates to a dust collector for electric power tool mounted on an electric power tool such as an electric drill and a hammer drill, an electric power tool on which the dust collector is installed, and a dust collection system.

Related Art

An electric power tool such as an electric drill and a hammer drill includes a dust collector that collects dust generated from a workpiece in such as a drilling work. As the dust collector for the electric power tool, a dust collector disclosed in Japanese Unexamined Patent Application Publication No. 2013-8831 has been known. The dust collector includes a housing (main body case) that houses a motor with a fan and a dust box disposed on an upstream of the motor. The dust collector includes a tubular extension/contraction member through which a flexible hose is coupled to the dust box and passes so as to be coupled to a front end of the housing in a state of projecting to be biased forward. The extension/contraction member has a front end on which an L-shaped nozzle is disposed, such that a front end of the flexible hose is coupled to the nozzle. The nozzle has a distal end on which a suction opening is disposed, such that a bit mounted on the hammer drill is configured to pass through the suction opening.

Since a depth of drilling performed by such as the electric drill is approximately 100 mm at the longest, the extension/contraction member is configured to extend and contract with a stroke corresponding to the size. However, for a drilling work of a depth of 150 mm, 200 mm, and similar depth with what is called a long bit, which has a long size, it is necessary to lengthen the extension/contraction member so as to increase the extension/contraction stroke. However, since a retreated position of the extension/contraction member in the contraction is restricted by a main body case to which the extension/contraction member is coupled, the extension/contraction stroke fails to be set to be long, thus the use of the long bit has not been realized.

Therefore, the present disclosure has an object to provide a dust collector for an electric power tool and an electric power tool, and a dust collection system configured to set a large extension/contraction stroke without being restricted by a main body case so as to support a long bit.

SUMMARY

In order to achieve the above-described object, there is provided a dust collector for an electric power tool according to a first aspect of the disclosure includes a main body case, a dust box, a sliding portion, and a dust collecting route. The main body case includes an exhaust port, the main body ease being configured to be installed on an electric power tool. The dust box internally includes a filter. The sliding portion is disposed on the main body case. The sliding portion has a front end on which a nozzle with a suction opening is disposed. The sliding portion is slidable in a front-rear direction. The dust collecting route is from the suction opening to the exhaust port passing through the filter. The main body case includes a guiding portion through which the sliding portion passes, and the guiding portion allows the sliding portion to project rearward when the sliding portion slides.

BRIEF DESCRIPTION OF DRAWINGS

FIG. 10A is an explanatory plan view of the dust box.

FIG. 10B is an explanatory cross-sectional view of the dust box taken along the line D-D in FIG. 10A.

FIG. 37A is an explanatory view of a dust box, and a perspective view from a front.

FIG. 37B is an explanatory perspective view of a dust box from a rear.

FIG. 40A is an explanatory view illustrating airflow inside the dust box viewed through a box main body, and a perspective view from a left front side.

FIG. 40B is an explanatory view illustrating airflow inside the dust box viewed through a box main body, and perspective view from a right front side.

DETAILED DESCRIPTION

The following describes embodiments of this disclosure based on the drawings.

First Embodiment

Figure 1:
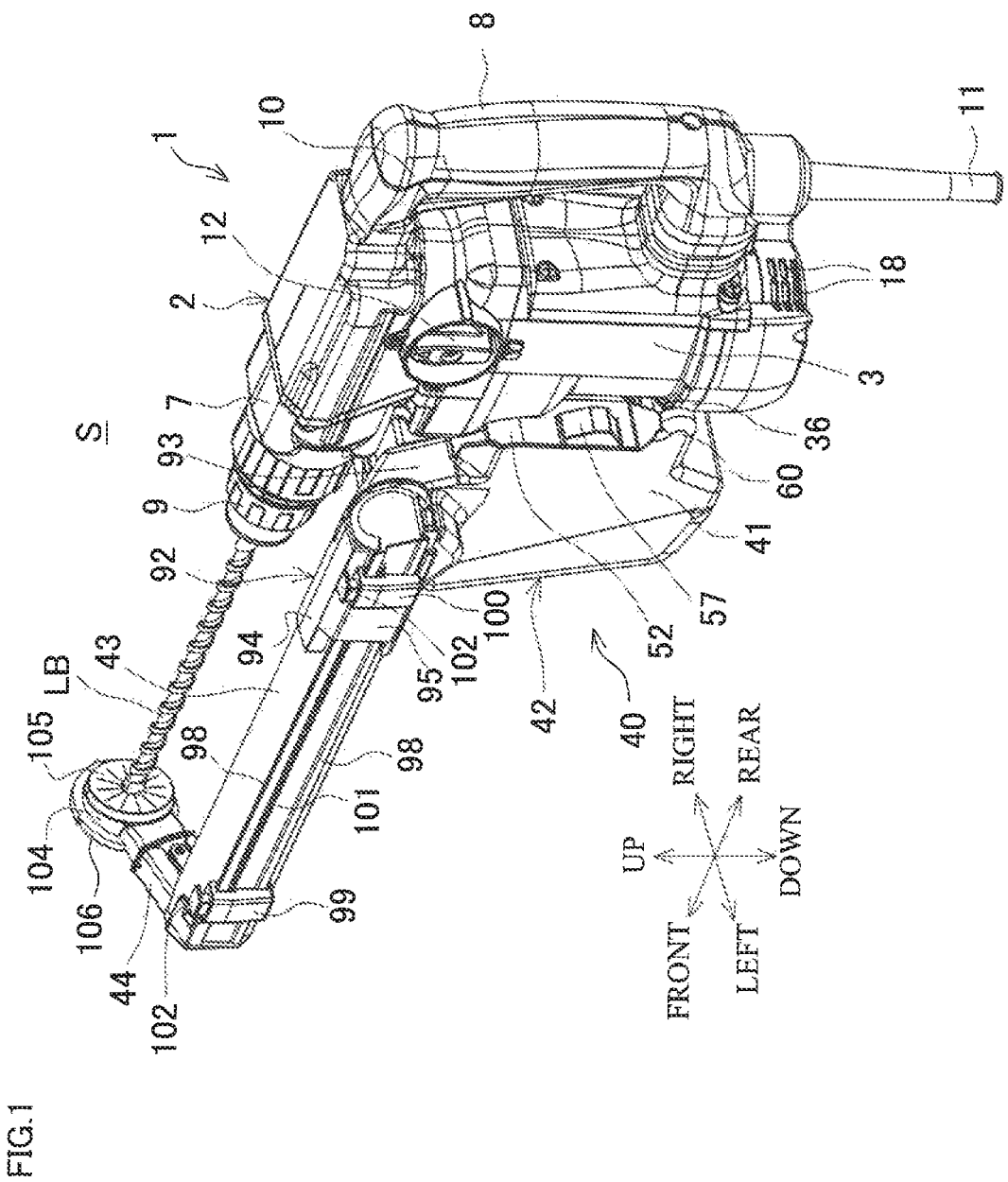
FIG. 1 is a perspective view of a dust collection system of a first embodiment viewed from a rear.
Figure 2:
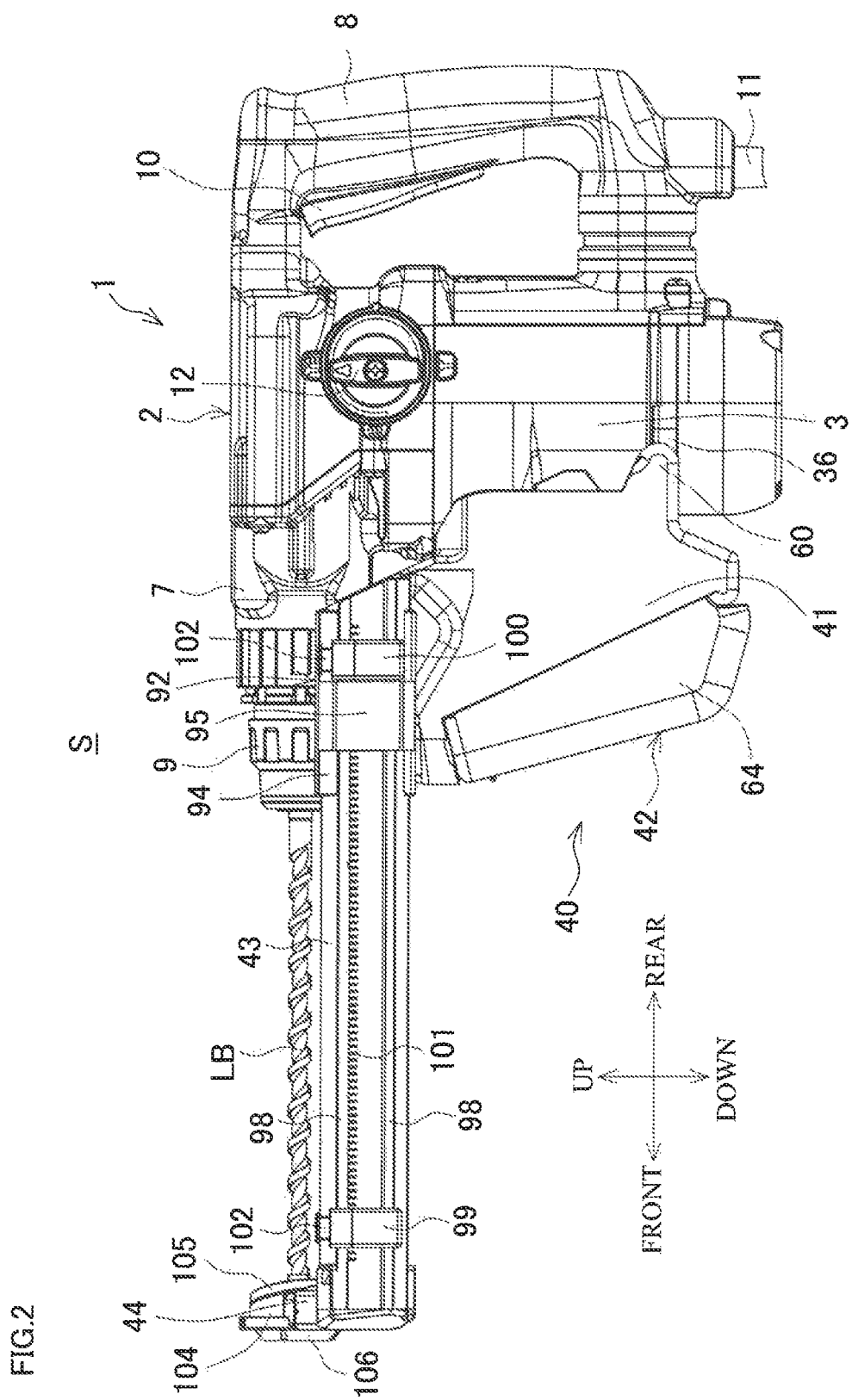
FIG. 2 is a side view of the dust collection system of the first embodiment.
Figure 3:
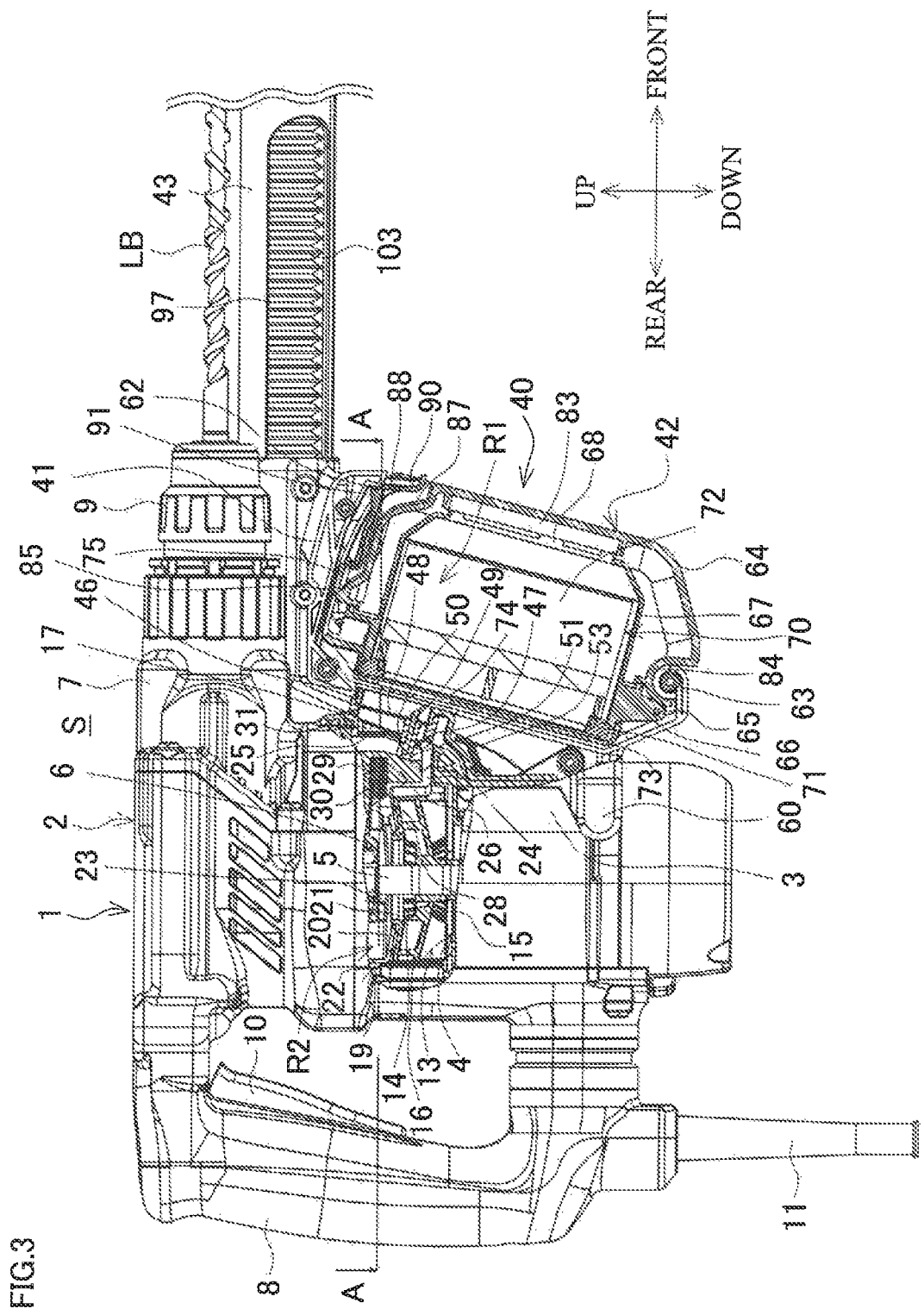
FIG. 3 is an explanatory view of the dust collection system of the first embodiment illustrating a cross-sectional surface of a part of a dust collector for an electric power tool and a hammer drill.
Figure 4:
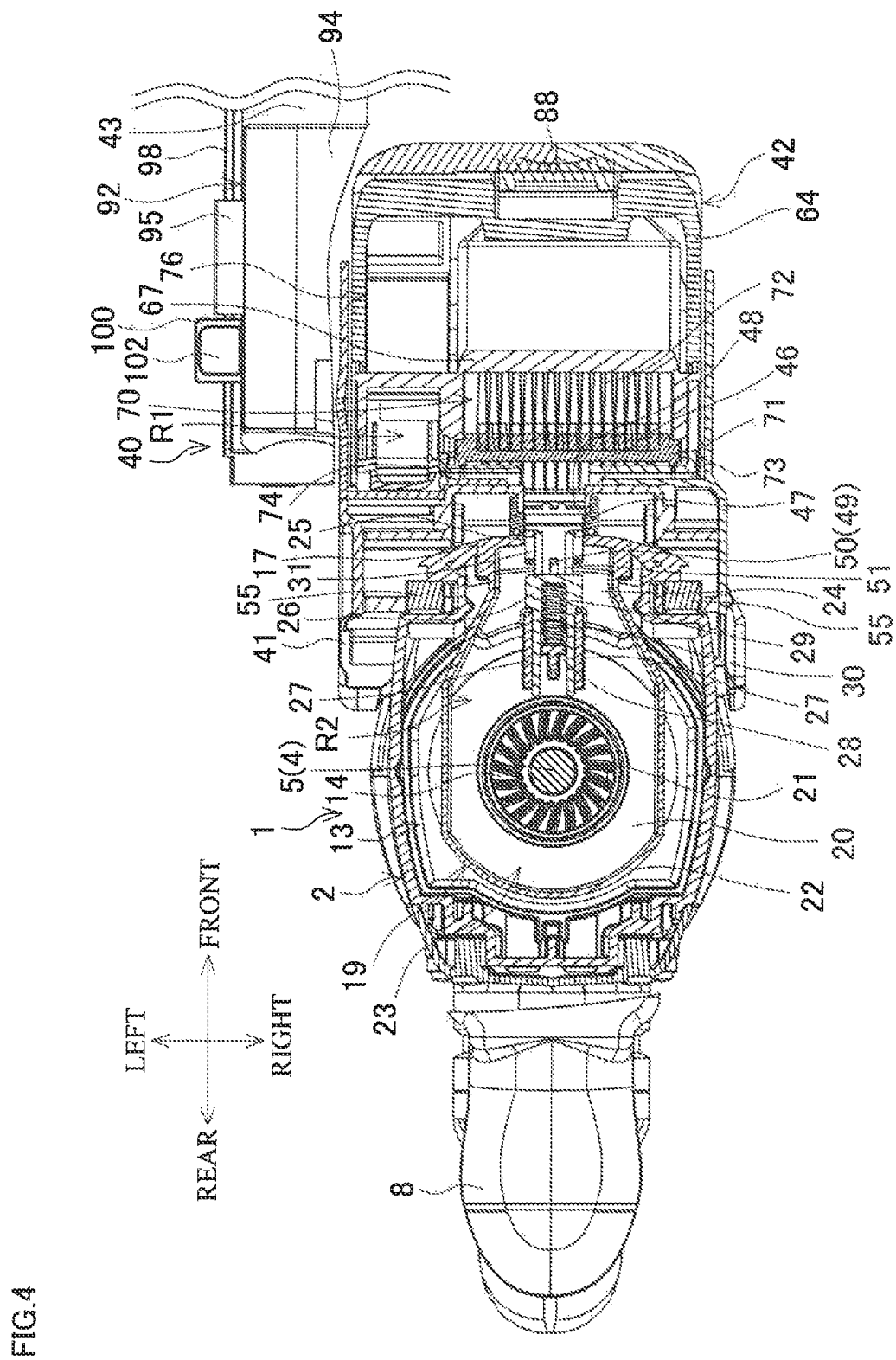
FIG. 4 is a cross-sectional view taken along the line A-A in FIG. 3.

FIGS. 1 to 4 illustrate an exemplary dust collection system S where a dust collector for the electric power tool (hereinafter simply referred to as a "dust collector") is installed on a hammer drill as an electric power tool. FIG. 1 is a perspective view from a rear, FIG. 2 is a side view, FIG. 3 is a side view illustrating a cross section of a part of the collection system S, and FIG. 4 is a cross-sectional view taken along the line A-A in FIG. 3.

Description of Hammer Drill

A hammer drill 1 internally includes a motor housing 3, which houses a motor 4 with an output shaft 5 disposed upward, in a vertical direction on a front lower portion of a main body housing 2. Above the motor housing 3, the hammer drill 1 internally includes a gear housing 6 that houses a crank mechanism and a rotation mechanism. The hammer drill 1 includes a front housing 7, which houses a tool holder disposed forward, assembled on the front of the main body housing 2, and includes a handle housing 8, which has an U-shape from the side view, coupled to the rear portion of the main body housing 2. The tool holder has a distal end on which a tool bit (in FIGS. 1 to 4, indicated as a drill bit, hereinafter referred to as a "long bit LB," corresponding to a maximum drilling depth of equal to or more than 120 mm) is configured to be installed by an operation sleeve 9. The hammer drill 1 includes a switch lever 10, which is disposed on a switch included in the handle housing 8, and a power supply cord 11.

The tool holder includes a hammering mechanism where a piston is reciprocated by a connecting rod of the crank mechanism. The main body housing 2 includes a change lever 12 on a side surface, and the hammer drill 1 is configured to select a mode among a hammer mode in which the hammering mechanism is operated to provide a hammering on the tool bit, a drill mode in which the rotation mechanism is operated to rotate the tool bit with the tool holder, and a hammer drill mode in which the hammering mechanism and the rotation mechanism are simultaneously operated to provide the hammering and the rotation on the tool bit, with use of the change lever 12.

In the motor housing 3, the output shaft 5 passes through the gear housing 6 to engage with a gear (not illustrated) of the crank mechanism. The gear housing 6 includes a fan housing chamber 13 on a lower portion. In the fan housing chamber 13, an upper fan 14 and a lower fan 15, which each are centrifugal fans, are disposed on the upper and the lower of the output shaft 5 via a partition board 16. The main body housing 2 has a front surface on which an opening 17 communicated with the fan housing chamber 13 is disposed, while the main body housing 2 has a lower back surface on which a lower inlet 18 (FIG. 1) is disposed.

Figure 5:
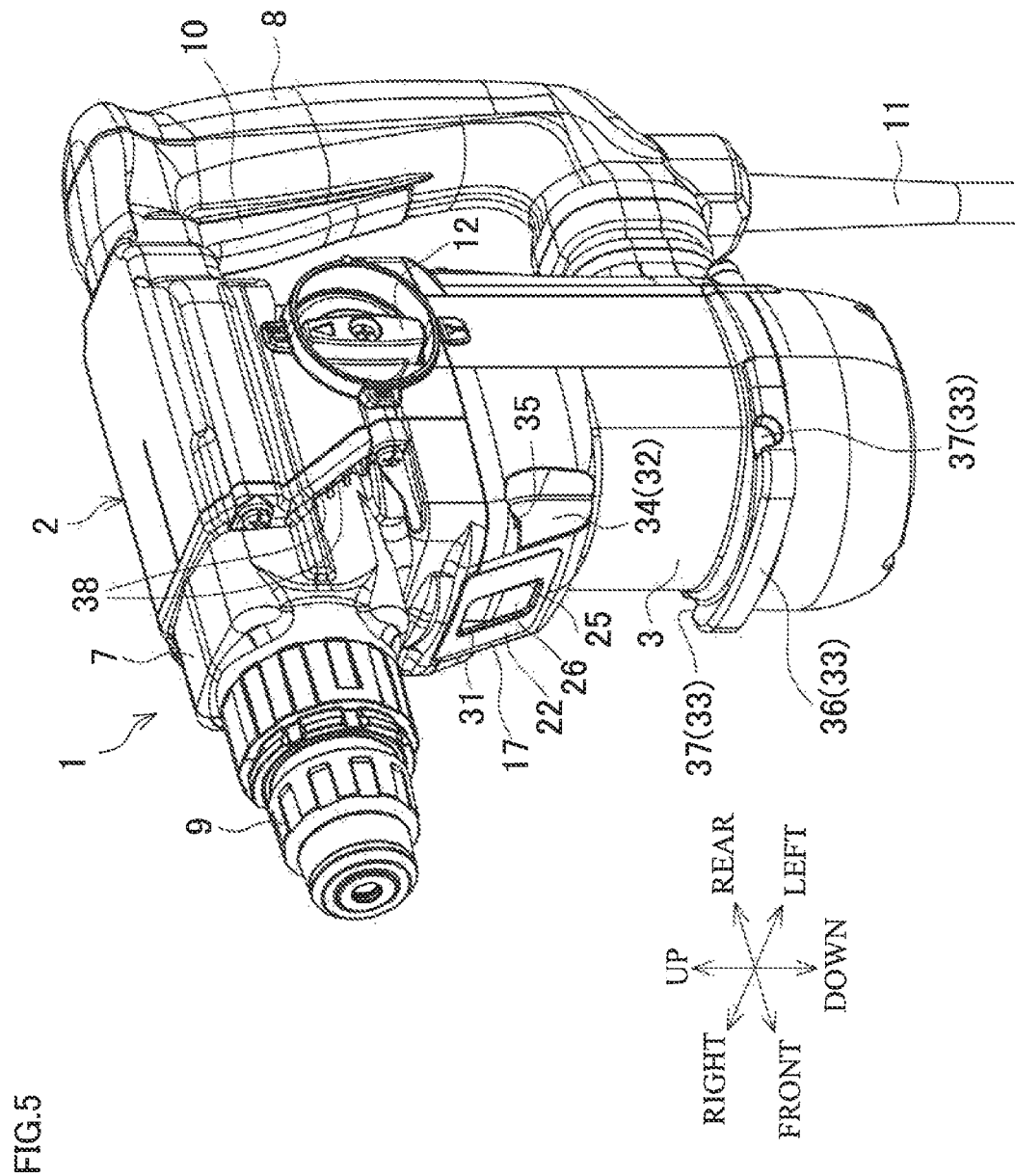
FIG. 5 is a perspective view of the hammer drill of the first embodiment viewed from a front.
Figure 6:
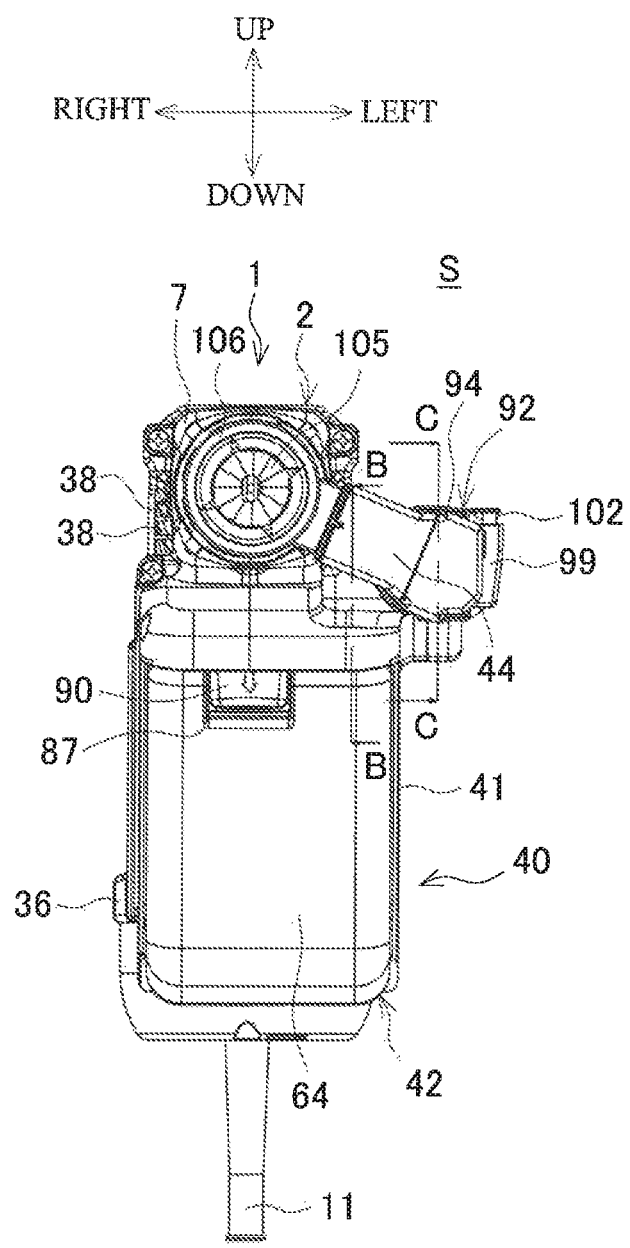
FIG. 6 is a front view of the dust collection system of the first embodiment.

The fan housing chamber 13 internally includes a plate member 19, which is constituted of a lower plate 20 and a peripheral plate 22, upward the upper fan 14 as a suction fan. The lower plate 20 has a through hole 21 for the output shaft 5, extends from the upward of the upper fan 14 to the front surface of the main body housing 2, and is small by one size in size of right to left and the rear part compared with the fan housing chamber 13. The peripheral plate 22 is disposed upright on the outer periphery of the lower plate 20 to obstruct between the gear housing 6 and the lower plate 20. The plate member 19 communicates with the upper fan 14 to divide the inside of the fan housing chamber 13, thus forming a separation chamber 23. The lower plate 20 of the plate member 19 has a front portion that depresses downward by one step inside the front portion of the main body housing 2 to form a deep bottom portion 24. The peripheral plate 22 also extends downward with the deep bottom portion 24 to reach the front surface of the main body housing 2, so as to obstruct the opening 17. On the obstructed part of the front surface, an upper inlet 25 is disposed as a power-tool-side intake port. The upper inlet 25 is small by one size compared with the opening 17 and has a vertically elongated rectangular shape. As illustrated in FIGS. 5 and 6, on right and left side surfaces of the front housing 7, power-tool-side exhaust ports 38, 38 . . . are formed to open forward and communicated with the fan housing chamber 13 passing between the main body housing 2 and the gear housing 6.

The deep bottom portion 24 houses a shutter member 26 rearward of the upper inlet 25. The shutter member 26 is supported movable to back and forth between an advance position obstructing the upper inlet 25 and a retreated position opening the upper inlet 25 by right and left guide plates 27, 27 disposed upright on the lower plate 20. On the lower plate 20 at the rear of the shutter member 26 and between the guide plates 27, 27, a stopper 28 is disposed upright. A coil spring 30 is disposed between a depressed portion 29 depressed from a rear surface of the shutter member 26 in a front-rear direction, and the stopper 28. The coil spring 30 biases the shutter member 26 to the advance position under a normal state. On the advance position, a front portion of the shutter member 26 is fitted to a folded portion 31, disposed on an inner peripheral edge of the upper inlet 25, so as to obstruct the upper inlet 25. The front surface of the main body housing 2 on which the opening 17 is disposed is an inclined surface inclined forward. The peripheral plate 22 and the upper inlet 25 fitted to the front surface of the main body housing 2 are also inclined surfaces. Accordingly, the lower portion of the front surface of the shutter member 26 is also an inclined surface inclining forward according to the inclination of the upper inlet 25.

Furthermore, the main body housing 2 includes an upper receiving portion 32 and a lower receiving portion 33 on the front surface. The upper receiving portion 32 is a second receiving portion, and the lower receiving portion 33 is a first receiving portion for installing the dust collector. The upper receiving portion 32 is constituted of upper cutouts 34, 34 symmetrically disposed on the right and left of the opening 17 to be opened forward and outward right and left. The upper cutouts 34 each have a locking depressed portion 35 on an inner top surface. On the other hand, the lower receiving portion 33 is constituted of a receiving flange 36 and lower cutouts 37, 37. The receiving flange 36 is disposed to protrude along a front peripheral surface of the main body housing 2. The lower cutouts 37, 37, each having a semicircular shape and opening upward and outward right and left, are disposed symmetrically on the right and left of the receiving flange 36 on the rear part with respect to the upper cutouts 34, 34.

Description of Dust Collector

Figure 7:
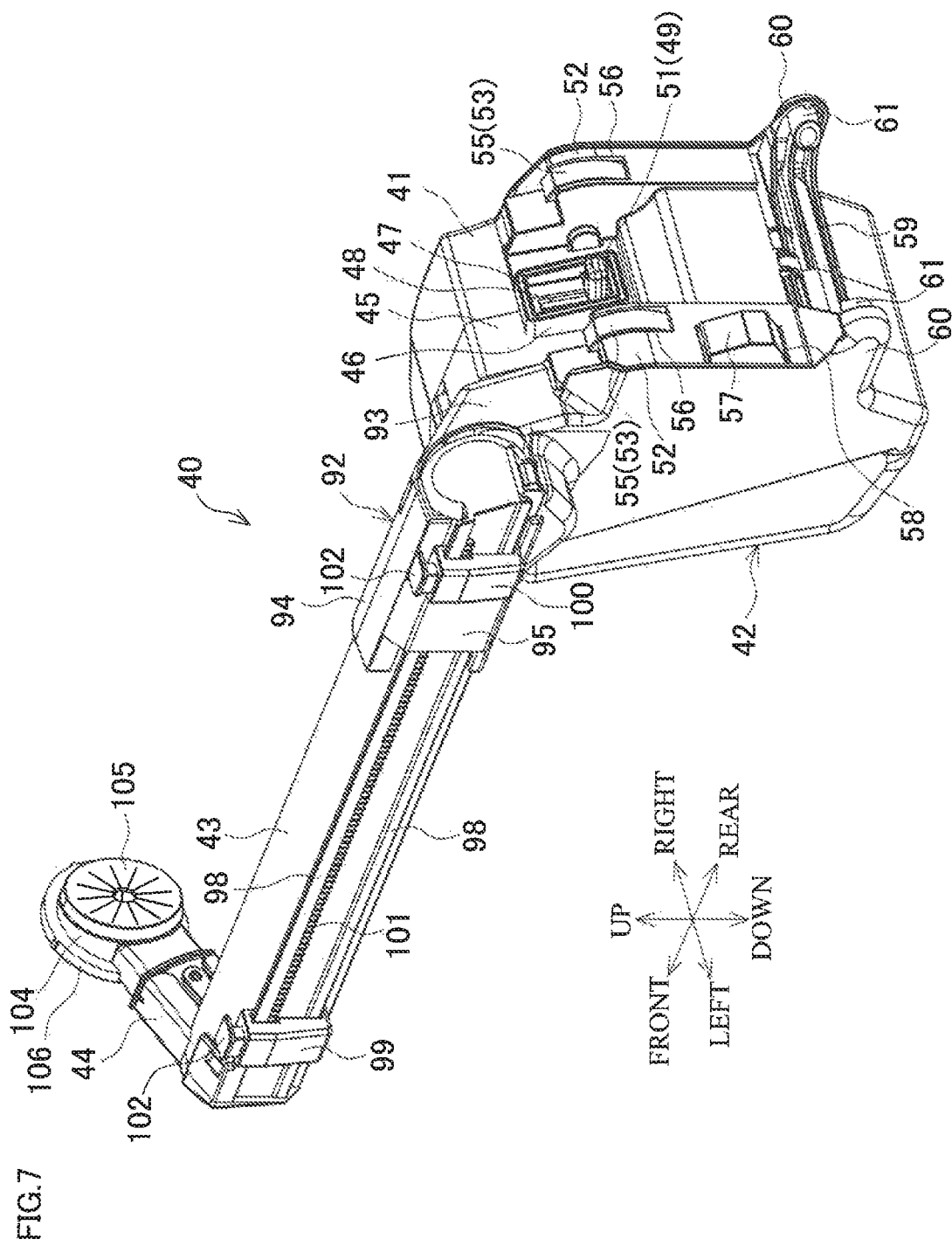
FIG. 7 is a perspective view of the dust collector for the electric power tool of the first embodiment viewed from a rear.

As illustrated in FIG. 7, the dust collector 40 is constituted of a main body case 41 installed on the hammer drill 1, a dust box 42 removably installed on the main body case 41, and a sliding portion 43 that is coupled to the main body case 41 and has a distal end on which a nozzle 44 is disposed.

First, the main body case 41 is a vertically elongated box that has an opened front surface and a rear surface as a mounting surface to the hammer drill 1. The rear surface has an upper side on which an inclined surface 45 inclined corresponding to the front surface of the main body housing 2 of the hammer drill 1 is disposed. On the inclined surface 45, a square tubular connection cylinder 46 is disposed to protrude so as to open with an approximately identical size to the upper inlet 25 of the hammer drill 1 side. The connection cylinder 46 has a front end where a rubber sealing member 47 is covered over the whole circumference.

On the inclined surface 45 in the connection cylinder 46, a dust-collector-side exhaust port 48 is opened to be formed small by one size compared with the connection cylinder 46. As illustrated in FIGS. 3 and 4, a contact piece 49 as a contact member is disposed below the dust-collector-side exhaust port 48 projecting rearward with respect to the sealing member 47. The contact piece 49 has a distal end on which a folded portion 50 is disposed and an extended cap 51 is covered. The extended cap 51 is integrally formed with the sealing member 47 as an extended portion, such that the folded portion 50 locking with the extended cap 51 is configured to retain the sealing member 47 including the extended cap 51.

Figure 8:
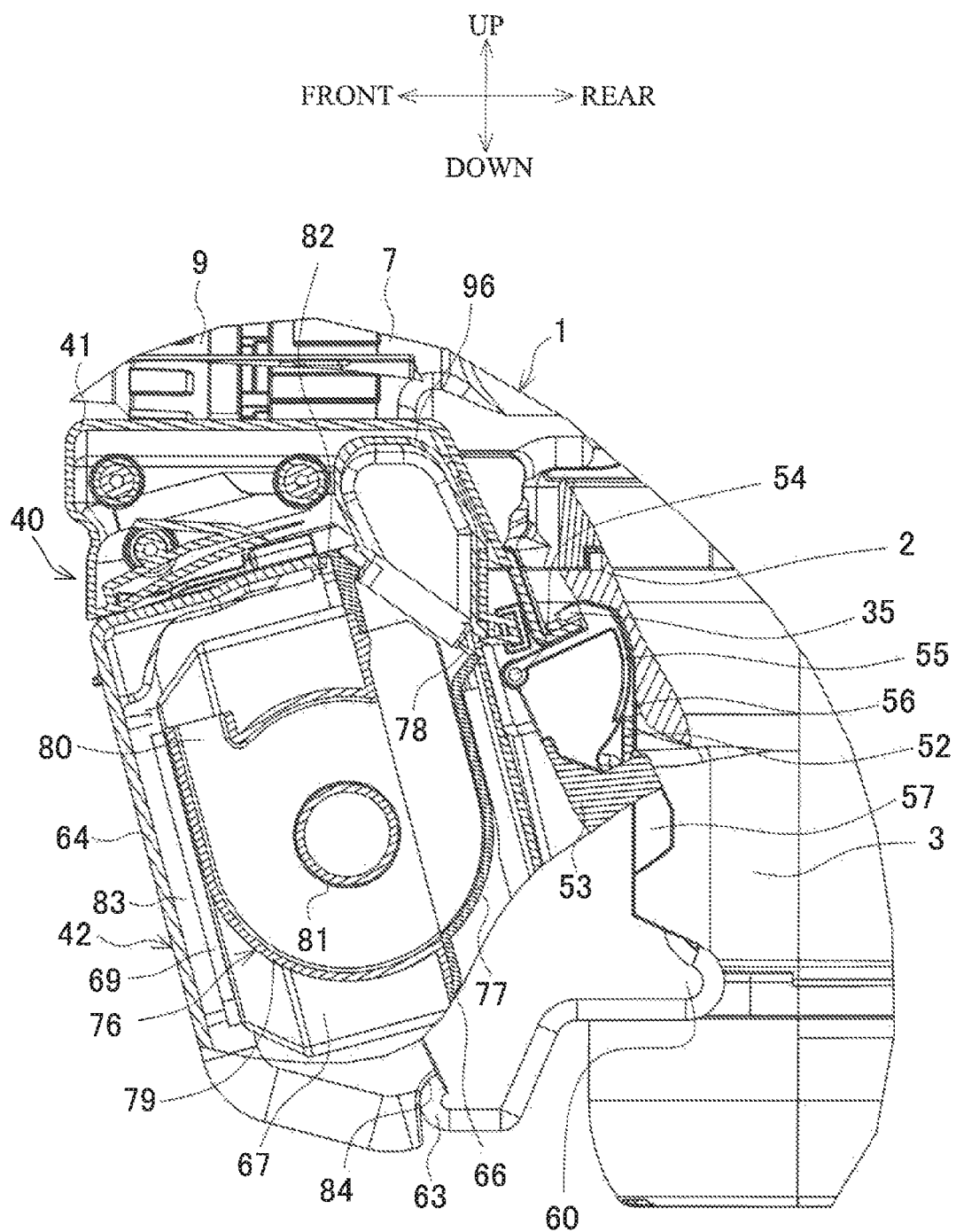
FIG. 8 is an enlarged cross-sectional view taken along the line B-B in FIG. 6.
Figure 9:
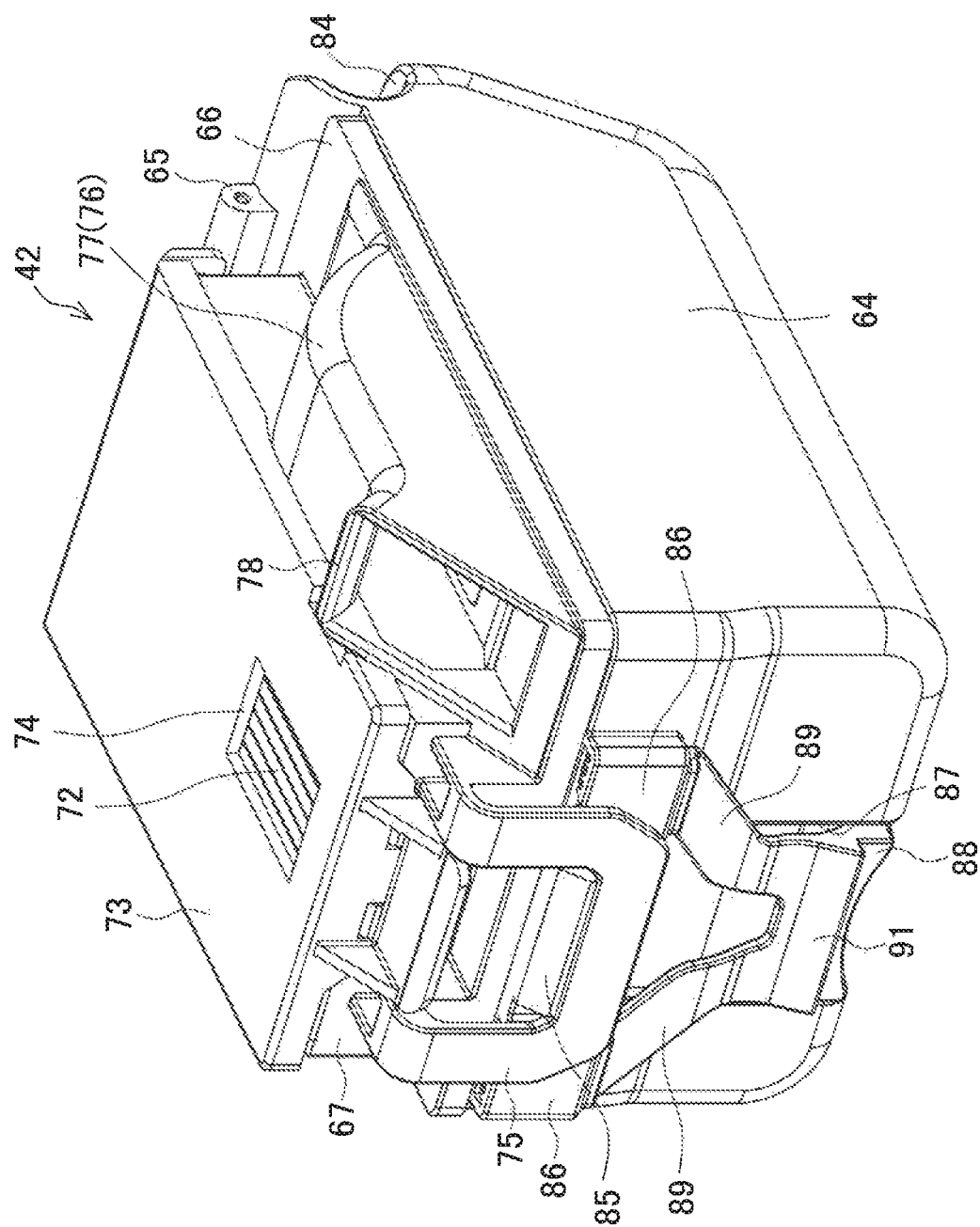
FIG. 9 is a perspective view of a dust box.
Figure 11A:
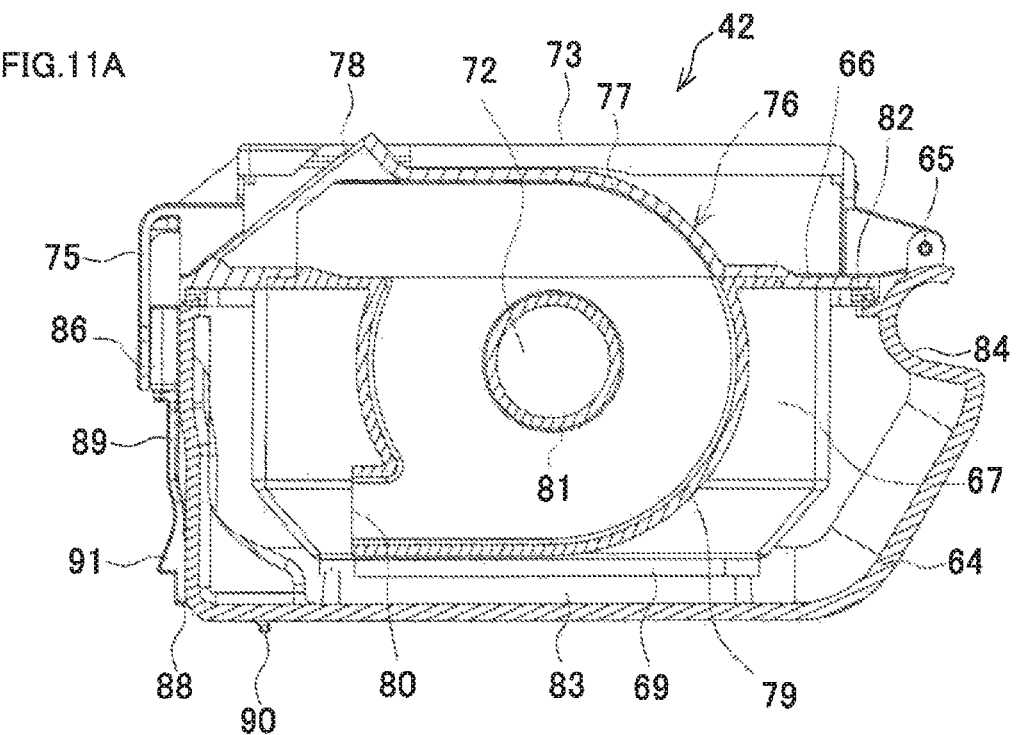
FIG. 11A is an explanatory cross-sectional view of the dust box taken along the line E-E in FIG. 10B.
Figure 11B:
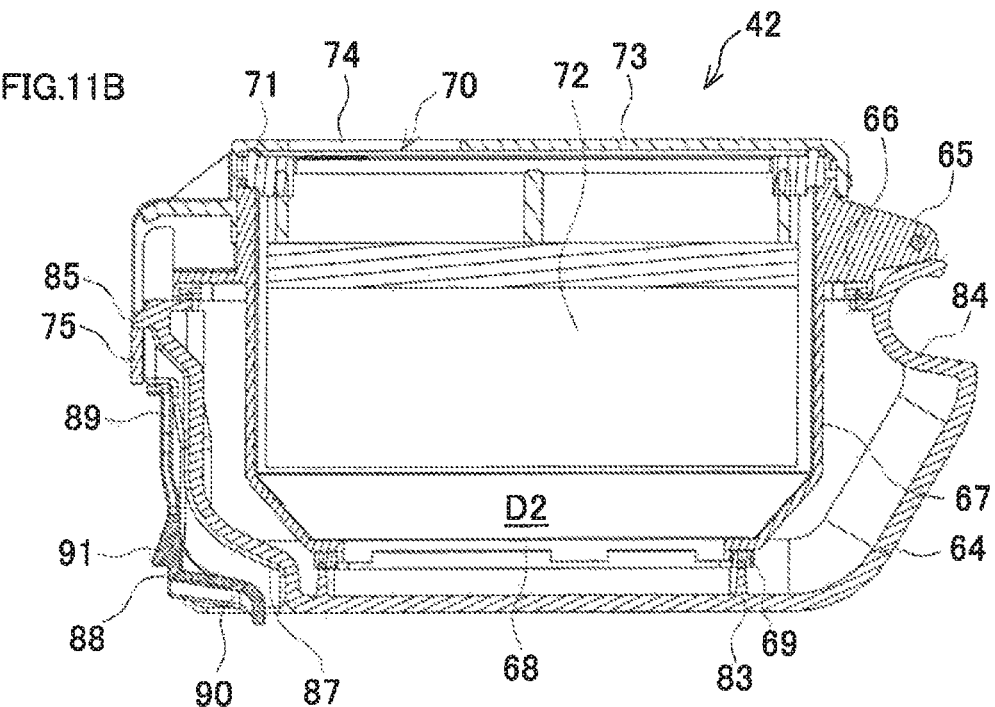
FIG. 11B is an explanatory cross-sectional view of the dust box taken along the line F-F in FIG. 10B.

On the right and left of the connection cylinder 46 on the rear surface of the main body case 41, a pair of shoulder parts 52, 52, which are configured to be fitted to the upper cutouts 34, 34 of the upper receiving portion 32 of the hammer drill 1, are disposed to protrude rearward with respect to the connection cylinder 46. As illustrated in FIG. 8, a swing plate 53 is disposed on the inside (front side of the shoulder parts 52) of the main body case 41. The swing plate 53 is configured to swing back and forth by a shaft 54 disposed on the upper end of the swing plate 53 in the right-left direction. On the right and left of the upper side of the swing plate 53, a pair of hooks 55, 55 is disposed to protrude corresponding to slits 56, 56 formed from the rear surfaces to the top surfaces of the shoulder parts 52, 52. The swing plate 53 includes a button unit 57 on the lower side closer to left. The button unit 57 is disposed to protrude as an operating unit corresponding to an opening 58 disposed on the main body case 41. The swing plate 53 includes a torsion spring (not illustrated) that causes the hooks 55, 55 to project upward from the slits 56, 56 of the shoulder parts 52, 52 and biases the button unit 57 to a rear position projecting from the rear surface in the normal state. When the button unit 57 is pushed into the main body case 41 from the rear, the swing plate 53 swings to a forward position where the hooks 55, 55 retreat from the top surface to the lower side of the shoulder parts 52, 52.

Furthermore, the main body case 41 includes a locking rib 59 disposed on the lower side of the rear surface in the right-left direction. The locking rib 59 is configured to be locked to the receiving flange 36 of the lower receiving portion 33 of the hammer drill 1 from above. The locking rib 59 has right and left ends on which locking arms 60, 60 are disposed to protrude extending rearward. The locking arms 60, 60 have rear ends on which locking shafts 61, 61 are disposed to protrude as a first locking portion projecting to an opposite side of one another. The locking shafts 61, 61 are lockable to the lower cutouts 37, 37 in a state where the locking rib 59 is locked to the receiving flange 36.

On the other hand, the main body case 41 includes a locking stepped portion 62 disposed on the inner surface of the upper side of the front surface side. The locking stepped portion 62 is elastically locked to an attaching/detaching locking claw 91 of the dust box 42 described later. The main body case 41 includes a shaft portion 63 disposed on the inner surface of the lower side in the right-left direction. The shaft portion 63 is configured to fit to a receiving depressed portion 84 of the dust box 42.

Next, as illustrated in FIGS. 9 to 11B, the dust box 42 includes a box main body 64 in a shape of a deep bottom box and a dish-shaped lid body 66 rotatably coupled to an opening 64a, which is an outlet of the box main body 64, side and one end side in a longer side direction by a hinge shaft 65. The lid body 66 integrally includes a square tubular filter housing portion 67, which is small by one size compared with the box main body 64, projecting to inside the box main body 64 in a state where the opening 64a of the box main body 64 is closed. The filter housing portion 67 has an end portion on the projecting side tapered to form a downstream side discharge port 68 as an inner side outlet that is small in area compared with the opening of the lid body 66 side. On the peripheral area of the downstream side discharge port 68, a ring-shaped rubber seal 69 is fitted.

The filter housing portion 67 houses a filter unit 70 where a filter 72 is installed on a framing body 71. The framing body 71 has a rectangular shape and is fitted to the opening of the lid body 66 side. The filter 72 is made of paper and has folds parallel to the longer side direction of the framing body 71 to be folded in the shorter side direction. On the opening of the lid body 66 side, a cap cover 73 is covered, and the cap cover 73 fastens the filter unit 70. On the opposite side of the hinge shaft 65 closer to the end portion on the cap cover 73, an outlet 74 is formed to open, and on the end portion of the identical side on the lid body 66, a loop portion 75 is disposed. The loop portion 75 has an L shape from the side view and has a distal end extending parallel to the filter housing portion 67 outside the filter housing portion 67.

Furthermore, the lid body 66 includes a cyclone portion 76. The cyclone portion 76 is a circular-shaped flow passage constituted of an outer part 77 and an inner part 79 orthogonally passing through the lid body 66 on the side surface of the filter housing portion 67. The outer part 77 is disposed on the front side (cap cover 73 side) of the lid body 66 projecting along the side surface of the filter housing portion 67 in the longer side direction, and has an inclined inlet 78 opened on the loop portion 75 side. The inner part 79 is disposed on the back side of the lid body 66 projecting from the side surface of the filter housing portion 67, and has an upstream side discharge port 80 parallel to the outer part 77 to be opened on the lower end. On the center of the cyclone portion 76, a tubular communication port 81, passing through the side surface of the filter housing portion 67 to communicate with the inside of the filter housing portion 67, is disposed with a height lower than the cyclone portion 76. A sealing material 82 is a sealing material disposed along the outer periphery on the backside surface of the lid body 66, and surrounds the filter housing portion 67 and the cyclone portion 76.

The box main body 64 has a bottom portion on which a receiving rib 83 is disposed upright. The receiving rib 83 has an identical shape to the downstream side discharge port 68 of the filter housing portion 67 of the lid body 66. On the shorter side surface of the end portion of the hinge shaft 65 side, the receiving depressed portion 84 is disposed parallel to the hinge shaft 65. Furthermore, on the opening 64a side of the shorter side surface of the end portion on the opposite side to the hinge shaft 65, a lid locking claw 85 is disposed. The loop portion 75 of the cap cover 73 is elastically locked to the lid locking claw 85 in a state where the lid body 66 is closed. On the identical shorter side surface, a pair of holders 86, 86 disposed to protrude on the right and left of the lid locking claw 85 hold bifurcated base portions 89, 89, and an operating member 88 is disposed. The operating member 88 has a distal end as an L-shaped elastic piece 90 lying on a depressed portion 87 disposed on the shorter side surface of the box main body 64. On the outer surface of the base portion 89 side on the operating member 88, the attaching/detaching locking claw 91 is disposed in an approximately identical shape to the lid locking claw 85.

Accordingly, when the opening 64a of the box main body 64 is closed by the lid body 66, the loop portion 75 is elastically locked to the lid locking claw 85 to maintain the closing state of the lid body 66. In this closing state, the filter housing portion 67 projects into the box main body 64 to cause a rubber seal 69 of the downstream side discharge port 68 to be in close contact with the receiving rib 83. Thus, the downstream side discharge port 68 is sealed inside the box main body 64 so that the inside of the filter housing portion 67 communicates with the inside of the receiving rib 83. The cyclone portion 76 is obstructed by the inner surface of the box main body 64, so as to cause the inlet 78 of the cyclone portion 76 to be communicated with the filter housing portion 67 via the communication port 81 in the box main body 64, and further communicated with the outlet 74 via the filter unit 70. In this state, a first dust collecting chamber D1 communicated with the upstream side discharge port 80 of the cyclone portion 76 is defined in the box main body 64, and a second dust collecting chamber D2 partitioned from the first dust collecting chamber D1 is defined in the filter housing portion 67 inside the box main body 64.

Figure 12:
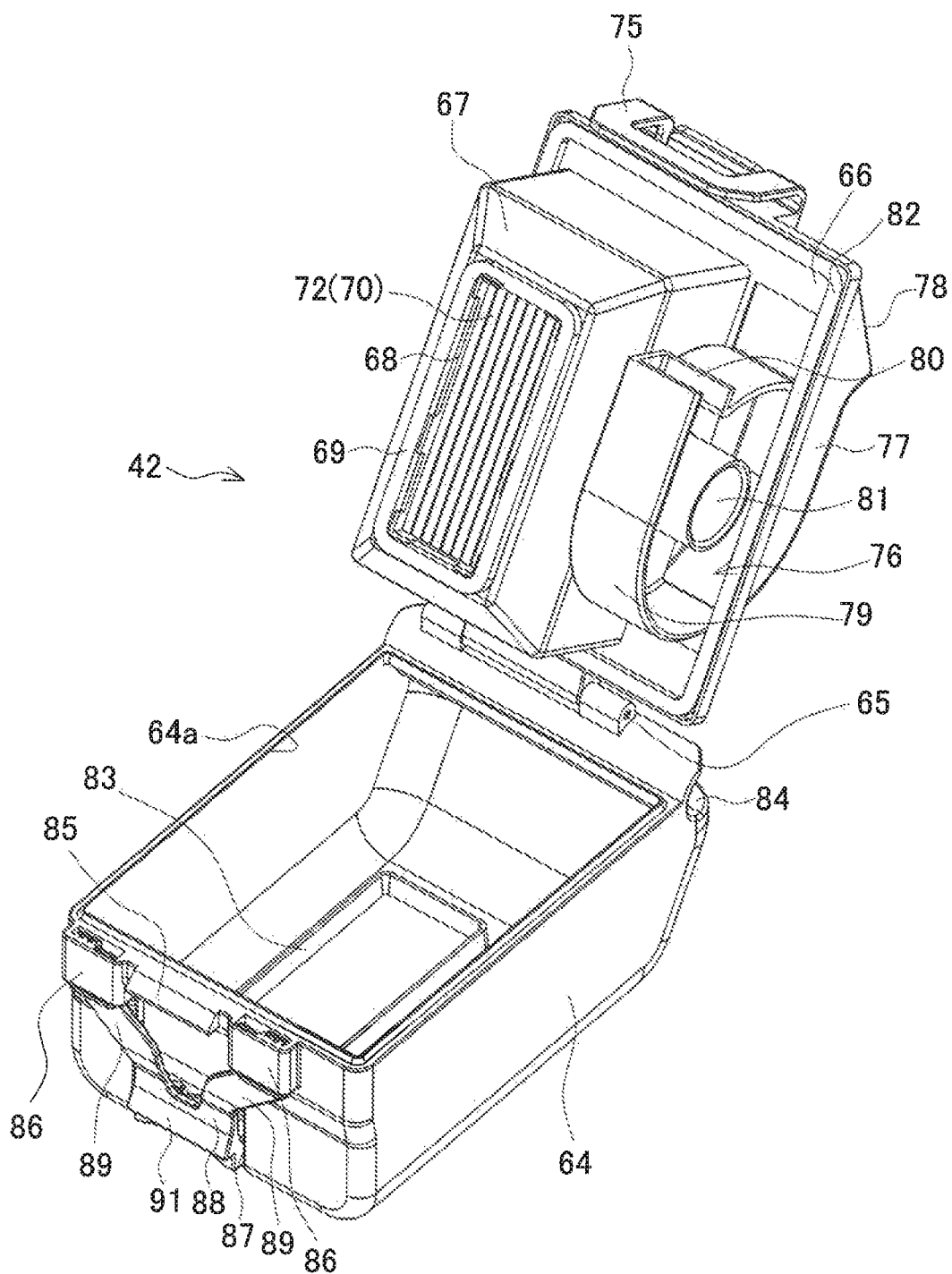
FIG. 12 is a perspective view of the dust box in a state where a lid body is opened.
Figure 13:
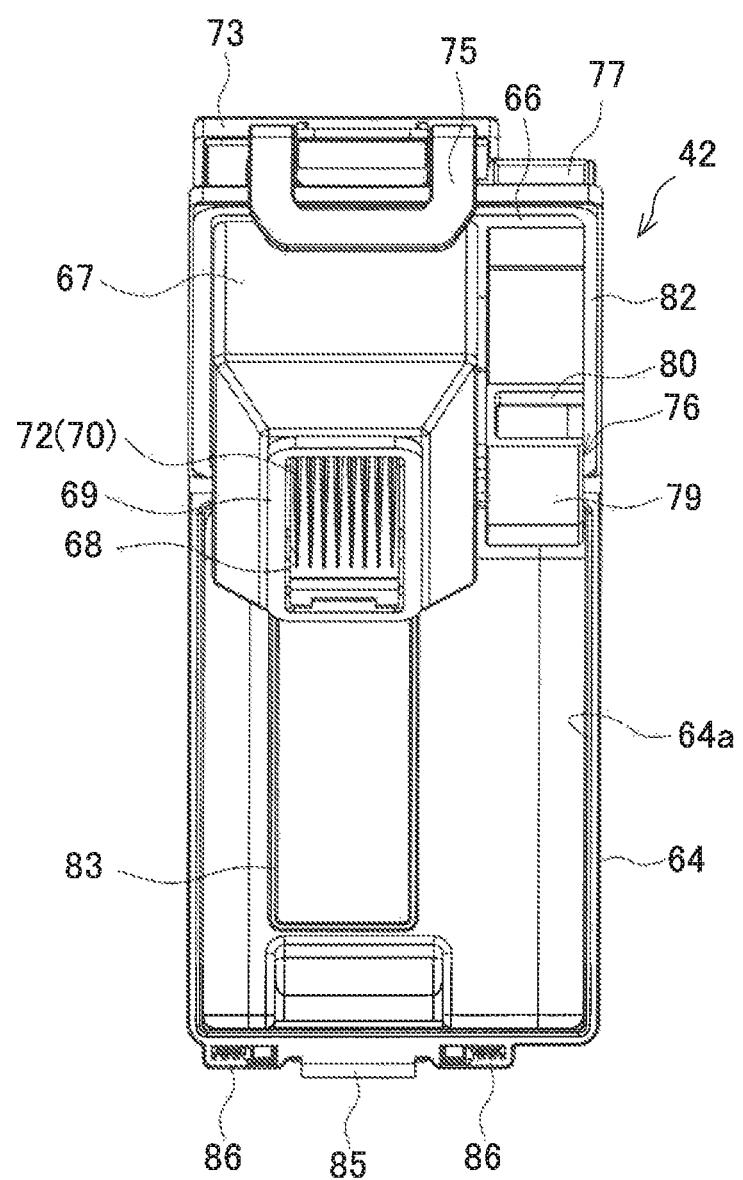
FIG. 13 is a plan view of the dust box in a state where the lid body is opened.
Figure 14:
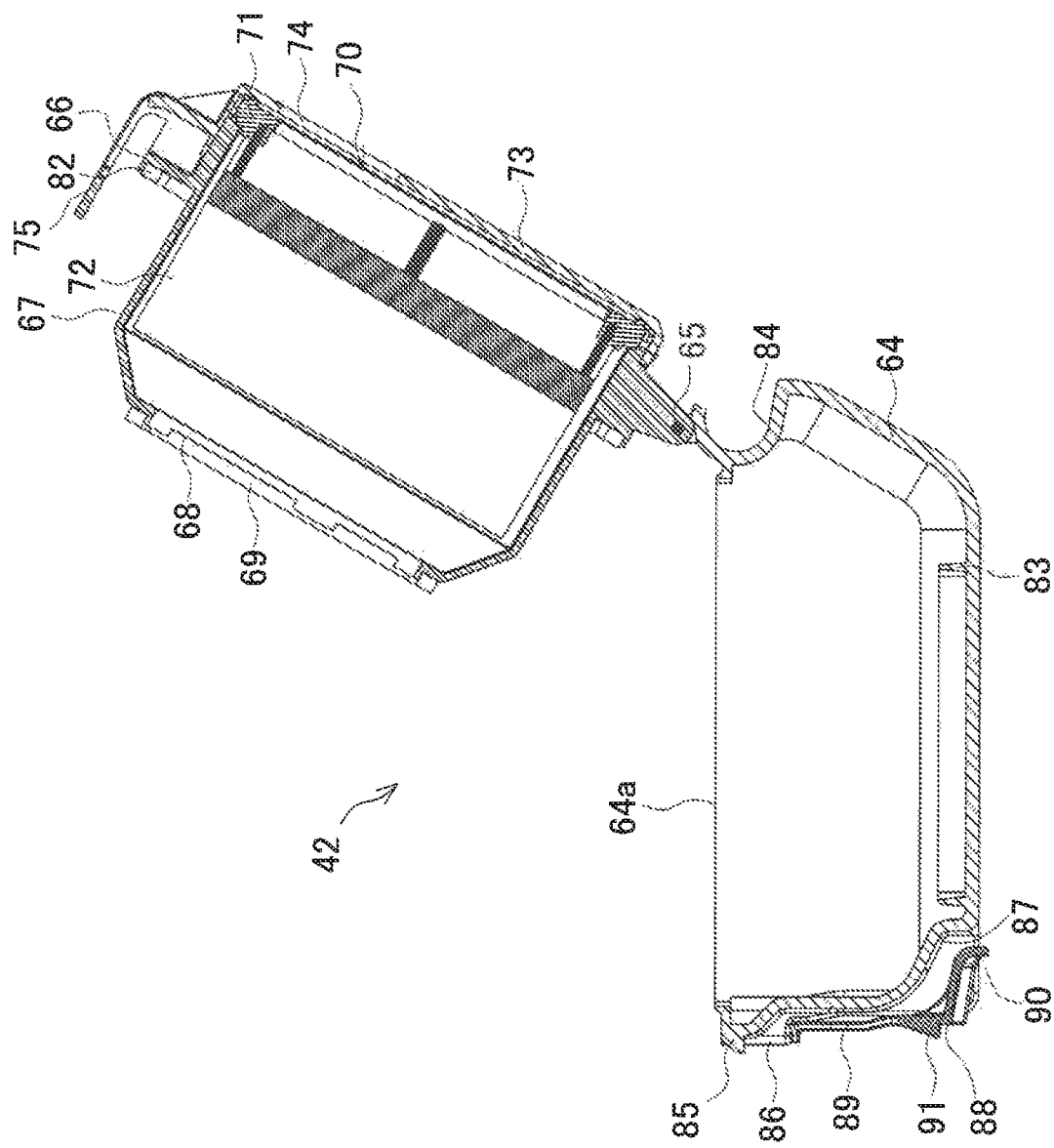
FIG. 14 is a vertical cross-sectional view of the dust box in a state where the lid body is opened.

On the other hand, when the loop portion 75 is released from the lid locking claw 85 to open the opening 64a of the box main body 64 by the lid body 66, as illustrated in FIGS. 12 to 14, the downstream side discharge port 68 and the rubber seal 69 of the filter housing portion 67 leave the receiving rib 83 to release the receiving rib 83 inside the box main body 64. That is, the first dust collecting chamber D1 and the second dust collecting chamber D2 can be simultaneously released.

The dust box 42 is held on the main body case 41 in the following way: first, holding the dust box 42 in an inclined posture where the receiving depressed portion 84 is fitted to the shaft portion 63 of the main body case 41 in a direction where the cap cover 73 comes backward and the receiving depressed portion 84 comes to the lower side, and then, pushing the upper side of the dust box 42 into the main body case 41 from the front of the main body case 41 so as to be housed. Then, as illustrated in FIG. 3, the attaching/detaching locking claw 91 of the box main body 64 is elastically locked to the locking stepped portion 62 of the main body case 41, such that the dust box 42 is held on the main body case 41. In this state, the outlet 74 of the cap cover 73 is opposed to the dust-collector-side exhaust port 48 of the main body case 41, thus communicating with the outside via the connection cylinder 46.

Then, the sliding portion 43 is held by a guide cylinder 92, which is a guiding portion consecutively disposed on the top surface of the main body case 41 in the front-rear direction, movably to back and forth.

As illustrated in FIG. 7, the guide cylinder 92 is supported in the front-rear direction by a rising portion 93 which is disposed to protrude upward from the top surface closer to left of the main body case 41. The guide cylinder 92 includes a semi-cylindrical portion 94, which has an opening side facing the left side, and a plate-shaped coupling portion 95 that has upper and lower ends partially coupled to the opening side of the semi-cylindrical portion 94. As illustrated in FIG. 8, the rising portion 93 includes an intermediate cylinder 96 that has a lower end portion, which projects into the main body case 41 to be coupled to the inlet 78 of the cyclone portion 76 of the dust box 42, and an upper end portion that projects into the semi-cylindrical portion 94.

Figure 15A:
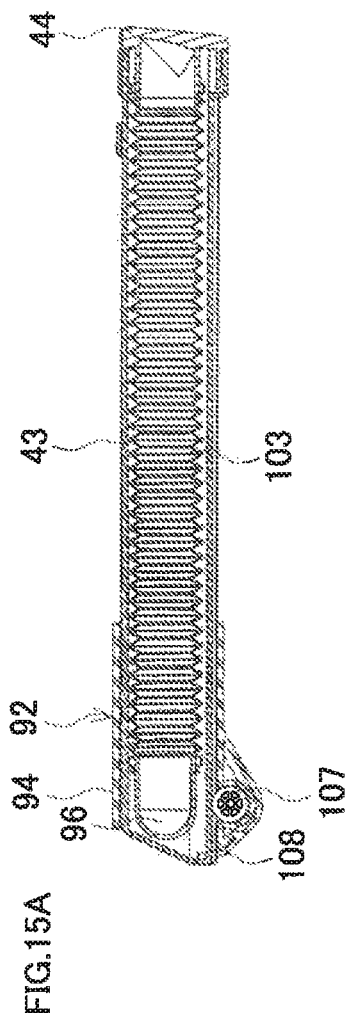
FIG. 15A is a cross-sectional view taken along the line C-C in FIG. 6, and illustrates an initial position of the sliding portion
Figure 15B:
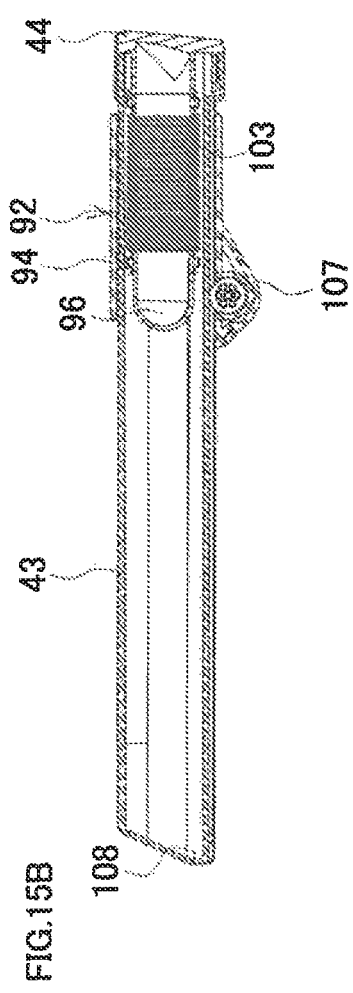
FIG. 15B is a cross-sectional view taken along the line C-C in FIG. 6, and illustrates a retreated position of the sliding portion.

The sliding portion 43 is formed in a D shape such that the outline of the cross section is surrounded by the semi-cylindrical portion 94 and the coupling portion 95, and is a hollow cylindrical body that has an obstructed rear end and an opened front end. The sliding portion 43 has a right side surface on which an elongate hole 97 is disposed in the front-rear direction as illustrated in FIG. 3. As illustrated in FIGS. 15A and 15B, the upper end portion of the intermediate cylinder 96 projects into the sliding portion 43 via the elongate hole 97. On a left side planar portion of the sliding portion 43, two of upper and lower rails 98, 98 are disposed parallel over the whole length. A front stopper 99 and a rear stopper 100, which are slidable along the rails 98, 98, are engaged with both rails 98, 98 from the upper and lower sides, so as to be disposed on the front and the rear of the coupling portion 95. The upper rail 98 has a lower suffice on which a rack 101 constituted of a plurality of teeth is disposed. The front and rear stoppers 99 and 100 each include a lock button 102 projecting to be biased upward in a state of being engaged with the rack 101. Then, when the lock button 102 is pushed to release the engagement with the rack 101, the front and rear stoppers 99 and 100 come to be slidable along the rails 98, 98. When the push of the lock button 102 is released, the lock button 102 returns to the position projecting upward to be engaged with the rack 101, thus restricting the slide of the front and rear stoppers 99 and 100. The rails 98, 98, the rear stopper 100, and the rack 101 constitute initial position setting means of the sliding portion 43.

The nozzle 44 is a cylindrical body that is coupled to the front end of the sliding portion 43 and projects to the right side at an approximately right angle from the sliding portion 43. The nozzle 44 has a base end projecting into the sliding portion 43. As illustrated in FIGS. 15A and 15B, an accordion-shaped flexible hose 103 as a part of a dust collecting route is coupled between the upper end portion of the intermediate cylinder 96 and the base end of the nozzle 44 in the sliding portion 43. The nozzle 44 includes a ring-shaped suction opening 104, through which the tool bit passes, on the distal end. The suction opening 104 has a rear opening to which a rubber cap 105 including a plurality of radial cuts from a through-hole on the center is fitted, and a front opening to which a rubber obstructing ring 106 is removably fitted and obstructed between a surface to be processed and the suction opening 104 in a state of being in contact with the surface to be processed.

Accordingly, the sliding portion 43 is held movable to back and forth on the upper left side of the main body case 41 within a range where the front and rear stoppers 99 and 100 are in contact with the coupling portion 95 in a state where the guide cylinder 92, through which the sliding portion 43 passes, restricts the rotation of the sliding portion 43. With this movement of the sliding portion 43 to back and forth, as illustrated in FIGS. 15A and 15B, the flexible hose 103 expands and contracts between the base end of the nozzle 44 and the upper end portion of the intermediate cylinder 96. However, on the lower surface side of the sliding portion 43 in the guide cylinder 92, a reel 107 around which a spiral spring 108 is wound is disposed, and the distal end of the spiral spring 108 is coupled to the rear end of the sliding portion 43. Therefore, the sliding portion 43 in the normal state is biased to the advance position where the rear stopper 100 is in contact with the coupling portion 95 by a tension of the spiral spring 108.

Installation of Dust Collector to Hammer Drill

Figure 16:
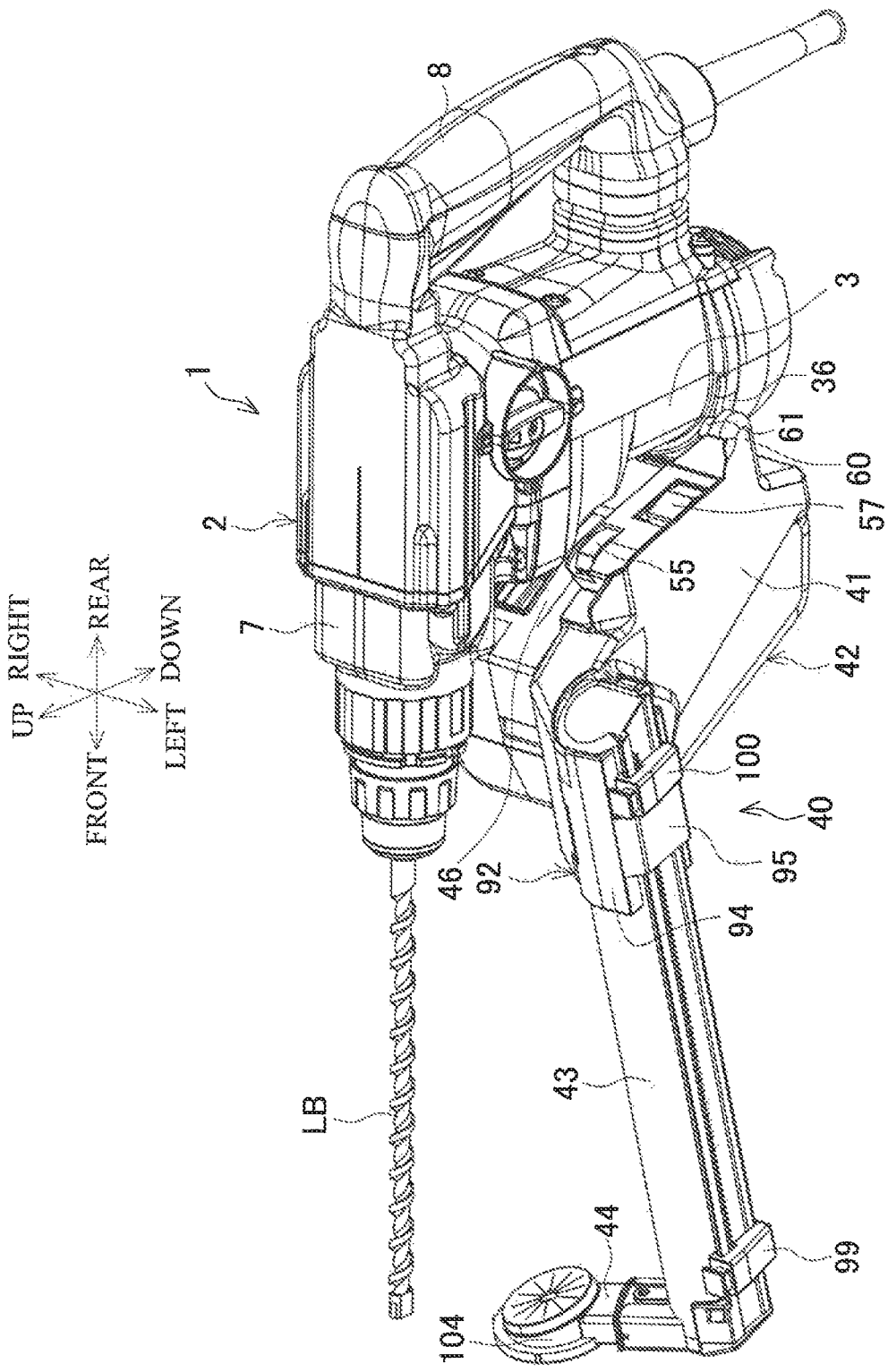
FIG. 16 is a perspective view illustrating a state where the dust collector for the electric power tool is installed.
Figure 17:
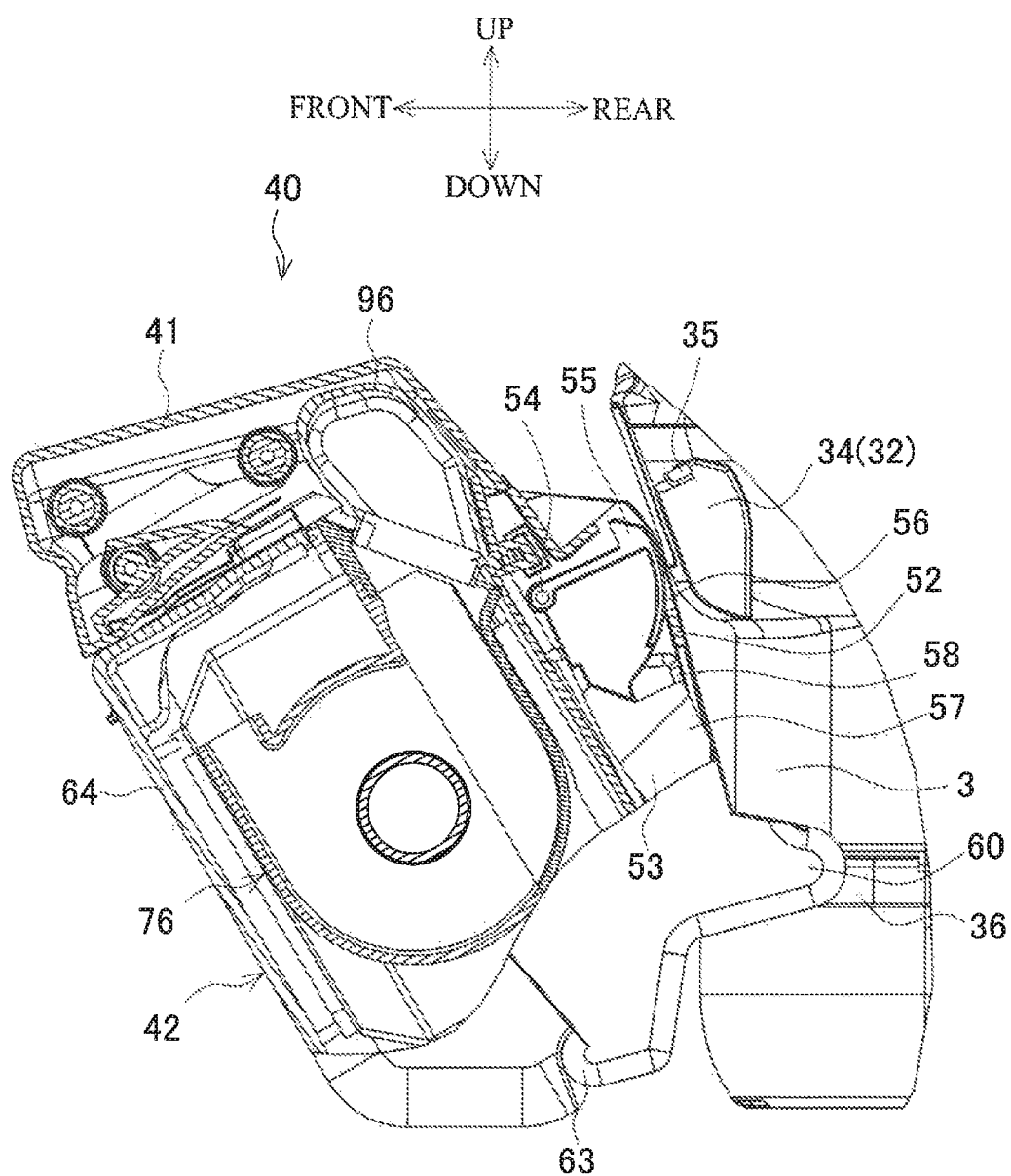
FIG. 17 is a vertical cross-sectional view illustrating a state where the dust collector for the electric power tool is installed.

In the dust collection system S configured as described above, when the dust collector 40 that includes the dust box 42 is installed on the hammer drill 1, as illustrated in FIGS. 16 and 17, first, the locking rib 59 of the main body case 41 is placed on the receiving flange 36 of the lower receiving portion 33 of the main body housing 2, and the locking shafts 61, 61 of the locking arms 60, 60 are locked to the respective lower cutouts 37, 37 disposed on the lower receiving portion 33 of the hammer drill 1. Next, from this inclined posture, the button unit 57 is pushed to swing the swing plate 53 to the forward position (release position), so as to sink the hooks 55, 55 from the top surfaces of the shoulder parts 52, 52. In this state, the upper side of the dust collector 40 is pushed up rearward to be rotated and the shoulder parts 52, 52 are fitted to the upper cutouts 34, 34 of the upper receiving portion 32 of the hammer drill 1, thus releasing the push of the button unit 57. Then, as illustrated in FIG. 8, the swing plate 53 swings to the rear position (lock position) to cause the hooks 55, 55 to project upward from the shoulder parts 52, 52, such that the hooks 55, 55 are locked to the locking depressed portions 35, 35 of the upper cutouts 34, 34. This completes the installation. In this installation state, as illustrated in FIGS. 1 and 6, the sliding portion 43 is positioned on the left side of the front housing 7 of the hammer drill 1 slightly downward, and the suction opening 104 of the nozzle 44 is positioned ahead of the operation sleeve 9, thus positioning the mounted tool bit coaxially with the center of the suction opening 104.

With the rotation of the dust collector 40 from the inclined posture in the installation, the contact piece 49 is brought in contact with the shutter member 26 via the extended cap 51, so as to cause the shutter member 26 to retreat against biasing by the coil spring 30. Then, when the installation of the dust collector 40 is completed, as illustrated in FIG. 3 and FIG. 4, the shutter member 26 is pushed to the retreated position to release the upper inlet 25. Simultaneously, the sealing member 47 of the connection cylinder 46 is brought in close contact with the peripheral area of the upper inlet 25, so as to cause the dust-collector-side exhaust port 48 in the connection cylinder 46 to communicate with the upper inlet 25 in a sealed state. Thus the dust collecting route R1 is coupled to an intake route R2. The dust collecting route R1 is disposed from the suction opening 104 to the dust-collector-side exhaust port 48 passing through the nozzle 44, the flexible hose 103 in the sliding portion 43, the intermediate cylinder 96, the inlet 78 of the cyclone portion 76 of the dust box 42, the cyclone portion 76, the filter housing portion 67, and the outlet 74. The intake route R2 is disposed from the upper inlet 25 to the upper fan 14 passing through the right and left of the shutter member 26 and the separation chamber 23.

Drilling by Long Bit

Then, as illustrated in FIGS. 1 and 2, the initial position of the rear stopper 100 on the rail 98 of the sliding portion 43 is adjusted such that the distal end of the long bit LB is positioned on the suction opening 104 projected to be biased with the sliding portion 43, thus adjusting the position of the front stopper 99 in accordance with the drilling depth. Subsequently, the suction opening 104 is brought in contact with a surface to be drilled and the switch lever 10 of the hammer drill 1 is performed with a push operation to turn ON the switch, so as to drive the motor 4 to rotate the output shaft 5. At this time, when the drill mode or the hammer drill mode is selected by the change lever 12, the long bit LB rotates so that the surface to be drilled is drilled. As drilling proceeds, the long bit LB passes through the suction opening 104, such that the sliding portion 43 is relatively retreated from the guide cylinder 92 against biasing by the spiral spring 108.

Figure 18:
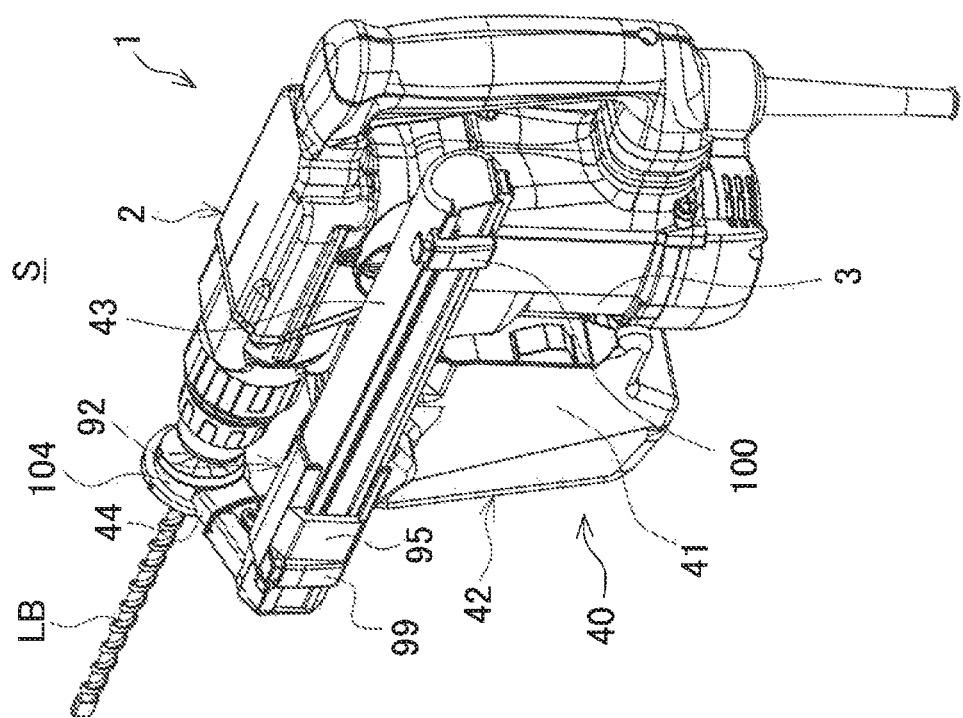
FIG. 18 is a perspective view illustrating a state where the sliding portion is retreated (when a long bit is used).
Figure 19:
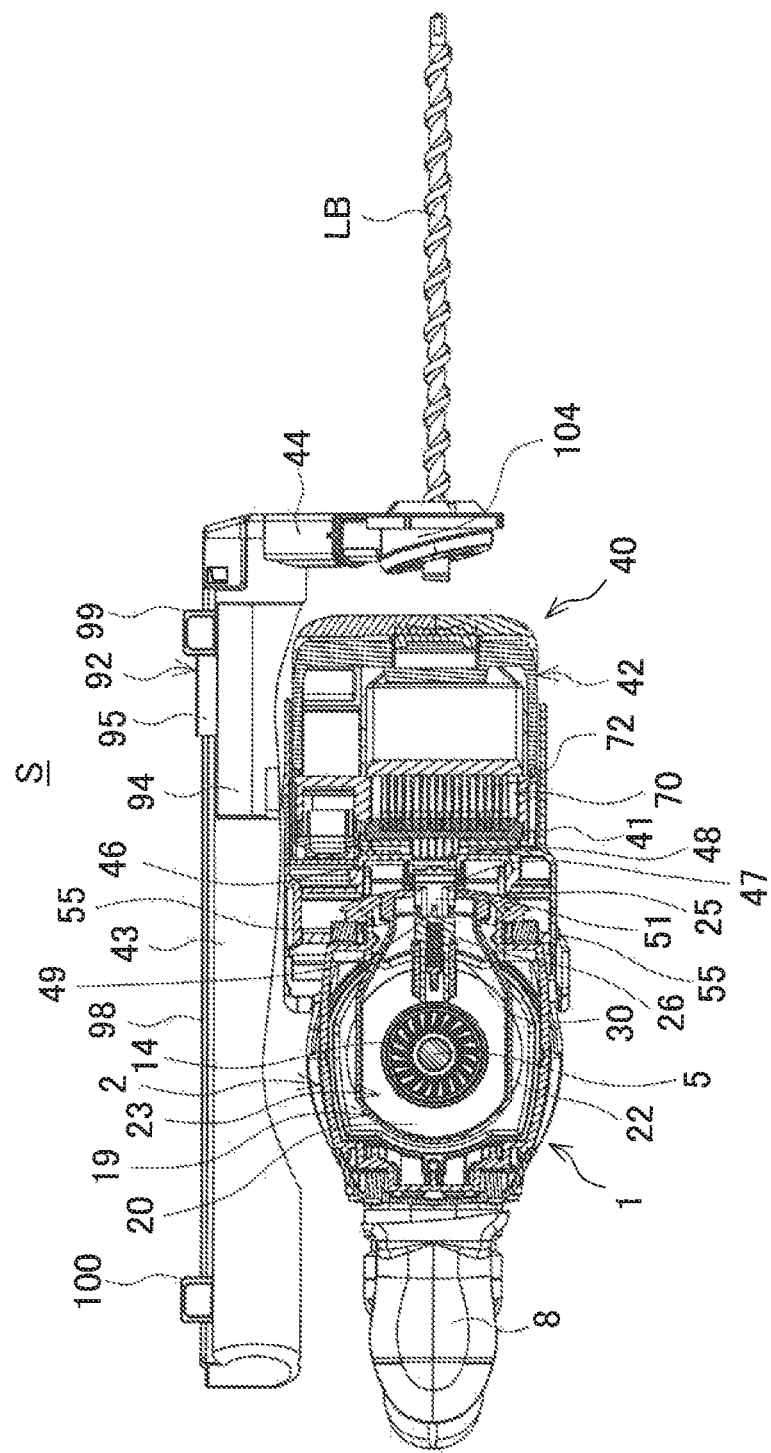
FIG. 19 is an explanatory view illustrating a state where the sliding portion is retreated (when the long bit is used).

However, since the sliding portion 43 is held by the guide cylinder 92, disposed on the left side with respect to the hammer drill 1, in the state of passing through, as illustrated in FIGS. 18 and 19, the retreated sliding portion 43 does not interfere with the hammer drill 1. The sliding portion 43 is allowed to slide without problems on the left side of the hammer drill 1. When the front stopper 99 is brought in contact with the coupling portion 95 of the guide cylinder 92, the push of the hammer drill 1 is restricted to terminate the drilling at a set depth. Thus, the long bit LB can be used to ensure setting the maximum drilling depth of equal to or more than 120 mm.

Drilling by Short Bit

Figure 20:
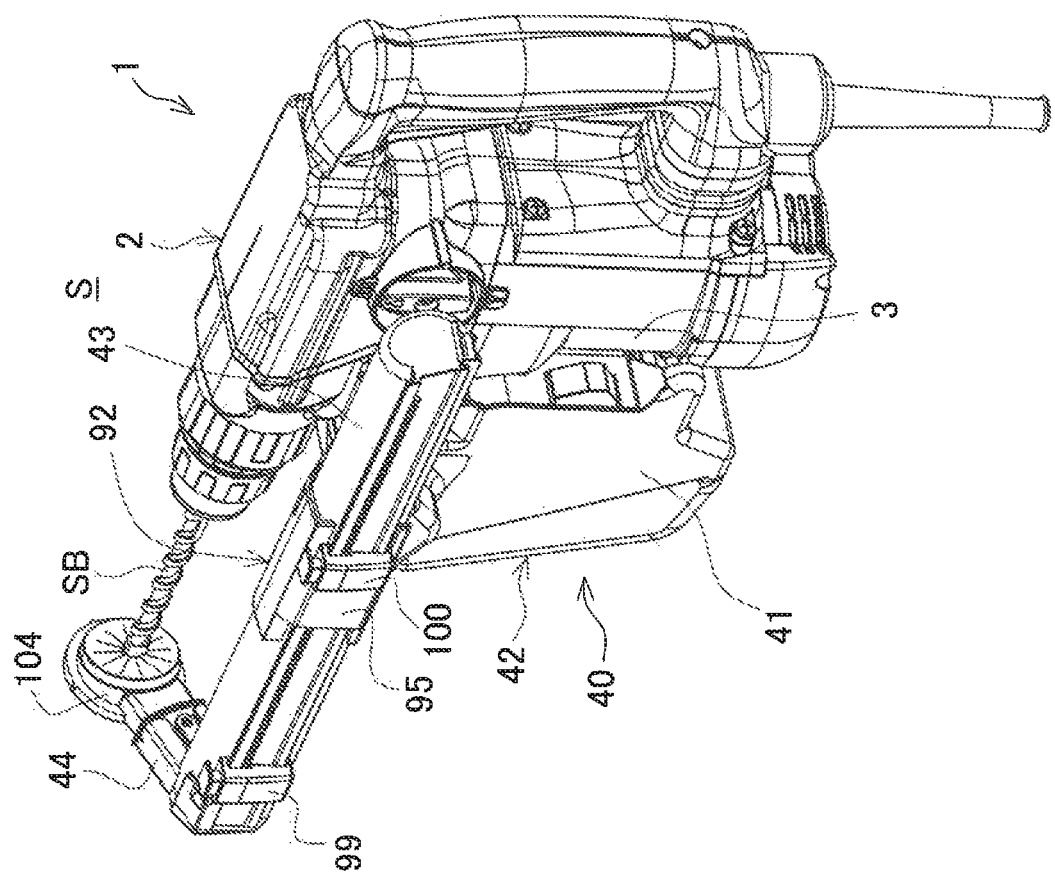
FIG. 20 is a perspective view illustrating an initial position of the sliding portion when a short bit is used.
Figure 21:
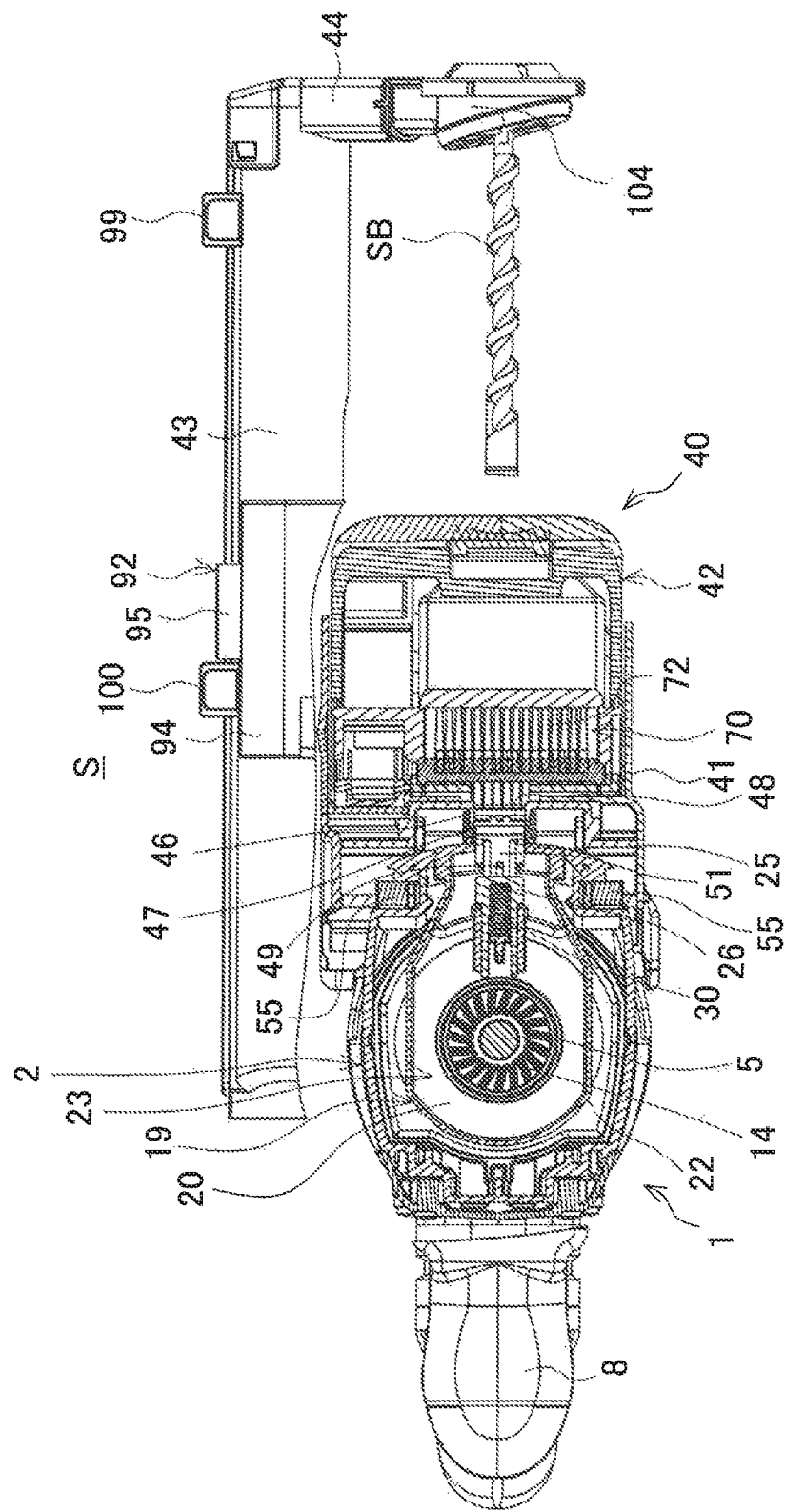
FIG. 21 is an explanatory view illustrating the initial position of the sliding portion when the short bit is used.

In a case of a drill bit (hereinafter referred to as a "short bit SB") with a short drilling depth, as illustrated in FIGS. 20 and 21, simply, the initial position of the rear stopper 100 of the sliding portion 43 is adjusted such that the distal end of the short bit SB is positioned on the suction opening 104, thus adjusting the position of the front stopper 99 in accordance with the drilling depth. In this case again, the retreated sliding portion 43 does not interfere with the hammer drill 1, so as to be allowed to slide without problems on the left side of the hammer drill 1. When the front stopper 99 is brought in contact with the coupling portion 95 of the guide cylinder 92, the push of the hammer drill 1 is restricted to terminate the drilling at a set depth.

When the drilling is terminated to cause the hammer drill 1 to retreat from the surface to be drilled, the sliding portion 43 moves forward to the initial position, where the rear stopper 100 is brought in contact with the coupling portion 95, due to biasing by the spiral spring 108, thus ensuring the drilling work with the identical depth again.

Dust Collecting Action

On the other hand, due to the rotation of the lower fan 15 caused by the rotation of the output shaft 5, the outside air is suctioned from the lower inlet 18 of the motor housing 3. After the outside air passes the motor 4 to be cooled, the outside air passes from the lower fan 15 to the fan housing chamber 13 so as to be discharged from the power-tool-side exhaust port 38.

Simultaneously, the rotation of the upper fan 14 generates a suctioning force on the suction opening 104 of the dust collector 40, and air is suctioned from the suction opening 104 with dust generated in the drilling. The air passes through the flexible hose 103 via the nozzle 44, and enters into the cyclone portion 76 of the dust box 42 from the intermediate cylinder 96. In the cyclone portion 76, since the air flows around in a spiral manner to pass through the communication port 81 so as to enter into the filter housing portion 67, comparatively large dust is separated due to a centrifugal force to be discharged to the first dust collecting chamber D1 of the box main body 64 from the upstream side discharge port 80 of the cyclone portion 76.

The air entered into the filter housing portion 67 passes through the filter 72 from a side surface as a unfolded surface of the filter 72 to be discharged to the outside of the dust box 42 from the outlet 74 of the cap cover 73. Then, the air passes through the upper inlet 25 from the dust-collector-side exhaust port 48 to reach the separation chamber 23, passes through the right and left of the shutter member 26 on the retreated position, passes through the upper fan 14 and the fan housing chamber 13 from the through hole 21 of the plate member 19, and is discharged from the power-tool-side exhaust port 38.

Accordingly, fine dust is captured by the filter 72 to remain in the filter housing portion 67. In this state, since the rubber seal 69 on the downstream side discharge port 68 of the filter housing portion 67 is in close contact with the receiving rib 83 to be sealed, the fine dust in the filter housing portion 67 is accumulated in the second dust collecting chamber D2 in a state of being separated from the large dust, separated by the cyclone portion 76, in the box main body 64.

Removal of Dust Collector and Discharge of Dust

After the operation terminates, when the dust collector 40 is removed, similarly to the installation, pushing the button unit 57 causes the swing plate 53 to swing to the forward release position, so as to sink the hooks 55, 55 from the top surface of the shoulder parts 52, 52. This releases the lock with the upper receiving portion 32 of the hammer drill 1, and subsequently inclining forward to rotate the dust collector 40 causes the contact piece 49 to move forward, so as to release the push of the shutter member 26. Accordingly, the shutter member 26 returns to the advance position to obstruct the upper inlet 25.

Then, the locking shafts 61, 61 of the locking arms 60, 60 of the main body case 41 are pulled out of the lower cutouts 37, 37 of the lower receiving portion 33 of the hammer drill 1 so that the dust collector 40 can be removed from the hammer drill 1.

The dust is discharged from the dust box 42 as follows: the elastic piece 90 of the operating member 88 of the box main body 64 is pushed from the forward of the main body case 41 to release the lock of the attaching/detaching locking claw 91 to the locking stepped portion 62, so as to incline to move forward the dust box 42 with the shaft portion 63 as the center, thus removing the dust box 42 from the main body case 41. Next, as illustrated in FIGS. 12 to 14, the loop portion 75 of the lid body 66 is released from the lid locking claw 85 to open the lid body 66 from the box main body 64, thus discharging the dust accumulated in the first dust collecting chamber D1 from the opening 64a. At this time, as described above, since the filter housing portion 67 is separated from the receiving rib 83 to simultaneously open the second dust collecting chamber D2, not only the large dust but also the fine dust can be simultaneously discharged from the opening 64a. Removing the cap cover 73 from the filter housing portion 67 ensures the cleaning of the filter 72 and the replacement of the filter unit 70.

Effects of This Disclosure According to Sliding Portion and Guide Cylinder

Thus, according to the dust collector 40 and the hammer drill 1 that includes the dust collector 40 of the above embodiment, the guide cylinder 92 is disposed on the main body case 41 such that the sliding portion 43 passes through the guide cylinder 92. Thus, the guide cylinder 92 allows the sliding portion 43 to project rearward when the sliding portion 43 slides. Then, the sliding portion 43 can be configured to have a large extension/contraction stroke without being restricted by the main body case 41. This ensures the long bit to be employed.

Especially, in this embodiment, the flexible hose 103 is disposed as a part of the dust collecting route R1 on the inside of the sliding portion 43 to provide a reasonable configuration where the sliding portion 43 is doubled as the dust collecting route R1, thus eliminating a need for winding around such as a hose outside. This makes the whole device downsized and eliminates the hindrance for the work.

As the sliding portion 43 is provided on the main body case 41 closer to the left side, the interference with the hammer drill 1 is preferably prevented when the sliding portion 43 is retreated.

Furthermore, as the sliding portion 43 is projected to be biased forward by the spiral spring 108, the sliding portion 43 is projected and biased with a small space.

Then, the configuration is employed such that the dust-collector-side exhaust port 48 communicates with the fan housing chamber 13 disposed on the hammer drill 1 so as to generate the suctioning force on the suction opening 104 in accordance with the rotation of the upper fan 14 in a state where the main body case 41 is installed on the hammer drill 1. This ensures the dust collection with use of the upper fan 14 on the hammer drill 1 side, thus eliminating a need for disposing a motor and a fan on the main body case 41.

On the other hand, as the dust-collector-side exhaust port 48 is disposed rearward the dust box 42, the dust collecting route R1, from the suction opening 104 to the rear dust-collector-side exhaust port 48 passing through the inside of the dust box 42, can be formed compactly in the right-left direction.

The initial position setting means (the rail 98, the rear stopper 100, the rack 101) is provided to arbitrarily set the forwardly projecting position of the sliding portion 43, which allows the suction opening 104 to have the position properly set corresponding to the length of the tool bit and the drilling depth.

Furthermore, since the maximum drilling depth defined by the slide of the sliding portion 43 is configured to be equal to or more than 120 mm, the dust collector 40 is applicable to not only the short bit SB but also the long bit LB, such that the one dust collector 40 is widely applicable to the drilling work.

While the guide cylinder is disposed on the left side of the main body case in the above embodiment, the guide cylinder may be disposed on the right side. Not limiting to the case where such as the flexible hose is used to form a part of the dust collecting route in the sliding portion, such as a hose disposed separately from the sliding portion may be used to couple the nozzle and the main body case side. In this case, the guide cylinder can be changed to be attached to any of right and left or can be slid such that the position of the sliding portion is configured to be selected to any of right and left. To project and bias the sliding portion, a coil spring and the like other than the spiral spring can be employed.

Furthermore, while the upper fan as the suction fan is disposed on the hammer drill side in the above embodiment, the motor and the suction fan can be disposed in the main body case to obtain the power source from a built-in battery and the electric power tool side, so as to be configured to independently collect the dust. For the dust box, not limiting to the dust box configured to be removably installed, the dust box may be configured to be integrally disposed with the main body case to discharge the dust by opening the lid body.

Then, the disclosure according to the sliding portion and the guide cylinder is applicable to even the dust collector configured to include the motor and the fan on the dust collector itself to independently collect the dust without disposing an intake route on the electric power tool side.

Effects of this Disclosure According to Dust Box

On the other hand, according to the dust collector 40 and the hammer drill 1 that includes the dust collector 40 in the above embodiment, the dust box 42 includes the opening 64a openably/closably as a discharge port of the dust and the cyclone portion 76. The cyclone portion 76 causes the air flown into the dust box 42 to swirl so as to separate the dust on the upstream side of the filter 72 on the dust collecting route R1. The, dust box 42 dividedly includes the first dust collecting chamber D1 where the dust separated by the cyclone portion 76 accumulates and the second dust collecting chamber D2 where the dust captured by the filter 72 accumulates, such that the opening of the opening 64a simultaneously opens the first dust collecting chamber D1 and the second dust collecting chamber D2. This ensures the dust collection efficiency and the product lifetime of the filter 72 to be maintained without the possibility for the filter 72 to be accumulated by the dust in the cyclone portion 76 even the dust collector 40 including both the cyclone portion 76 and the filter 72. The discharge of the dust and the replacement of the filter unit 70 can be easily performed.

Especially, in this embodiment, since a dust separator is configured as the cyclone portion 76 that causes the air to swirl in a spiral manner, the centrifugal force is used to efficiently separate the dust.

Since the first dust collecting chamber D1 and the second dust collecting chamber D2 are configured to communicate with one another by the opening of the opening 64a, the dust is simultaneously discharged even if the first and the second dust collecting chambers D1 and D2 are dividedly disposed.

Since the filter housing portion 67 forming the second dust collecting chamber D2 projects into the box main body 64 forming the first dust collecting chamber D1, and the downstream side discharge port 68 disposed on the filter housing portion 67 is in contact with the receiving rib 83 of the inner surface of the box main body 64 to be obstructed, the second dust collecting chamber D2 is easily divided to be formed.

Furthermore, the filter 72 is folded to be housed in the second dust collecting chamber D2, and the communication port 81 communicated with the second dust collecting chamber D2 from the cyclone portion 76 is disposed opposed to the unfolded surface of the filter 72. This causes the air to flow in an appropriate direction with respect to the folded filter 72, thus efficiently capturing the dust.

Then, the opening 64a is opened and closed by the lid body 66 disposed on the box main body 64 forming the first dust collecting chamber D1, and the filter housing portion 67 that houses the filter unit 70 is disposed on the lid body 66. This ensures the first and the second dust collecting chambers D1 and D2 to be simultaneously obstructed and opened by the opening and closing operation of the lid body 66.

While the cyclone portion is constituted of the outer part of the lid body side and the inner part of the box main body side in the above embodiment, the specific structure can be changed as necessary, for example, a structure where the cyclone portion is formed in the box main body to dispose only the inlet on the lid body may be employed. Not limiting to the structure where the filter housing portion and the cyclone portion are arranged in the right-left direction, a structure where the filter housing portion and the cyclone portion are arranged in the front-rear direction can be employed. For example, the cyclone portion is disposed forward, and the filter housing portion is disposed rearward. Accordingly, the lid body can be disposed on the side surface of the dust box depending on the position of the cyclone portion. Furthermore, the opening (discharge port) can be disposed on not the whole but a part of one surface of the box main body.

Additionally, while the rubber seal is disposed on the downstream side discharge port of the filter housing portion in the above embodiment, the rubber seal may be disposed on the bottom surface side of the box main body, or the receiving rib may be omitted insofar as the sealing is possible.

Effects of this Disclosure According to Dust Collection System

Then, according to the dust collection system S in the above embodiment, the main body case 41 of the dust collector 40 includes the sealing member 47 that surrounds the dust-collector-side exhaust port 48 to seal between the upper inlet 25 and the dust-collector-side exhaust port 48 in a state where the main body case 41 is installed on the housing (the main body housing 2 and the motor housing 3) of the hammer drill 1 side, and the contact piece 49 to open and close the shutter member 26 is disposed in an area surrounded by the sealing member 47. This eliminates a need for additionally disposing a sealing member for the contact piece 49 and the shutter member 26. Then, the cost for the seal can be reduced even in the case where the shutter member 26 is disposed on the hammer drill 1.

Especially, in this embodiment, the shutter member 26 is disposed between the advance position that obstructs the upper inlet 25 and the retreated position that opens the upper inlet 25 movable to back and forth, such that the contact of the contact piece 49 moves the shutter member 26 to the retreated position to open the upper inlet 25. This decreases the moving range of the shutter member 26 to dispose the shutter member 26 with a small space. Then, disposing the shutter member 26 does not hinder the downsizing.

Since the structure where the air suctioned from the upper inlet 25 into the motor housing 3 passes through the right and left of the shutter member 26 on the retreated position to reach the upper fan 14 is employed, the retreat of the shutter member 26 causes the air to smoothly flow, thus forming the right and left flow passages with a small space.

Furthermore, the sealing member 47 is configured to integrally include the extended cap 51 to which the contact piece 49 is locked such that the locking of the contact piece 49 prevents the sealing member 47 from falling out from the main body case 41 side. This provides a reasonable configuration where the contact piece 49 is used for a retainer for the sealing member 47.

Additionally, the main body case 41 includes the locking shaft 61 locked to the lower receiving portion 33 disposed on the main body housing 2, and the second lock portion (the hook 55) rotated to the main body housing 2 side in a state where the locking shaft 61 is locked to the lower receiving portion 33 so as to be locked to the upper receiving portion 32 disposed on the main body housing 2 on the mounting position to the main body housing 2. This allows the main body case 41 to be attached and removed by the rotation. In the case where the main body case 41 is slidingly attached and removed by such as a rail, the contacted area of the rail and the main body case is increased to cause the malfunction by such as biting of the dust, thus requiring a countermeasure against the dust such as ensuring the seal performance. However, here, since the main body case 41 is rotationally attached and removed, the contacted area of the main body housing 2 side and the main body case 41 is decreased to eliminate a need for the countermeasure against the dust, thus reducing the probability to cause the malfunction.

Especially, the upper receiving portion 32 is configured as a pair of the locking depressed portions 35, 35 disposed on the right and left of the upper inlet 25. The second lock portion is configured as the pair of the hooks 55, 55 that are disposed on the right and left of the dust-collector-side exhaust port 48, configured to be operated movable between the lock position to the locking depressed portions 35, 35 and the release position to release the lock to the locking depressed portions 35, 35, and biased to the lock position. Then, the locking and releasing operation of the hooks 55, 55 rotationally attaches and removes the main body case 41 with ease.

Since the pair of the hooks 55, 55 is configured to be operated movable to the release position simultaneously by one button unit 57, the locking and releasing operation of the hooks 55, 55 is easily performed.

The shape of the contact piece is not limited to the shape in the above embodiment, the shape can be changed as necessary to such as a plate shape, and a plurality of the contact pieces can be arranged side by side.

While the shutter member is configured to be moved to back and forth to open and close the upper inlet in the above embodiment, the shutter member can be configured such that the upper end is rotatably coupled by a shaft in the right-left direction so as to open and close the upper inlet by the swing to back and forth. The shaft may be positioned on the lower end, or the right or the left end.

Furthermore, in the attaching and removing of the dust collector, while the above embodiment employs the structure where the lower side of the main body case is locked to rotate the upper side, conversely, a structure where the upper side of the main body case is locked to rotate the lower side can be employed. A lateral rotational attaching and removing structure where any one side of the right and left is locked to rotate another side can be also employed. The dust box is not limited to the detachable type, and the dust box may be configured to be integrally disposed on the main body case so as to discharge the dust by opening the lid body.

Second Embodiment

Next, another embodiment of this disclosure will be described. However, in the hammer drill and the dust collector, like reference numerals designate corresponding or identical components throughout the above-described first embodiment, and therefore such elements will not be further elaborated here.

Figure 22:
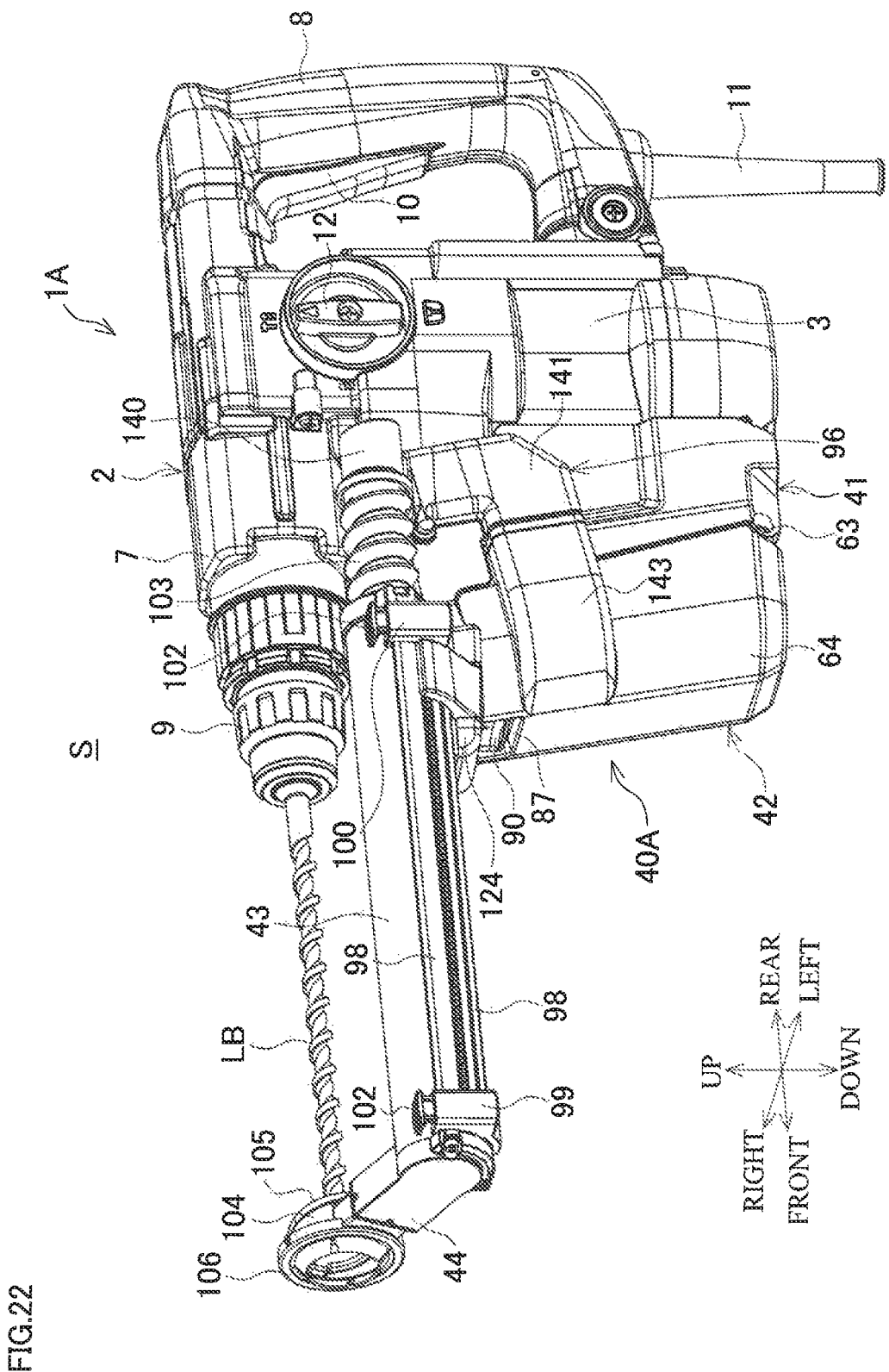
FIG. 22 is a perspective view of a dust collection system of a second embodiment viewed from a side.
Figure 23:
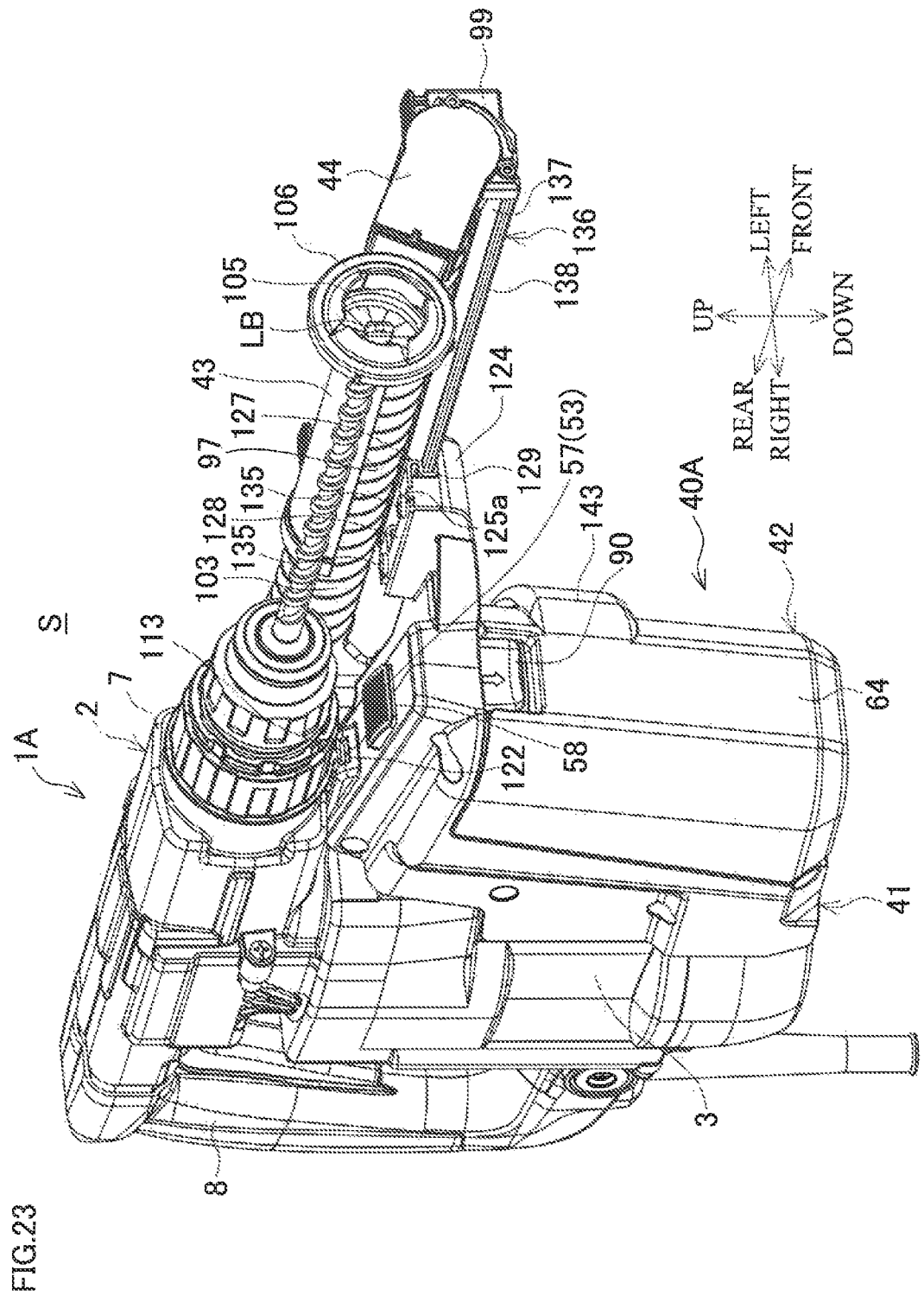
FIG. 23 is a perspective view of the dust collection system of the second embodiment viewed from a front.
Figure 24:
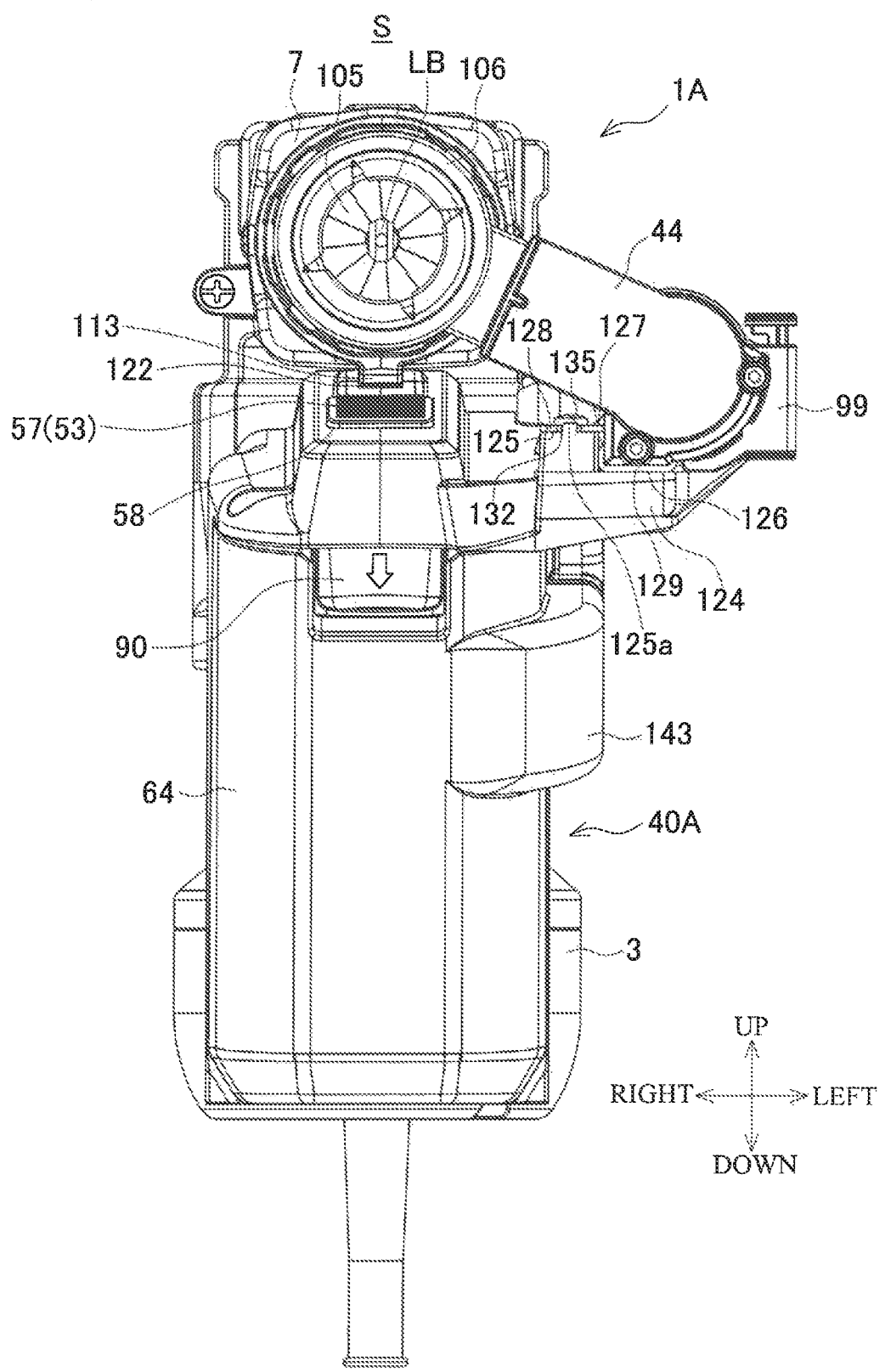
FIG. 24 is a front view of the dust collection system of the second embodiment.
Figure 25:
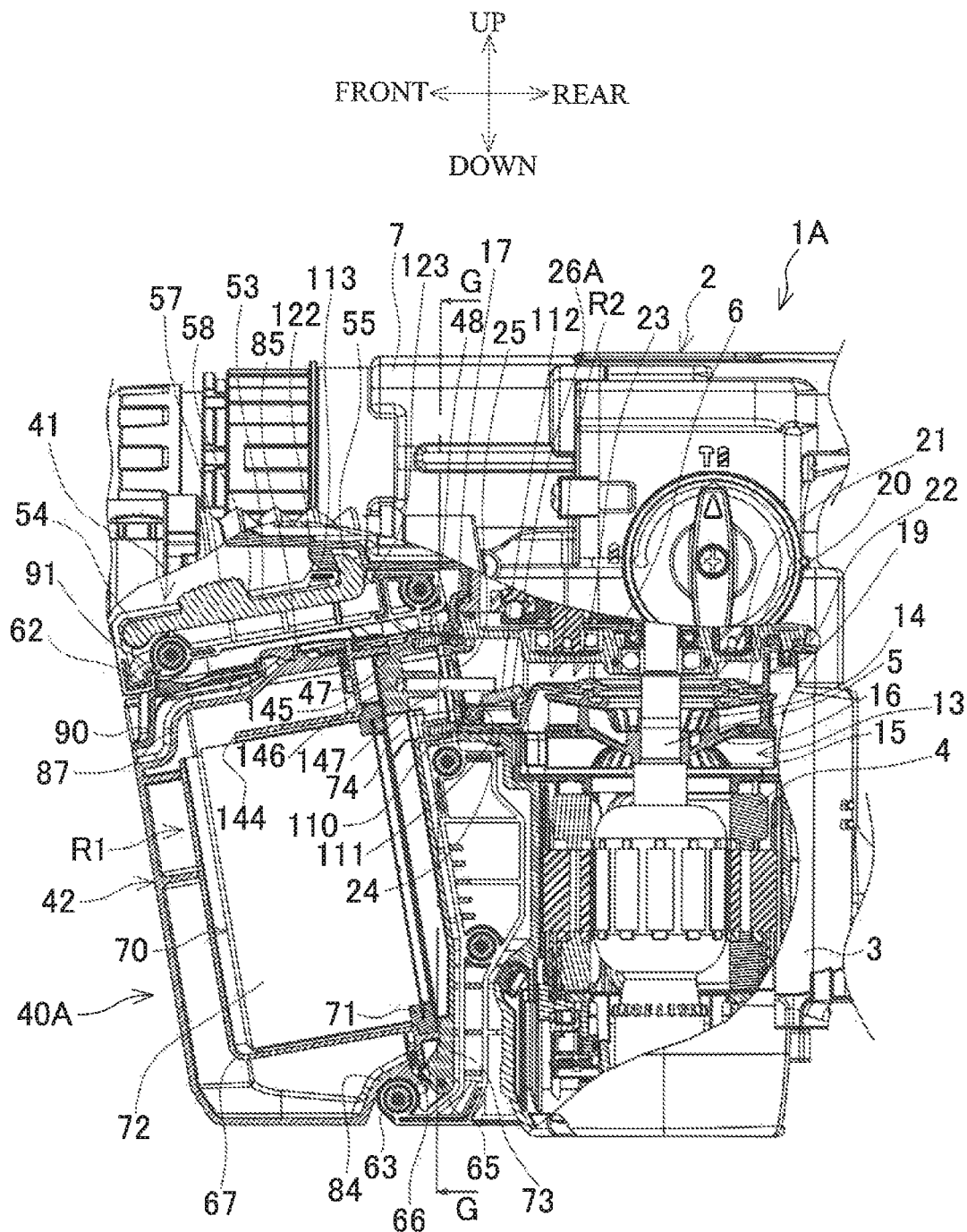
FIG. 25 is a cross-sectional explanatory view of a joining part of the dust collector for the electric power tool.
Figure 26:
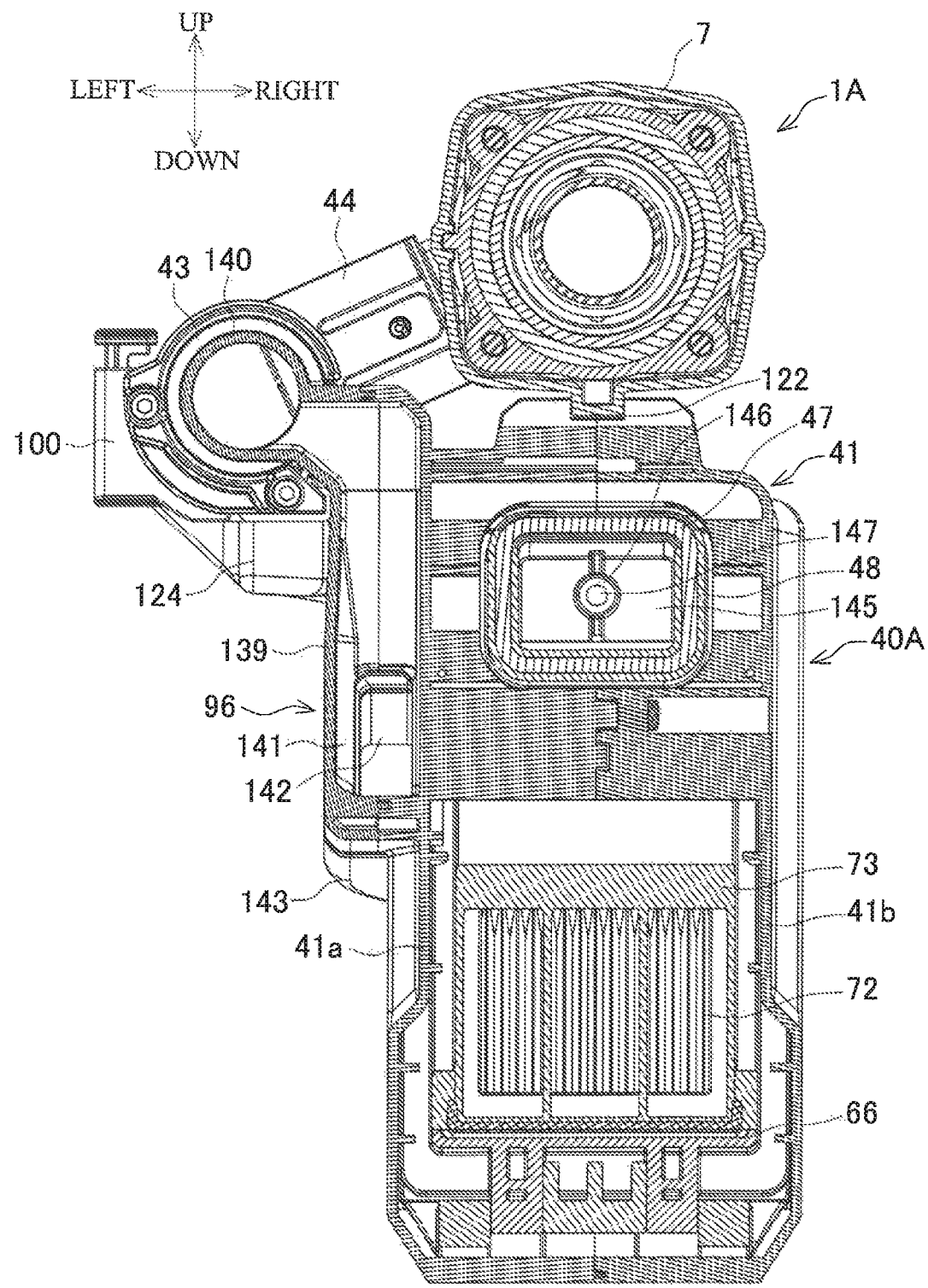
FIG. 26 is a cross-sectional view taken along the line G-G in FIG. 25.

FIGS. 22 to 24 illustrate a dust collection system S where a hammer drill 1A includes a dust collector 40A. FIG. 22 is a perspective view from the side, FIG. 23 is a perspective view from the front, and FIG. 24 is a front view. FIG. 25 is a partial cross-sectional view of a joining part of the dust collector 40A, and FIG. 26 is a cross-sectional view taken along the line G-G of FIG. 25.

Description of Hammer Drill

Figure 27:
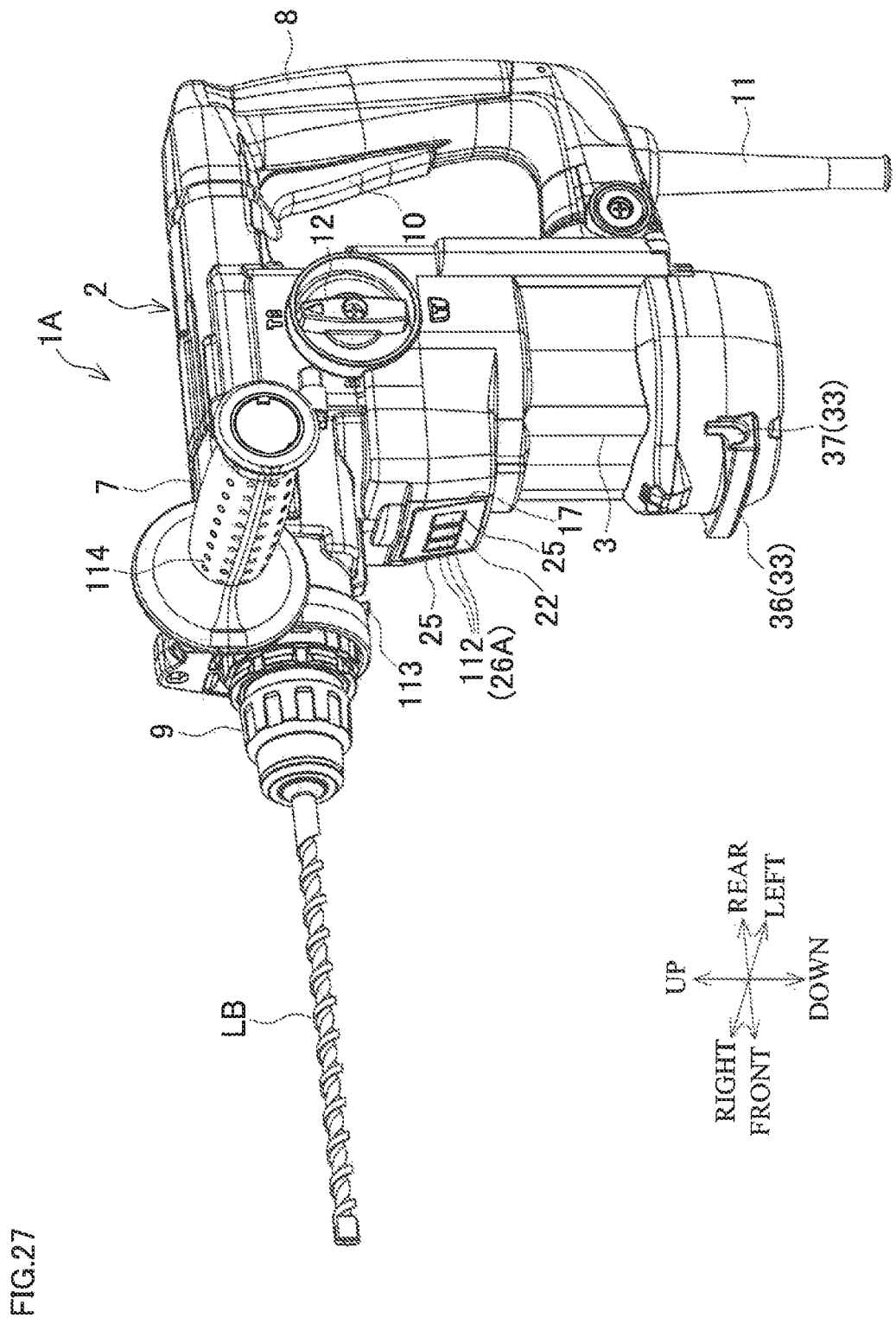
FIG. 27 is a perspective view of a hammer drill of the second embodiment viewed from a side.
Figure 28:
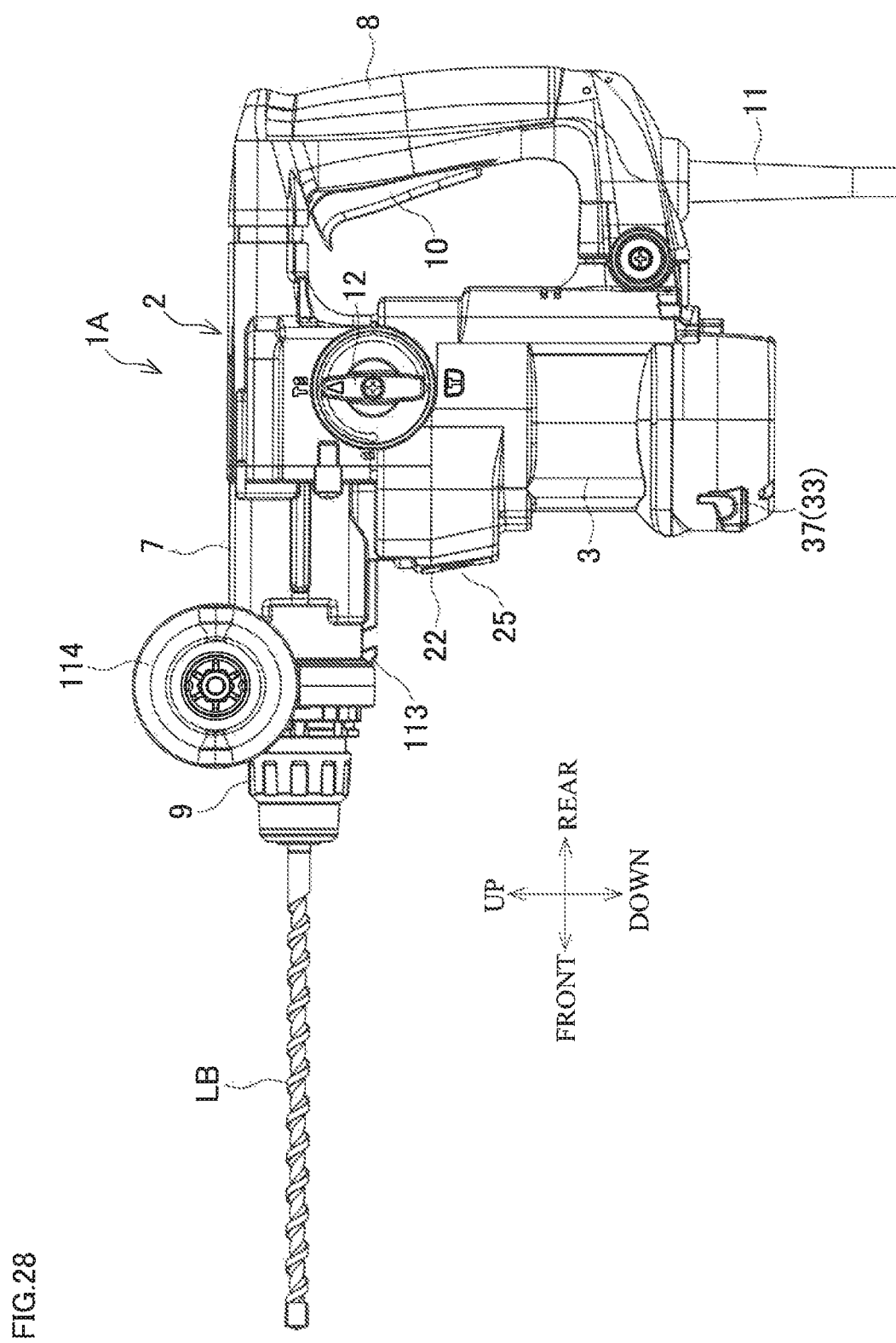
FIG. 28 is a side view of the hammer drill of the second embodiment.
Figure 29:
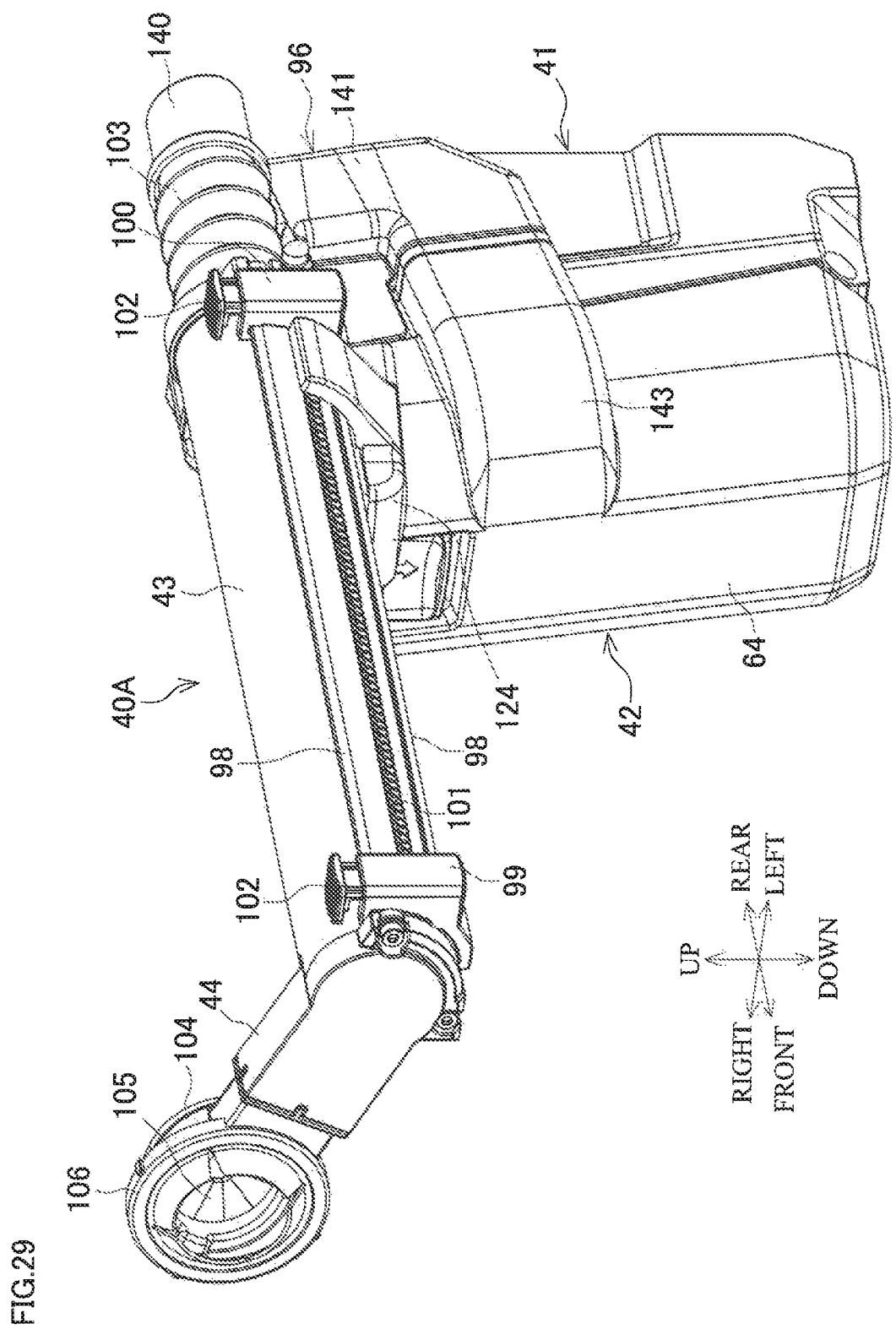
FIG. 29 is a perspective view of a dust collector for the electric power tool of the second embodiment viewed from a front.
Figure 30:
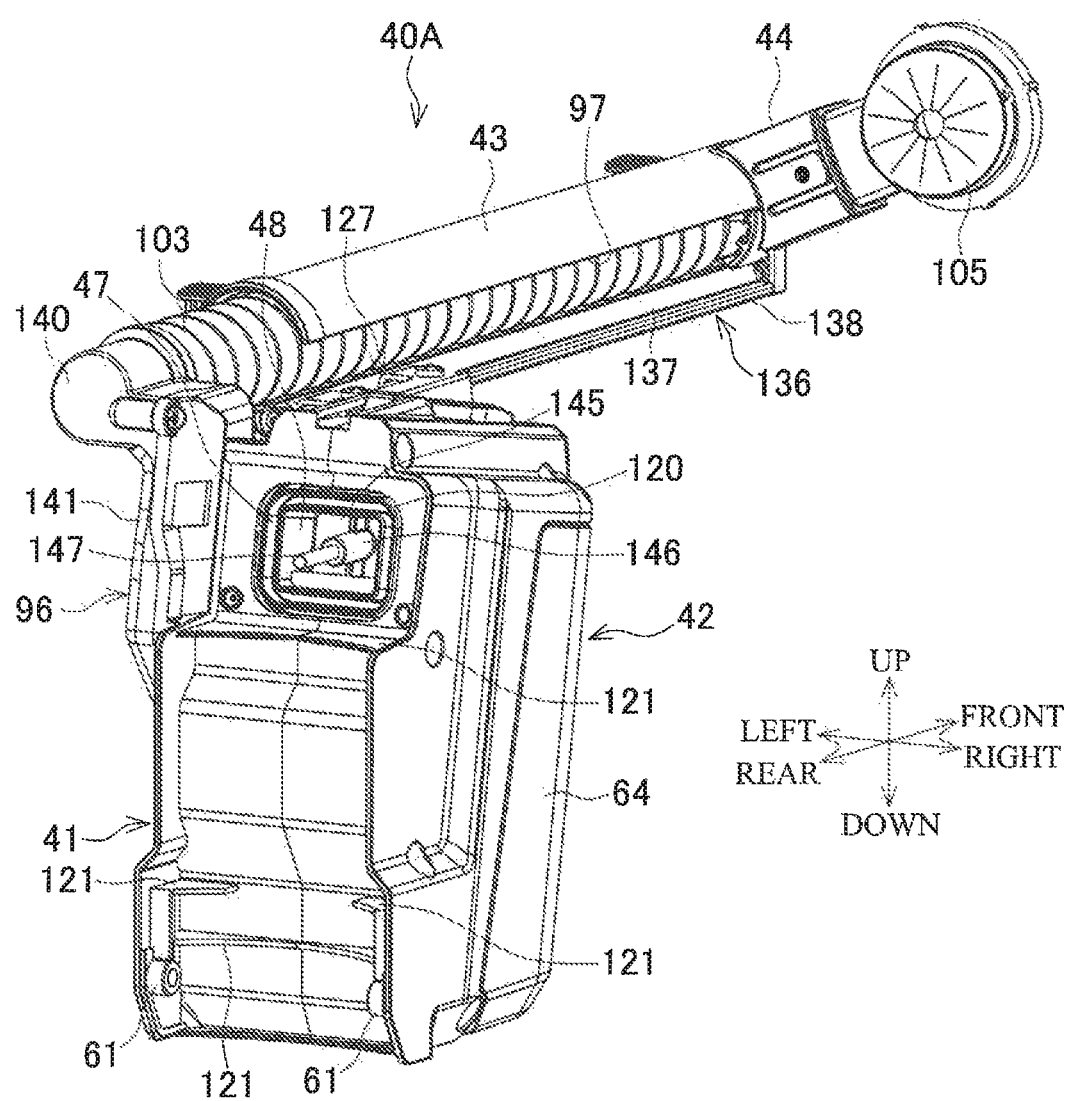
FIG. 30 is a perspective view of the dust collector for the electric power tool of the second embodiment viewed from a rear.
Figure 31:
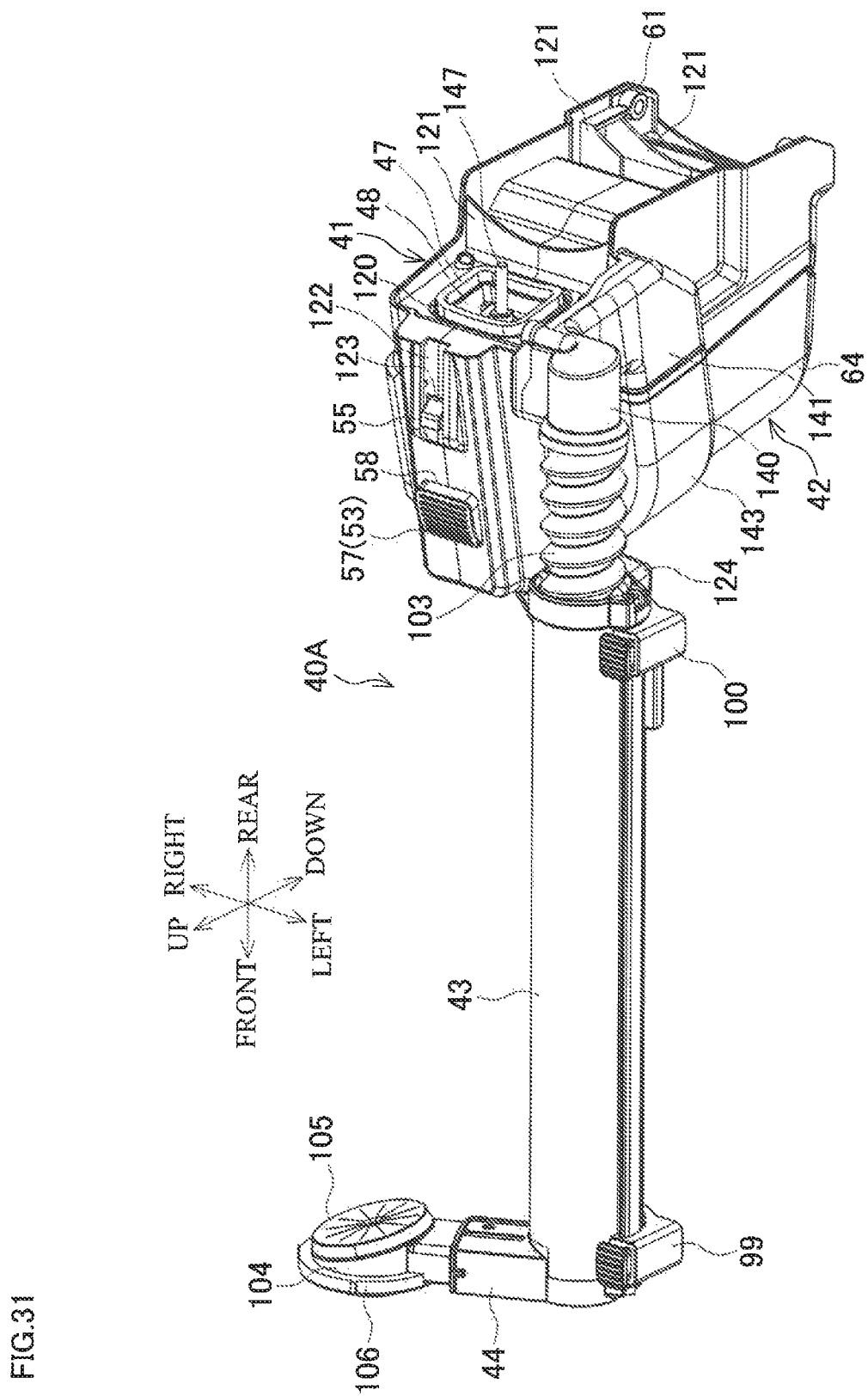
FIG. 31 is a perspective view of the dust collector for the electric power tool of the second embodiment viewed from above.
Figure 32:
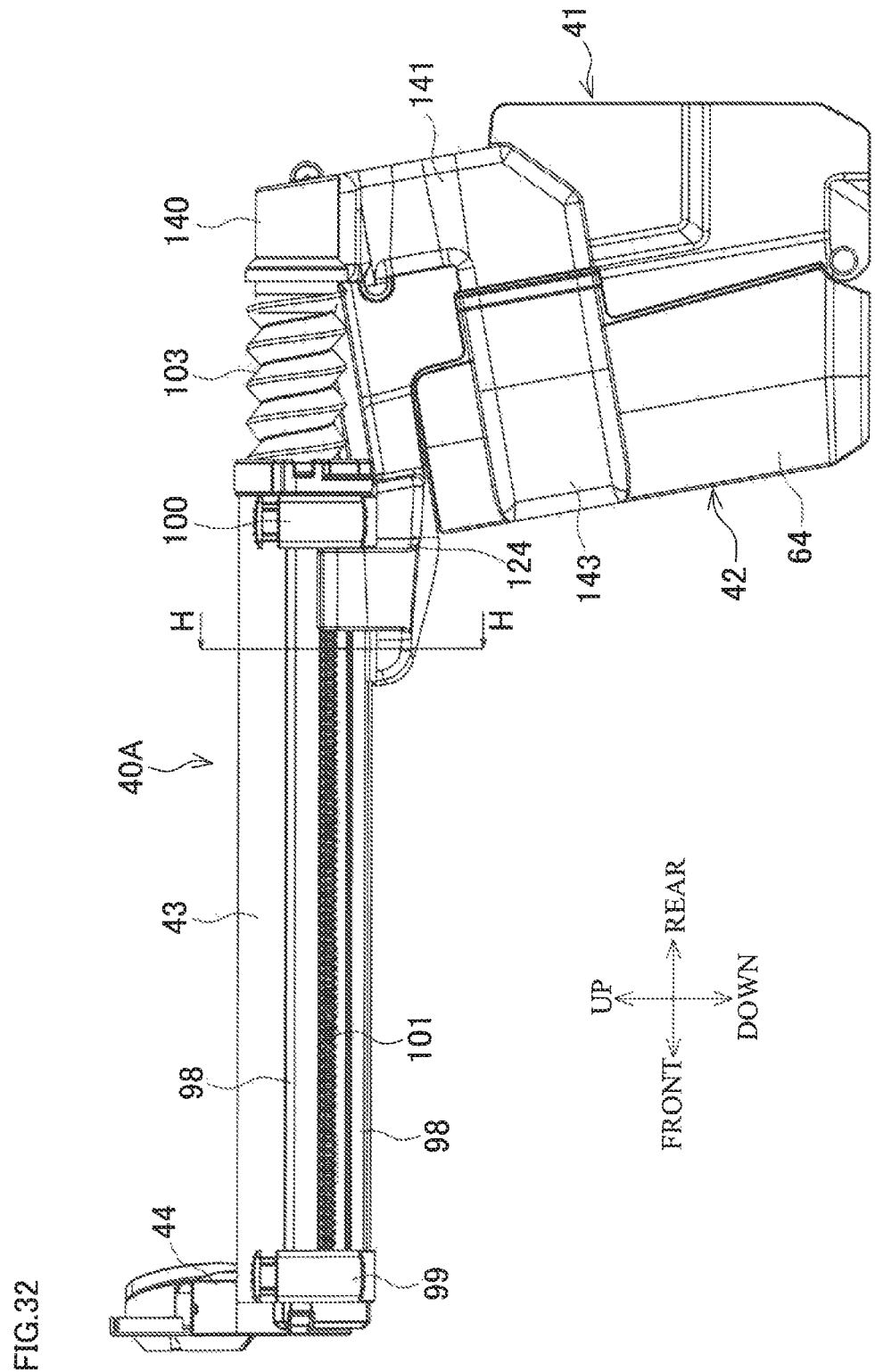
FIG. 32 is a side view of the dust collector for the electric power tool of the second embodiment.

As illustrated in FIGS. 27 and 28, in the hammer drill 1A of this embodiment, the upper inlets 25, 25 . . . , disposed on the peripheral plate 22 on the front surface of the main body housing 2, are arranged three pieces in the right-left direction.

A shutter member 26A does not have the structure that opens and closes the upper inlet 25 by moving to back and forth as the first embodiment, but have a structure where a lower end is rotatably coupled to a lower part of the upper inlet 25 by a pin 110 disposed on the deep bottom portion 24 in the right-left direction as illustrated in FIG. 25. In the normal state, a torsion spring 111, which is wound around the pin 110 and locked to the deep bottom portion 24 and the shutter member 26A, biases the shutter member 26A to a standing position to the forward. On the front surface of the shutter member 26A on the standing position, three fitting protrusions 112, 112 . . . are disposed to protrude and fitted to the respective upper inlets 25 to obstruct the respective upper inlets 25.

On both right and left sides of the upper inlet 25 on the front surface the main body housing 2, a stop 113 projecting downwardly rearward is disposed on the lower surface of the front housing 7 in this embodiment, instead of the upper receiving portion (cutout and locking depressed portion) disposed in the first embodiment. The front housing 7 is configured to mount a side handlebar 114.

Description of Dust Collector

Figure 34:
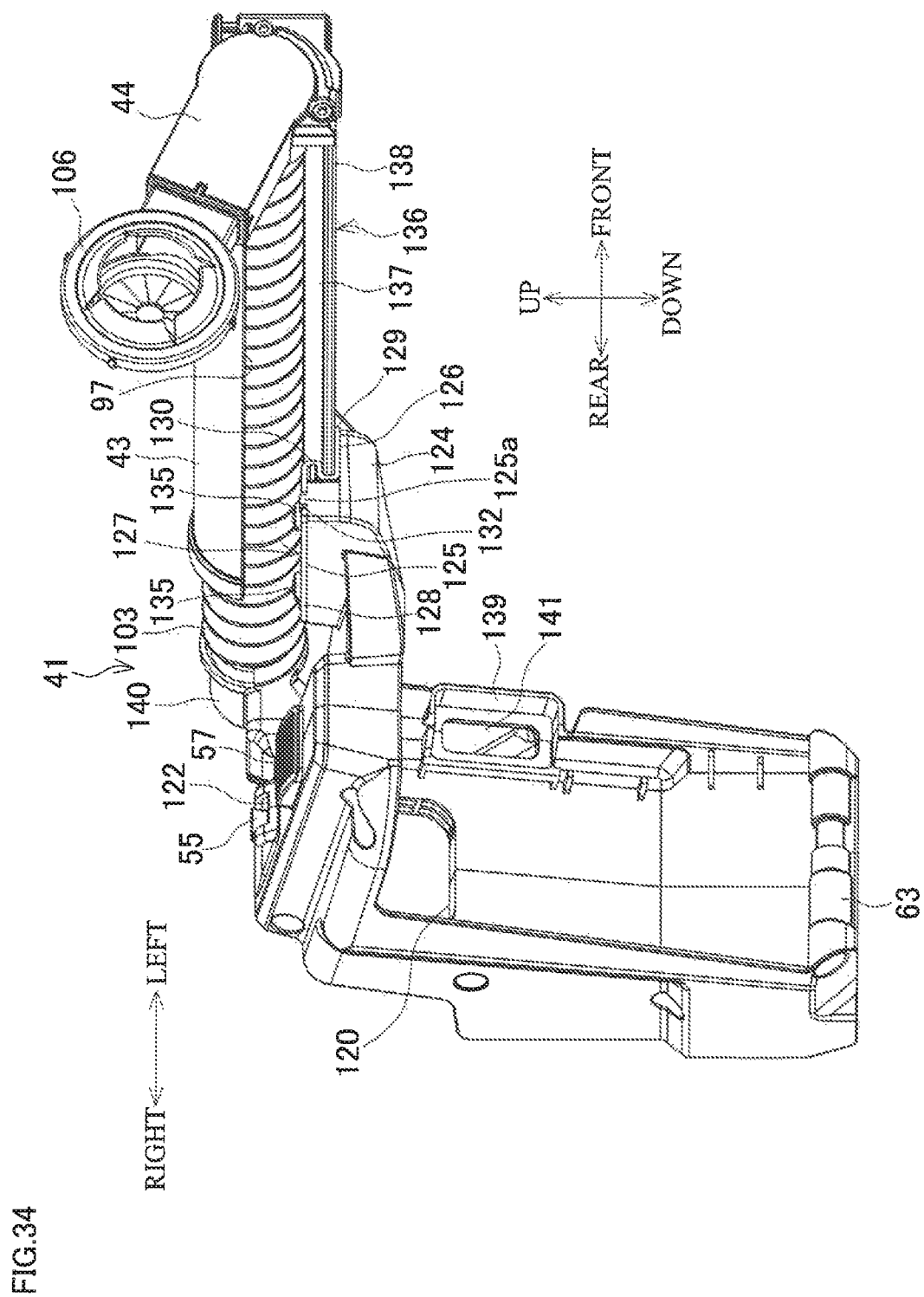
FIG. 34 is a perspective view of a main body case viewed from a front.
Figure 35:
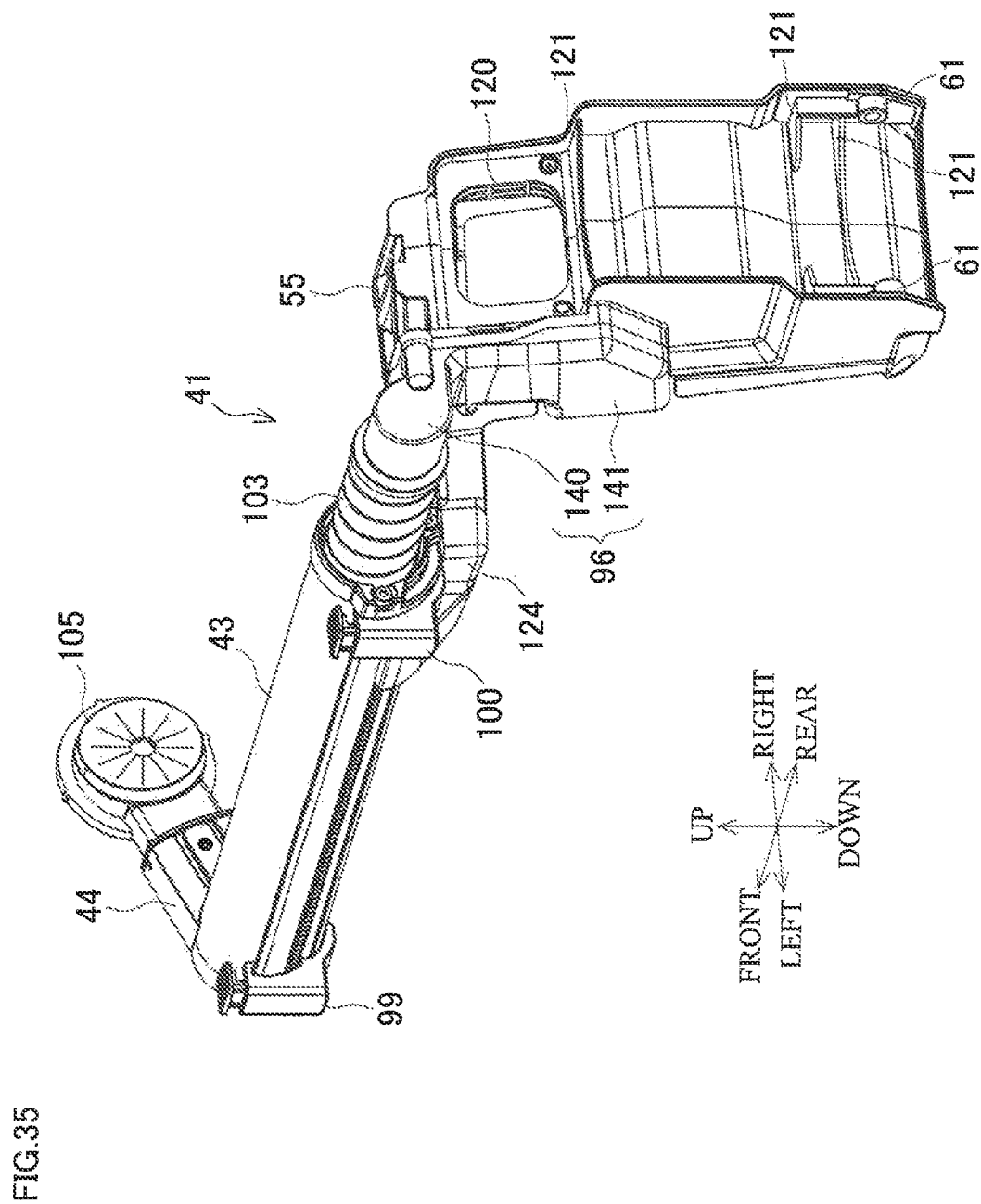
FIG. 35 is a perspective view of the main body case viewed from a rear.

The dust collector 40A illustrated in FIGS. 29 to 32, the main body case 41, formed by combining right and left half cases 41a and 41b, includes a square hole 120 penetratingly formed on a position corresponding to the upper inlet 25 as illustrated in FIGS. 34 and 35, instead of the connection cylinder, the sealing member and the contact piece disposed in the first embodiment. Downward the square hole 120 on the rear surface of the main body case 41, a plurality of contact ribs 121, 121 . . . are provided. The contact ribs 121, 121 are disposed along the front surface shape of the motor housing 3 of the hammer drill 1A and in contact with the front surface of the motor housing 3 in a state of being installed on the motor housing 3.

Furthermore, the main body case 41 has the top surface on which a guide groove 122 that receives the stop 113 in the installation to the hammer drill 1A is depressed in the front-rear direction, and the swing plate 53 is disposed sideways bellow the guide groove 122 in the main body case 41.

As illustrated in FIG. 25, the swing plate 53 in this embodiment is supported by a shaft 54 disposed on the front end in the right-left direction swingably to the upper and lower. The hook 55 is disposed on the rear end of the swing plate 53 on the center in the right-left direction so as to be configured to appear in the guide groove 122 via a through-hole 123 disposed on the main body case 41. The swing plate 53 is biased to an upward position where the hook 55 projects into the guide groove 122 by a torsion spring (not illustrated) disposed on the shaft 54. The button unit 57 is disposed on the top surface of the center portion of the swing plate 53 so as to project on the top surface of the main body case 41 via the opening 58. Accordingly, the push operation on the button unit 57 is performed to swing the swing plate 53 to a downward position so that the hook 55 can be retreated downward from the guide groove 122.

Figure 33:
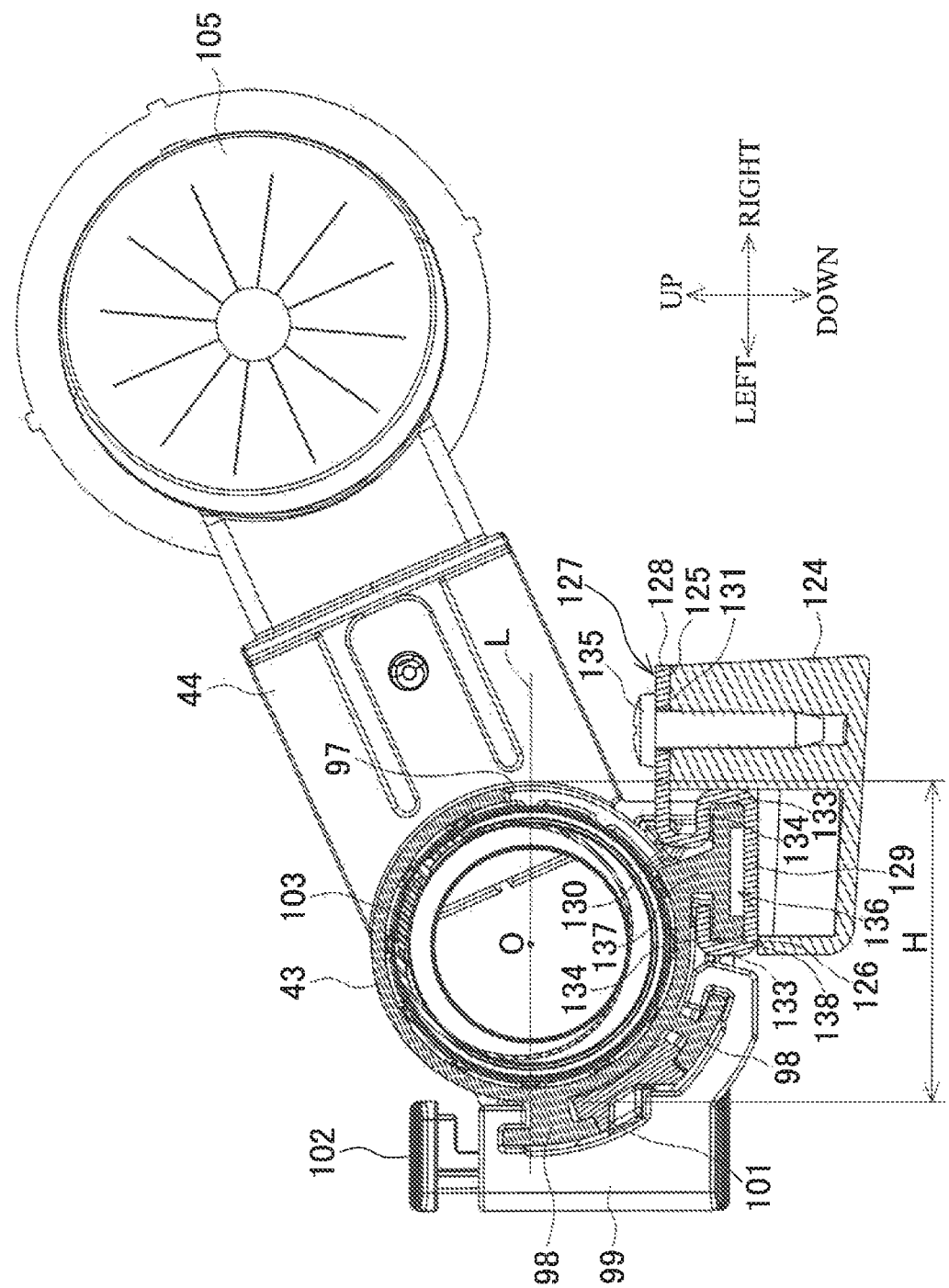
FIG. 33 is a cross-sectional view taken along the line H-H in FIG. 32.

On the left side upper portion of the main body case 41, a supporting arm 124 that supports the sliding portion 43 from the lower side is disposed. The supporting arm 124 projects obliquely forward from the main body case 41 and horizontally includes receiving surfaces in two stages of upper and lower on the top surface, an upper receiving surface 125 closer to the main body case 41 and a lower receiving surface 126 outside the upper receiving surface 125. The sliding portion 43 is slidably held via a guide metal fitting 127 secured across both receiving surfaces 125 and 126 as illustrated in FIG. 33. The upper receiving surface 125 has front and back end edges on which positioning protrusions 125a, 125a are disposed to protrude.

Figure 36:
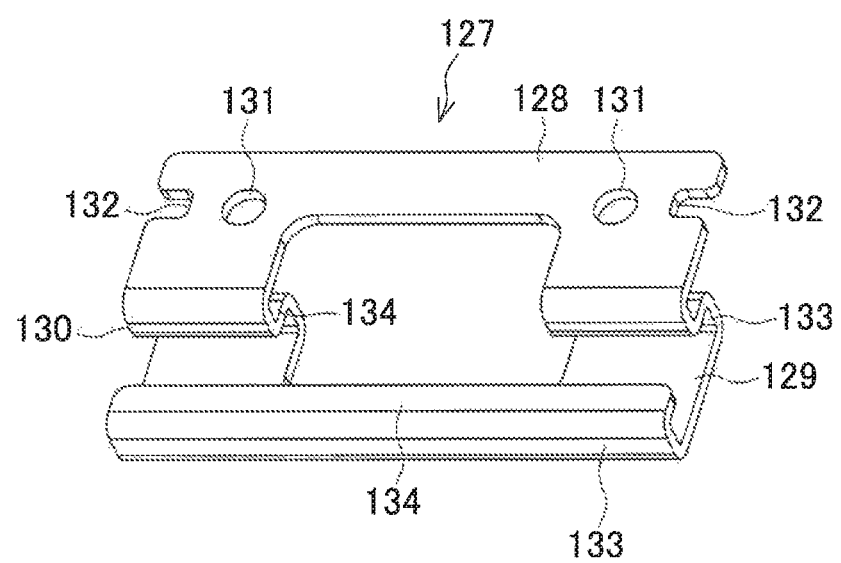
FIG. 36 is a perspective view of a guide metal fitting.
Figure 38B:
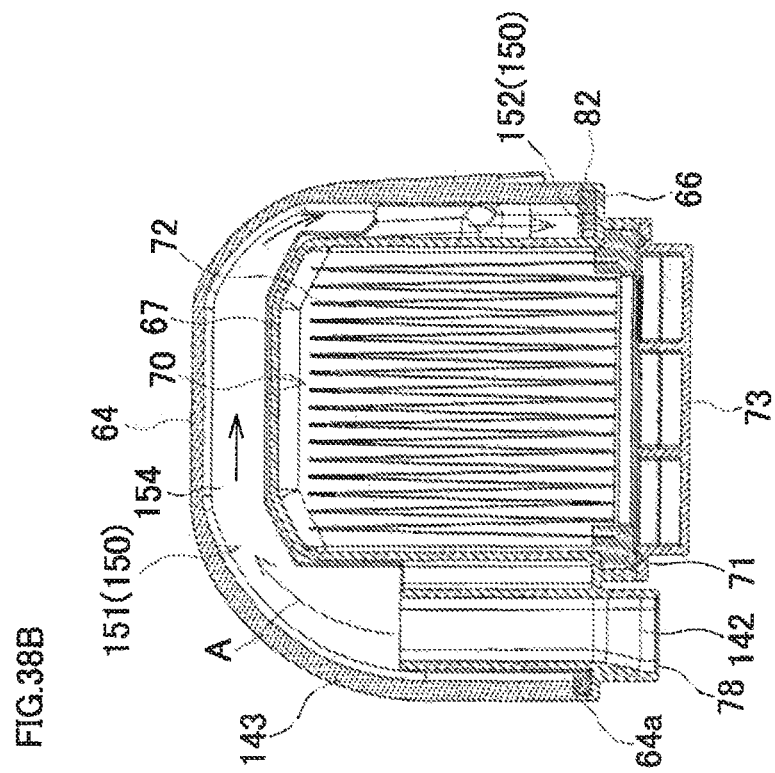
FIG. 38B is an explanatory cross-sectional view of the dust box taken along the line I-I in FIG. 38A.
Figure 38A:
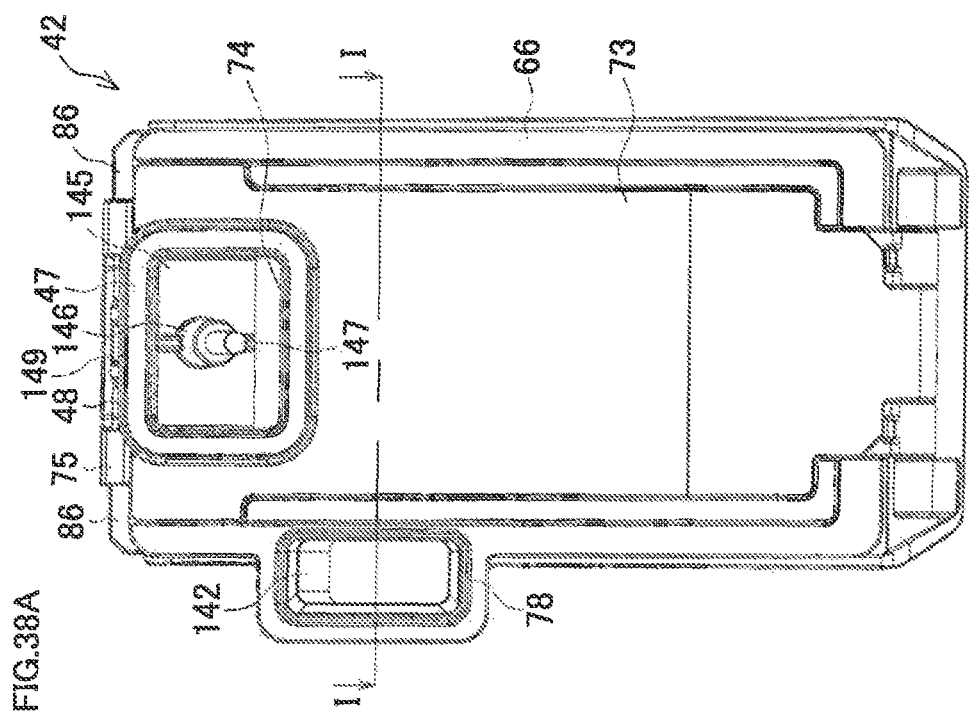
FIG. 38A is an explanatory view of a back surface of the dust box.
Figure 39:
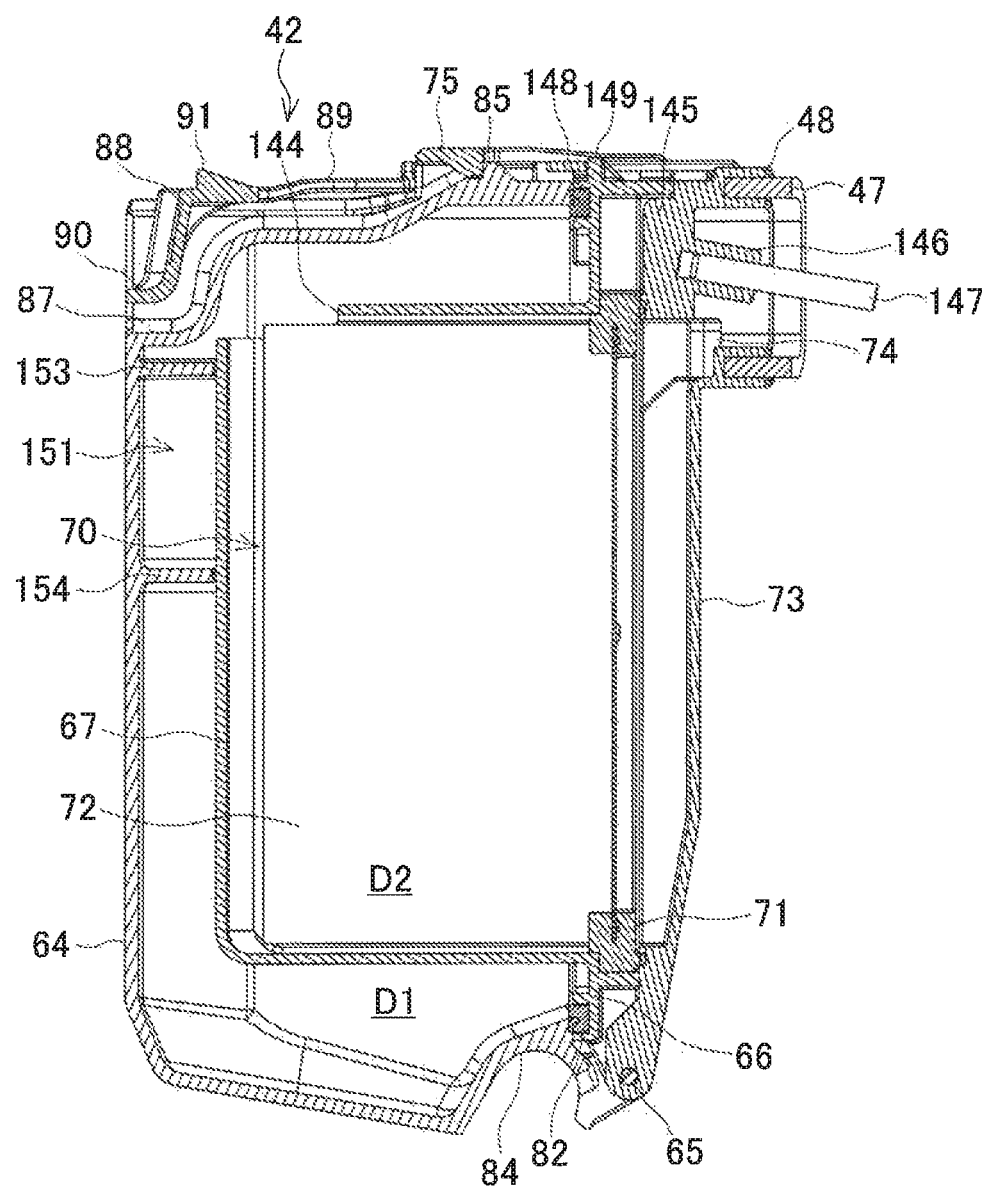
FIG. 39 is a vertical cross-sectional view of the center of the dust box.

As illustrated in FIG. 36, the guide metal fitting 127 is constituted of an upper plate 128 screwed on the upper receiving surface 125, a lower plate 129 placed on the lower receiving surface 126, and a coupling portion 130 that couples the upper and lower plates 128 and 129 to one another. The upper plate 128 has an outer shape in plan view of a rectangular shape extending in the front-rear direction, and includes a pair of screw holes 131, 131 on both front and rear ends and a pair of cutouts 132, 132 on the outside of the screw holes 131, 131. The lower plate 129 also has an outer shape in plan view of a rectangular shape extending in the front-rear direction, and includes a pair of raising portions 133, 133 that stand upright from right and left longer sides and a pair of covering portions 134, 134 that extend from the upper ends of the raising portions 133, 133 to the inside in an opposite form. On the center of the guide metal fitting 127, punched holes are continuously disposed from the upper plate 128 to the coupling portion 130 and the lower plate 129. The coupling portion 130 couples the end edge of the upper plate 128 to the end edge of the covering portion 134 of the lower plate 129 over the punched holes.

The guide metal fitting 127 is secured to the supporting arm 124 such that the upper plate 128 is screwed on the upper receiving surface 125 by screws 135, 135 via the screw holes 131, 131, in a state where the upper plate 128 and the lower plate 129 are respectively placed on the upper receiving surface 125 and the lower receiving surface 126 to fit the positioning protrusions 125a, 125a of the upper receiving surface 125 to the cutouts 132, 132 of the upper plate 128 for positioning.

On the other hand, the sliding portion 43 has the lower surface on which a guide rail 136 is integrally disposed along the longer side direction. The guide rail 136 has a cross section in an inverted T shape constituted of an upper rail 137 downwardly disposed along an inferior edge of the lower side of the elongate hole 97 and a lower rail 138 orthogonally coupled to the lower end of the upper rail 137. The lower rail 138 is fitted to the lower plate 129 of the guide metal fitting 127 from the longer side direction, and the upper rail 137 is passed between the covering portions 134, 134, thus slidably guided by the guide metal fitting 127 in the front-rear direction. The lower rail 138 is guided in a state of being fitted to the lower plate 129 by four surfaces of a lower surface in contact with the bottom surface of the lower plate 129 except a depressed portion depressed on the bottom surface, right and left side surfaces in contact with the right and left raising portions 133, 133, and a top surface in contact with the covering portions 134, 134.

As illustrated in FIG. 33, the lower plate 129 and the guide rail 136 are disposed in a region on the lower side with respect to a line L on a cross section passing through a center O of the sliding portion 43 in the horizontal direction and within a width (within a region where the lower plate 129 and guide rail 136 do not project from the sliding portion 43 in plan view) smaller than a right-left width H of the sliding portion 43.

The rear end of the sliding portion 43 in this embodiment is opened to expose the rear portion of the internal flexible hose 103, thus coupling the rear end of the flexible hose 103 to the intermediate cylinder 96 disposed on the left side surface upper side of the main body case 41. As illustrated in FIG. 26, the intermediate cylinder 96 is constituted of the left side half case 41a of the main body case 41 and an outer cover 139 screwed on the half case 41a. The intermediate cylinder 96 is constituted of a receiving cylinder portion 140 disposed on the upper end to be coupled to the rear end of the flexible hose 103, and a guide cylinder portion 141 disposed downwardly from the receiving cylinder portion 140 along the left side surface of the main body case 41 subsequently to be bent forward to forwardly open the lower end.

On the other hand, on the left edge side of the lid body 66 of the dust box 42 illustrated in FIGS. 37A to 39, a square cylinder 142, which is coupled to the guide cylinder portion 141 in a state of being coupled to the main body ease 41 and has a rear end as an inlet 78, is disposed perpendicular to the lid body 66 to project into the box main body 64. On the inner surface of the box main body 64, an arc-groove-shaped guide passage 143, which houses the square cylinder 142, is disposed projecting out to the outer surface along the circumferential direction. However, the guide passage 143 is disposed to be gradually shallowed toward forward, and continuously coupled to the box main body 64 ahead of the filter housing portion 67. Further, on the inner surface of the box main body 64, a pair of upper and lower of an upper rib 153 and a lower rib 154 is disposed. The upper and lower ribs 153 and 154 project to the filter housing portion 67 side in parallel on upper and lower ends of the guide passage 143, extend from the side surface on the square cylinder 142 side of the filter housing portion 67 in the circumferential direction, and go round to the side surface on the opposite side of the filter housing portion 67.

The filter housing portion 67 has an obstructed projecting end into the box main body 64, so as to have a horizontally long venthole 144 only in a region closer to the projecting end on a surface of the shorter side surface (shorter side surface on the upper side) side opposite the hinge shaft 65.

The dust-collector-side exhaust port 48 of the lid body 66 is formed in a square cylinder shape on the upper side of the cap cover 73. The dust-collector-side exhaust port 48 is a tubular body that passes through the square hole 120 of the main body case 41 and has a front end on which the sealing member 47 is disposed over the whole circumference. On the internal side of the dust box 42 inside the dust-collector-side exhaust port 48, a U-shaped crossover piece 145 is disposed to be inwardly depressed. The crossover piece 145 has a bottom portion on which a retention boss 146 is disposed obliquely downwardly. A metal contact pin 147 is independently disposed to be inserted into the retention boss 146. The contact pin 147 passes through the dust-collector-side exhaust port 48 and the sealing member 47 to project obliquely downward from the retention boss 146. The dust-collector-side exhaust port 48 communicates with the filter housing portion 67 via the outlet 74 disposed on the lower side of the crossover piece 145. Reference 148 is a locking loop which is disposed on the top surface of the cap cover 73 forward to be locked to a locking projection 149. The locking projection 149 is disposed inside the loop portion 75 on the upper end of the lid body 66.

Accordingly, when the opening 64a of the box main body 64 is closed by the lid body 66, the square cylinder 142 of the lid body 66 is fitted to the guide passage 143 of the box main body 64 such that the upper and lower ribs 153 and 154 partition above and below the square cylinder 142 between the box main body 64 and the filter housing portion 67. Thus, as illustrated in FIGS. 38A and 38B and FIGS. 40A and 40B, the dust box 42 includes a dust separator 150 where the air suctioned from the square cylinder 142 swirls along the inner circumference of the box main body 64 from the guide passage 143 between the upper and lower ribs 153 and 154. The dust separator 150 includes a semicircular swirling flow passage 151 disposed around to the right edge side of the lid body 66 on the opposite side of the filter housing portion 67, and an inner surface portion 152 of the lid body 66 on which the air swirling the swirling flow passage 151 hit passing between the box main body 64 and the filter housing portion 67. The box main body 64 internally includes the first dust collecting chamber D1 communicated with the square cylinder 142. The filter housing portion 67 internally includes the second dust collecting chamber D2 partitioned from the first dust collecting chamber D1.

When the dust box 42 is pushed into the main body case 41 from the front of the main body case 41 in a direction where the lid body 66 comes to the rear side and the receiving depressed portion 84 comes to the lower side, the intermediate cylinder 96 of the main body case 41 is coupled to the front end of the square cylinder 142 of the dust box 42 to be communicated with the square cylinder 142. Simultaneously, the dust-collector-side exhaust port 48 disposed on the lid body 66 passes through the square hole 120 of the main body case 41 to project rearward. In this state, the contact pin 147 also projects rearward from the square hole 120.

Installation of Dust Collector to Hammer Drill

In the dust collection system S configured as described above, when the dust collector 40A that includes the dust box 42 is installed on the hammer drill 1A, first, the locking shafts 61, 61 of the main body case 41 are locked to the respective lower cutouts 37, 37 disposed on the lower receiving portion 33 of the hammer drill 1A. Next, from this inclined posture, the upper side of the dust collector 40A is pushed up rearward to be rotated so as to be fitted to the front surface of the hammer drill 1A. Then, the hook 55 of the swing plate 53 is brought in contact with the stop 113 of the front housing 7 to sink into the guide groove 122 of the main body case 41, thus swinging the swing plate 53 to the downward position (release position). When the hook 55 is proceeded over the stop 113, as illustrated in FIG. 25, the swing plate 53 swings to the upward position (lock position) to cause the hook 55 to project upward so as to lock to the stop 113 of the front housing 7, thus the installation completes.

With the installation of the dust collector 40A, the contact pin 147 projecting from the dust-collector-side exhaust port 48, which passes through the square hole 120 of the main body case 41, is brought in contact with the shutter member 26A, so as to cause the shutter member 26A to be lain down rearward against the biasing of the torsion spring 111, thus opening the upper inlet 25. Simultaneously, the sealing member 47 of the dust-collector-side exhaust port 48 is brought in close contact with the peripheral area of the upper inlet 25, so as to cause the dust-collector-side exhaust port 48 to communicate with the upper inlet 25 in a sealed state. Thus, the dust collecting route R1, from the suction opening 104 to the dust-collector-side exhaust port 48 via the nozzle 44, the flexible hose 103 inside the sliding portion 43, the intermediate cylinder 96, the square cylinder 142 of the dust box 42, the dust separator 150, the venthole 144, the filter housing portion 67 and the outlet 74, is coupled to the intake route R2, from the upper inlet 25 to the upper fan 14 passing through upward the shutter member 26A and the separation chamber 23.

Drilling by Bit

Figure 41:
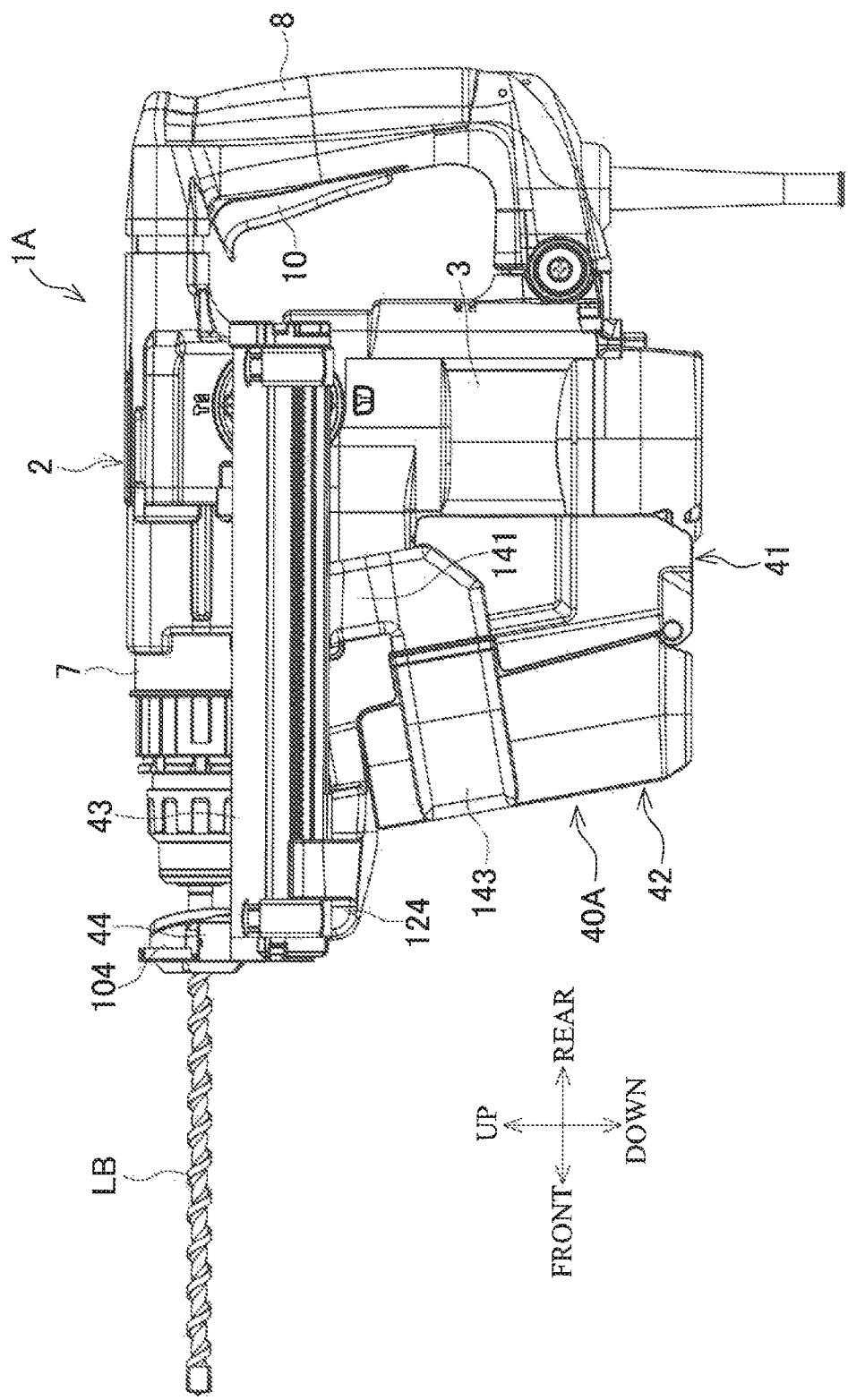
FIG. 41 is a side view illustrating a state where the sliding portion is retreated.

Then, the initial position of the rear stopper 100 on the rail 98 of the sliding portion 43 is adjusted such that the distal end of a bit (long bit or short bit) is positioned on the suction opening 104 projected to be biased with the sliding portion 43, thus adjusting the position of the front stopper 99 in accordance with the drilling depth. Subsequently, the suction opening 104 is brought in contact with a surface to be drilled and the switch lever 10 of the hammer drill 1A is performed with a push operation to turn ON the switch, so as to drive the motor 4 to rotate the output shaft 5. At this time, when the drill mode or the hammer drill mode is selected by the change lever 12, the bit rotates so that the surface to be drilled is drilled. As illustrated in FIG. 41, as the drilling proceeds, the bit (here, the long bit LB) passes through the suction opening 104, such that the sliding portion 43 is relatively retreated from the supporting arm 124 against biasing by the spiral spring 108. At this time, the receiving cylinder portion 140 relatively advances inside the sliding portion 43 via the elongate hole 97, so as to contract the flexible hose 103.

Here, the sliding portion 43 slides in a state where the guide rail 136 disposed on the lower side is guided by the guide metal fitting 127 on the supporting arm 124. While the lower side of the sliding portion 43 is supported, since the lower rail 138 of the guide rail 136 is supported by the lower plate 129 of the guide metal fitting 127 on the four surfaces of upper, lower, right, and left as described above, the guide rail 136 can smoothly slide without rattling. Especially, since the guide rail 136 and the lower plate 129 are disposed on a narrow area on the lower side of the sliding portion 43 within the right-left width, the guide rail 136 is reduced to tangle in sliding, thus providing an excellent accuracy to the slide. Further, damages from outside are reduced.

Dust Collecting Action

On the other hand, due to the rotation of the lower fan 15 caused by the rotation of the output shaft 5, the outside air is suctioned from the lower inlet 18 of the motor housing 3. After the outside air passes the motor 4 to be cooled, the outside air passes from the lower fan 15 to the fan housing chamber 13 so as to be discharged from the power-tool-side exhaust port 38. Simultaneously, the rotation of the upper fan 14 generates a suctioning force on the suction opening 104 of the dust collector 40A, and air is suctioned from the suction opening 104 with dust generated in the drilling, passes through the flexible hose 103 via the nozzle 44, and enters into the square cylinder 142 of the box main body 64 from the intermediate cylinder 96 via the inlet 78 of a dust box 42A.

Subsequently, as indicated by a solid arrow A in FIGS. 40A and 40B, the air exited from the square cylinder 142 is guided by the guide passage 143 and the upper and lower ribs 153 and 154 to flow along the swirling flow passage 151, so as to go round to the right side of the filter housing portion 67 to hit the inner surface portion 152 of the lid body 66, the inner surface of the box main body 64, and similar surface. Then, the air changes the direction upward indicated by a dashed arrow B to go round to the top surface side from the side surface of the filter housing portion 67, so as to enter the filter housing portion 67 from the venthole 144. Accordingly, the comparatively large dust is separated when the air swirls through the swirling flow passage 151 and when the air hits the inner surface portion 152 to change the direction, thus falling into the first dust collecting chamber D1 of the box main body 64. Since the upper and lower ribs 153 and 154 are interrupted before reaching the inner surface portion 152 on the right side of the filter housing portion 67, the dust is provided a space between the lower rib 154 and the inner surface portion 152 to fall down.

The air entered into the filter housing portion 67 passes through the filter 72, subsequently passes through the dust-collector-side exhaust port 48 via the outlet 74, so as to be discharged outside the dust box 42. Then, the air passes through the upper inlet 25 to reach the separation chamber 23, passes through the upper side of the shutter member 26A on the lain down position, passes through the upper fan 14 and the fan housing chamber 13 from the through hole 21 of the plate member 19, and is discharged from the power-tool-side exhaust port 38.

Accordingly, fine dust is captured by the filter 72 to remain in the filter housing portion 67. In this state, since the filter housing portion 67 is partitioned from the first dust collecting chamber D1 except the venthole 144 on the upper side, the fine dust in the filter housing portion 67 is accumulated in the second dust collecting chamber D2 in a state of being separated from the large dust in the box main body 64.

Removal of Dust Collector and Discharge of Dust

After the operation terminates, when the dust collector 40A is removed, similarly to the installation, pushing the button unit 57 causes the swing plate 53 to swing to the downward release position to release the hook 55 from the stop 113. Subsequently inclining forward to rotate the dust collector 40A causes the contact pin 147 to move forward, so as to release the push of the shutter member 26A. Accordingly, the shutter member 26A returns to the standing position to obstruct the upper inlet 25.

The dust is discharged from the dust box 42 as follows: the elastic piece 90 of the operating member 88 of the box main body 64 is pushed from the forward of the main body case 41 to release the lock of the attaching/detaching locking claw 91 to the locking stepped portion 62, so as to incline to move forward the dust box 42 with the shaft portion 63 as the center, thus removing the dust box 42 from the main body case 41. Next, the loop portion 75 of the lid body 66 is released from the lid locking claw 85 to open the lid body 66 from the box main body 64, thus discharging the large dust accumulated in the first dust collecting chamber D1. At this time, since the second dust collecting chamber D2 of the filter housing portion 67 is simultaneously opened outside via the venthole 144, fine dust can be also discharged from the venthole 144 by having the dust box 42 inclined or downward.

Effects of this Disclosure According to Dust Box

Thus, according to the dust collector 40A and the hammer drill 1A that includes the dust collector 40A of the above second embodiment, the dust box 42 includes the opening 64a openably/closably as a discharge port of the dust and the dust separator 150 that causes the air flown into the dust box 42 to swirl so as to separate the dust on the upstream side of the filter 72 on the dust collecting route R1. The dust box 42 dividedly includes the first dust collecting chamber D1 where the dust separated by the dust separator 150 accumulates and the second dust collecting chamber D2 where the dust captured by the filter 72 accumulates, such that the opening of the opening 64a simultaneously opens the first dust collecting chamber D1 and the second dust collecting chamber D2. This ensures the dust collection efficiency and the product lifetime of the filter 72 to be maintained without the possibility for the filter 72 to be accumulated by the dust separated by the dust separator 150 even the dust collector 40A including both the dust separator 150 and the filter 72. The discharge of the dust and the replacement of the filter unit 70 can be easily performed.

Especially, in this embodiment, since the dust separator 150 is configured to be disposed in the dust box 42 and include the swirling flow passage 151 and the inner surface portion 152 where the air swirling through the swirling flow passage 151 hits to change the direction of the flow. Thus, the dust can be separated by the hitting for changing the direction of the flow in addition to the centrifugation by swirling. This provides an efficient dust separation.

Since the swirling flow passage 151 for the air is disposed between the box main body 64 and the lid body 66, the box main body 64 can be used to easily form the swirling flow passage 151.

In the disclosure of the dust box of the second embodiment, the swirling flow passage is not limited to the combination of the square cylinder and the guide passage. For example, the swirling flow passage may be formed by only the guide passage disposed on the inner surface of the box main body, or the swirling flow passage may be formed by only the square cylinder curved in an arc shape. When the square cylinder is employed, the square cylinder may have another cross-sectional shape other than the square, or the square cylinder may have a shape other than the tubular body.

The hitting portion is not limited to the case where the inner surface portion of the lid body is used. The direction of the airflow can be changed by hitting the air on the inner surface of the box main body, the rib disposed upright on the outer surface of the filter housing portion in a vertical direction, or similar surface.

Effects of this Disclosure According to Dust Collection System

Then, according to the dust collection system S in the above second embodiment, the main body case 41 of the dust collector 40A includes the square hole 120, and the dust box 42 includes the dust-collector-side exhaust port 48 opposed to the upper inlet 25 via the square hole 120 and the sealing member 47 that surrounds the dust-collector-side exhaust port 48 to seal between the upper inlet 25 and the dust-collector-side exhaust port 48, in a state where the main body case 41 is installed on the housing (the main body housing 2 and the motor housing 3) of the hammer drill 1A side, and the contact pin 147 to open and close the shutter member 26A is disposed in an area surrounded by the sealing member 47. This eliminates a need for additionally disposing a sealing member for the contact pin 147 and the shutter member 26A. Then, the cost for the seal can be reduced even in the case where the shutter member 26A is disposed on the hammer drill 1A. Especially, since the dust-collector-side exhaust port 48 and the sealing member 47 are disposed on the dust box 42 side, the configuration on the main body case 41 side is simplified, thus eliminating a need for considering the sealing between the dust box 42 and the main body case 41.

Especially, in this embodiment, since the contact pin 147 is assembled on the dust box 42 as the different member, the contact pin 147 can be made of material with high rigidity such as metal and easily replaced in a case of such as damage.

Since the contact pin 147 is disposed on the cap cover 73 assembled on the lid body 66, the cap cover 73 can be used to easily assemble the contact pin 147. Even in a case where the contact pin 147 is damaged or similar case, it can be dealt with such as the replacement of only the cap cover 73, thus eliminating a need for replacing the whole lid body 66.

In the disclosure of the dust collection system of the second embodiment, the through hole is not limited to the square hole. The through hole may have another shape such as a horizontally long rectangular shape, a circular shape, and similar shape with the shape of the dust-collector-side exhaust port.

The contact member is not limited to the metallic contact pin. The contact member may be made of another material, and the retention boss itself may be lengthened to use as the contact member insofar as the strength is obtained. Furthermore, the contact member can employ a shape other than the pin shape.

Then, based on the dust collection system of the above second embodiment where the dust-collector-side exhaust port on the dust box side is coupled to the power-tool-side intake port via the through hole disposed on the main body case even if the configuration does not use the contact member for opening and closing the shutter member, the following configuration can be comprehended.

A dust collection system S for an electric power tool that includes an electric power tool (hammer drill 1A) and a dust collector for the electric power tool 40A.

The electric power tool (hammer drill 1A) includes a suction fan (upper fan 14) housed in a housing (main body housing 2) to be rotated by a motor 4 drive and a power-tool-side intake port (upper inlet 25) disposed on the housing to be communicated with the suction fan, and the electric power tool (hammer drill 1A) includes an intake route R2 from the power-tool-side intake port to the suction fan.

The dust collector for the electric power tool 40A includes a main body case 41 that has a front end on which a nozzle 44 with a suction opening 104 is disposed to be installable on the electric power tool, a dust box 42 on which a filter 72 is internally disposed, a dust-collector-side exhaust port 48 opposed to the power-tool-side intake port, and a dust collecting route R1 from the suction opening to the dust-collector-side exhaust port passing through the filter.

The main body case includes a through hole (square hole 120), and the dust-collector-side exhaust port of the dust box passes through the through hole in a state where the main body case is installed on the electric power tool, so as to be coupled to the power-tool-side intake port via the sealing member 47.

In this case, it is enough to dispose the sealing member only between the power-tool-side intake port the dust-collector-side exhaust port, thus eliminating a need for disposing the sealing member between the main body case and the dust box to simplify the configuration. However, the sealing member may be disposed on the power-tool-side intake port.

Additionally, in common to the first and second embodiments, in the configuration of the hammer drill, the motor may be disposed sideways, or a DC machine that uses a battery pack as a power source may be employed instead of an AC machine. Needless to say, not limited to the hammer drill, the above disclosures are applicable even to the other electric power tools such as an electric drill insofar as the dust collector is installable.

Preferably, the sliding portion internally may include a part of the dust collecting route.

Preferably, the part of the dust collecting route may be disposed inside the sliding portion and be is a flexible hose configured to expand and contract in accordance with the slide.

Preferably, the sliding portion may be disposed closer to one side of any of right and left on the main body case.

Preferably, the sliding portion may be configured to slide in a state of being restricted to rotate by the guiding portion.

Preferably, the sliding portion may be is projected to be biased forward by a spiral spring.

Preferably, in a state where the main body case is installed on the electric power tool, the exhaust port may communicate with a housing chamber for a fan disposed on the electric power tool, such that a rotation of the fan generates a suctioning force on the suction opening.

Preferably, the exhaust port may be disposed rearward with respect to the dust box.

Preferably, initial position setting means may be configured to arbitrarily set a forwardly projecting position of the sliding portion.

Preferably, the initial position setting means may a rail disposed on a side surface of the sliding portion, a stopper configured to slide along the rail, and a rack disposed on the rail to restrict the slide of the stopper.

Preferably, a maximum processing depth defined by the slide of the sliding portion may be equal to or more than 120 mm.

Preferably, the dust box may include an operable and closable discharge port for dust and a dust separator configured to cause air flown into the dust box to swirl so as to separate the dust on an upstream side of the filter on the dust collecting route, and the dust box dividedly may include a first dust collecting chamber where the dust separated by the dust separator accumulates and a second dust collecting chamber where the dust captured by the filter accumulates, such that the opening of the discharge port simultaneously opens the first dust collecting chamber and the second dust collecting chamber.

In order to achieve the above-described object, an electric power tool according to a thirteenth aspect of the disclosure includes the dust collector for the electric power tool according to the first aspect, and in the mounted state, a housing is not positioned on a rearwardly extended line of the sliding portion.

In order to achieve the above-described object, a dust collection system according to a fourteenth aspect of the disclosure includes the electric power tool according to the thirteenth aspect and the dust collector for the electric power tool according to the first aspect.

The electric power tool includes a suction fan housed inside the housing to be rotated by a motor drive, a power-tool-side intake port formed on the housing to be communicated with the suction fan, and a shutter member disposed on the housing to be configured to open and close the power-tool-side intake port, and the electric power tool includes an intake route from the power-tool-side intake port to the suction fan, the dust collector for the electric power tool includes the main body case with the exhaust port opposed to the power-tool-side intake port and a contact member configured to be brought in contact with the shutter member, and the dust collector for the electric power tool includes a dust collecting route from the suction opening to dust-collector-side exhaust port passing through the filter, in a state where the housing of the electric power tool includes the main body case of the dust collector for the electric power tool, the shutter member with which the contact member may be in contact releases the power-tool-side intake port to cause the dust collecting route to be communicated with the intake route, and the main body case includes a sealing member that surrounds the exhaust port to seal between the power-tool-side intake port and the exhaust port in a state where the main body case is installed on the housing, and the contact member is disposed in an area surrounded by the sealing member.

In order to achieve the above-described object, a dust collection system according to a fifteenth aspect of the disclosure includes the electric power tool according to the thirteenth aspect and the dust collector for the electric power tool according to the first aspect.

The electric power tool includes a suction fan housed inside the housing to be rotated by a motor drive, a power-tool-side intake port formed on the housing to be communicated with the suction fan, and a shutter member disposed on the housing to be configured to open and close the power-tool-side intake port, and the electric power tool may include an intake route from the power-tool-side intake port to the suction fan.

The dust collector for the electric power tool includes a contact member configured to be brought in contact with the shutter member and the exhaust port opposed to the power-tool-side intake port, and the dust collector for the electric power tool includes a dust collecting route from the suction opening to the dust-collector-side exhaust port passing through the filter, in a state where the housing of the electric power tool includes the main body case of the dust collector for the electric power tool, the shutter member with which the contact member may be is in contact releases the power-tool-side intake port to cause the dust collecting route to be communicated with the intake route.

The main body case includes a through hole, the dust box includes the exhaust port opposed to the power-tool-side intake port via the through hole and a sealing member that seals between the power-tool-side intake port and the exhaust port in a state where the main body case is installed on the housing, and the contact member is disposed in an area surrounded by the sealing member.

According to this disclosure, the guiding portion is disposed on the main body case such that the sliding portion passes through the guiding portion and the guiding portion allows the sliding portion to project rearward when the sliding portion slides. This ensures setting the extension/contraction stroke of the sliding portion large without being restricted by the main body case. Then, the long bit can be employed.

Disposing a part of the dust collecting route on the inside of the sliding portion provides a reasonable configuration where the sliding portion is doubled as the dust collecting route, thus eliminating a need for winding around such as a hose outside. This makes the whole device downsized and eliminates the hindrance for the work.

Disposing the sliding portion on the main body case closer to one side preferably prevents the interference with the electric power tool when the sliding portion is retreated.

The use of the spiral spring ensures the sliding portion to project to be biased with a small space.

The configuration where the exhaust port communicates with the fan housing chamber on the electric power tool side so as to generate the suctioning force on the suction opening in accordance with the rotation of the fan in a state where the main body case is installed on the electric power tool ensures the dust collection with use of the fan on the electric power tool side, thus eliminating a need for disposing a motor and a fan on the main body case.

Disposing the exhaust port rearward the dust box allows the dust collecting route from the suction opening to the rear exhaust port passing through the inside of the dust box to be formed compactly in the right-left direction.

Employing the initial position setting means allows the suction opening to have the position properly set corresponding to the length of the tool bit and the drilling depth.

Setting the maximum processing depth to equal to or more than 120 mm ensures the dust collector for the electric power tool to be applicable to not only a tool bit with a short length but also a tool bit with a long length, such that the one dust collector for the electric power tool is widely applicable to the drilling work.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collecting system for an electric power tool, comprising:
    an electric power tool including a suction fan housed inside a housing to be rotated by a motor drive, a power-tool-side intake port formed on the housing and communicating with the suction fan, a shutter member provided in the housing and configured to open and close the power-tool-side intake port, in which the electric power tool includes an intake route extending from the power-tool-side intake port to the suction fan; and
    a dust collector for an electric power tool, the dust collector including a main body case that is mounted to the electric power tool and that includes a nozzle having a suction opening at a front end, a dust box internally including a filter, a contact member brought in contact with the shutter member, a dust-collector-side exhaust port disposed oppositely to the power-tool-side intake port, in which the dust collector includes a dust collecting route extending from the suction opening to the dust-collector-side exhaust port through the filter, wherein
    in a state where the main body case of the dust collector is installed on the housing of the electric power tool, the shutter member with which the contact member is brought contact releases the power-tool-side intake port such that the dust collecting route is communicated with the intake route,
    the main body case includes a through hole,
    the dust box includes the exhaust port disposed oppositely to the power-tool-side intake port via the through hole and a sealing member configured to seal between the power-tool-side intake port and the dust-collector-side exhaust port in a state where the main body case is installed on the housing, and
    the contact member is disposed in an area surrounded by the sealing member.

2. A dust collecting system for an electric power tool, comprising:
    an electric power tool including a suction fan housed inside a housing to be rotated by a motor drive, a power-tool-side intake port formed on the housing and communicating with the suction fan, a shutter member provided in the housing and configured to open and close the power-tool-side intake port, in which the electric power tool includes an intake route extending from the power-tool-side intake port to the suction fan; and
    a dust collector for an electric power tool, the dust collector including a main body case that has a dust-collector-side exhaust port disposed oppositely to the power-tool-side intake port and that is mounted to the electric power tool, a dust box internally including a filter, a nozzle disposed on the main body case and having a suction opening at a front end of the nozzle, a contact member brought in contact with the shutter member, in which the dust collector includes a dust collecting route extending from the suction opening to the dust-collector-side exhaust port through the filter, wherein
    in a state where the main body case of the dust collector is installed on the housing of the electric power tool, the shutter member with which the contact member is brought contact releases the power-tool-side intake port such that the dust collecting route is communicated with the intake route,
    the main body case includes a sealing member that surrounds the dust-collector-side exhaust port to seal between the power-tool-side intake port and the dust-collector-side exhaust port in a state where the main body case is installed on the housing, and
    the contact member is disposed in an area surrounded by the sealing member.

3. The dust collecting system for the electric power tool according to claim 1, wherein
    the contact member is formed as a separate member that is assembled on the dust box.

4. The dust collecting system for the electric power tool according to claim 1, wherein
    the dust box includes a filter housing portion that accommodates a filter and a cap cover that retains the filter in the filter housing portion, and the contact member is provided in the cap cover.

5. The dust collecting system for the electric power tool according to claim 1, wherein
    the shutter member is disposed movably back and forth between an advance position obstructing the power-tool-side intake port and a retreated position opening the power-tool-side intake port, and the contact member is brought in contact with the shutter member, moving to the retreated position to open the power-tool-side intake port.

6. The dust collecting system for the electric power tool according to claim 5, wherein
    air suctioned from the power-tool-side intake port into the housing passes through right and left of the shutter member to reach the suction fan.

7. The dust collecting system for the electric power tool according to claim 1, wherein
    an extended portion is formed integrally with the sealing member to be locked to the contact member, and locking of the contact member prevents the sealing member from falling out from a side of the main body case.

8. The dust collecting system for the electric power tool according to claim 1, wherein
    the main body case includes a first locking portion and a second lock portion,
    the first locking portion locking to a first receiving portion disposed on the housing, and the second lock portion being rotated to the side of the main body case in a state where the first locking portion is locked to the first receiving portion so as to be locked to a second receiving portion disposed on the main body case in a mounting position to the main body case.

9. The dust collecting system for the electric power tool according to claim 8, wherein the second receiving portion is formed as a pair of locking depressed portions disposed on right and left sides of the power-tool-side intake port, and the second lock portion is formed as a pair of hooks that are disposed on right and left sides of the dust-collector-side exhaust port, configured to be movable between a lock position locking to the locking depressed portions and a release position unlocking the locking depressed portions, and configured to be biased to the lock position.

10. The dust collecting system for the electric power tool according to claim 9, wherein the pair of hooks are configured to be operably movable to the release position simultaneously by one operating unit.

* * * * *